Aug. 23, 1938.   C. A. FUCHS   2,127,509
TYPEWRITING MACHINE
Filed July 31, 1935   22 Sheets-Sheet 6

INVENTOR.
Charles A. Fuchs.
BY John Waldheim
ATTORNEY.

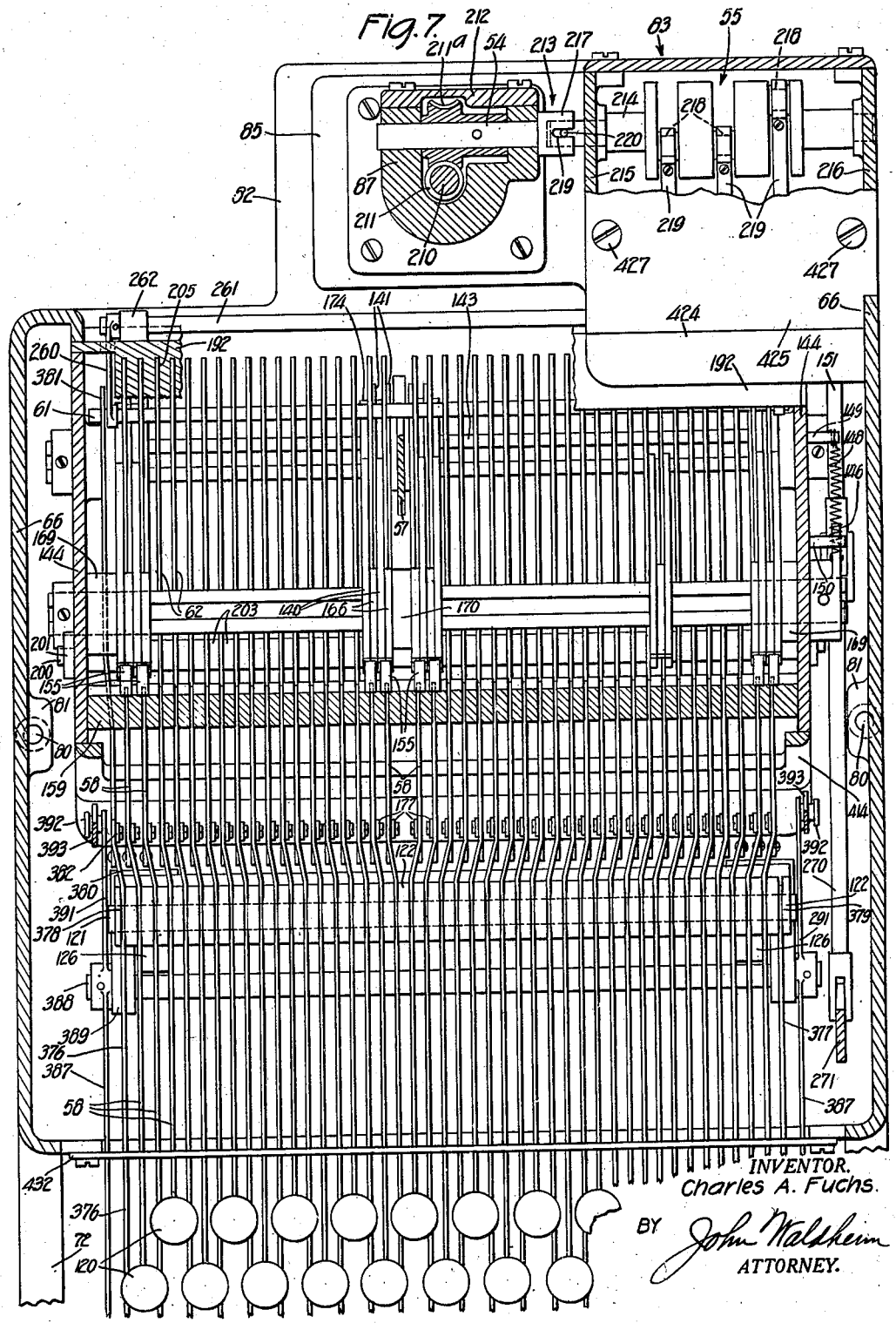

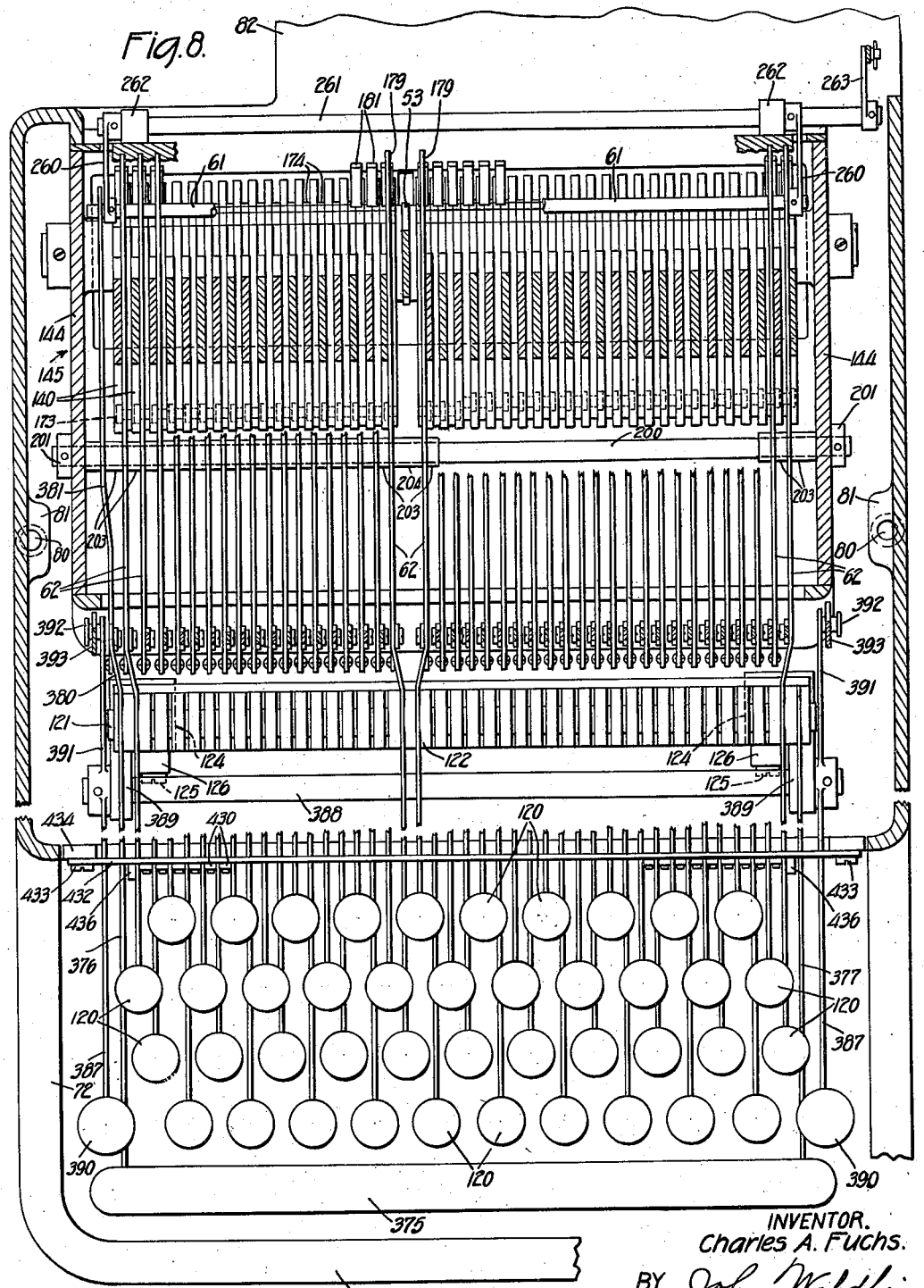

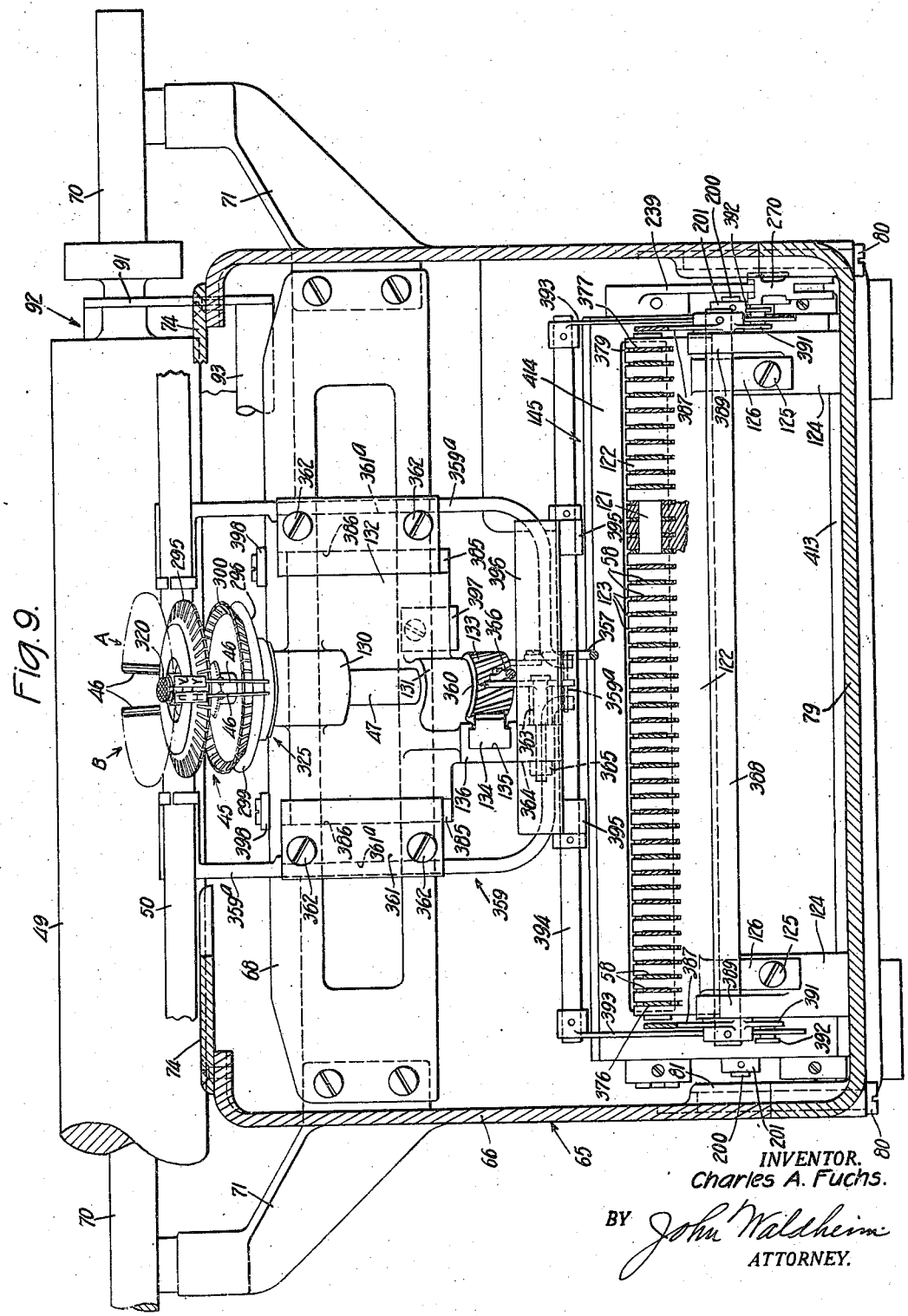

Aug. 23, 1938.  C. A. FUCHS  2,127,509
TYPEWRITING MACHINE
Filed July 31, 1935  22 Sheets-Sheet 10
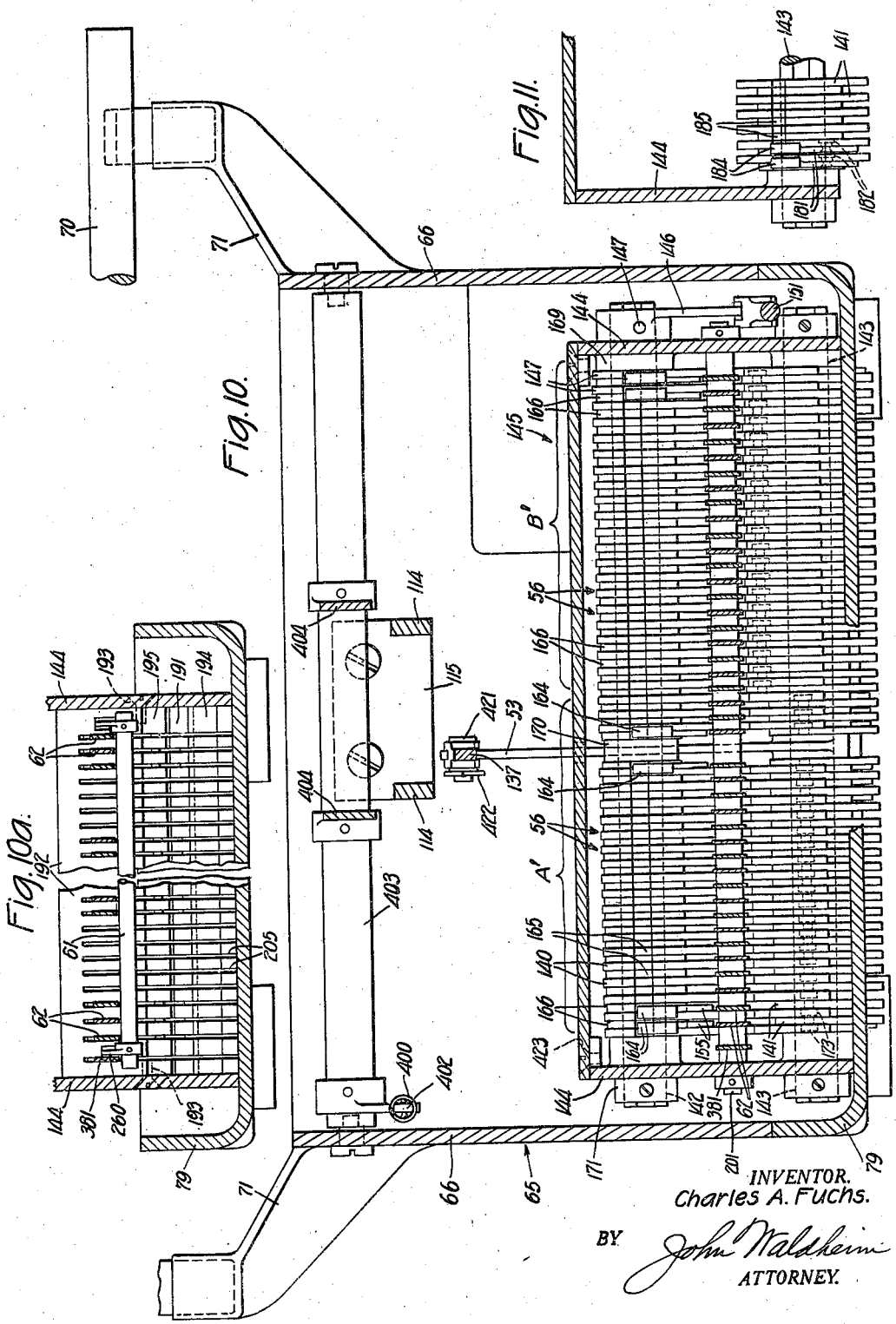
INVENTOR.
Charles A. Fuchs.
BY John Waldheim
ATTORNEY.

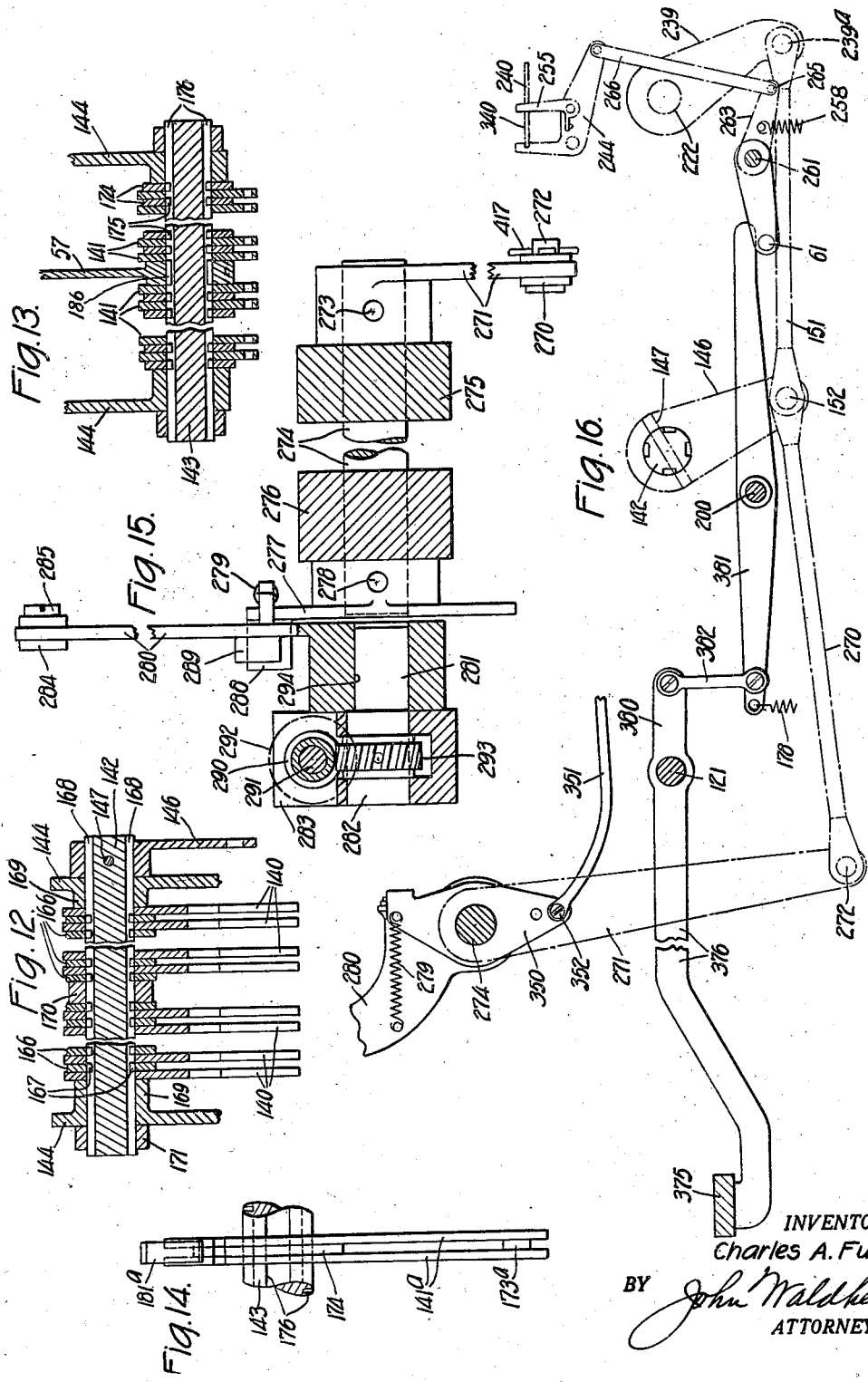

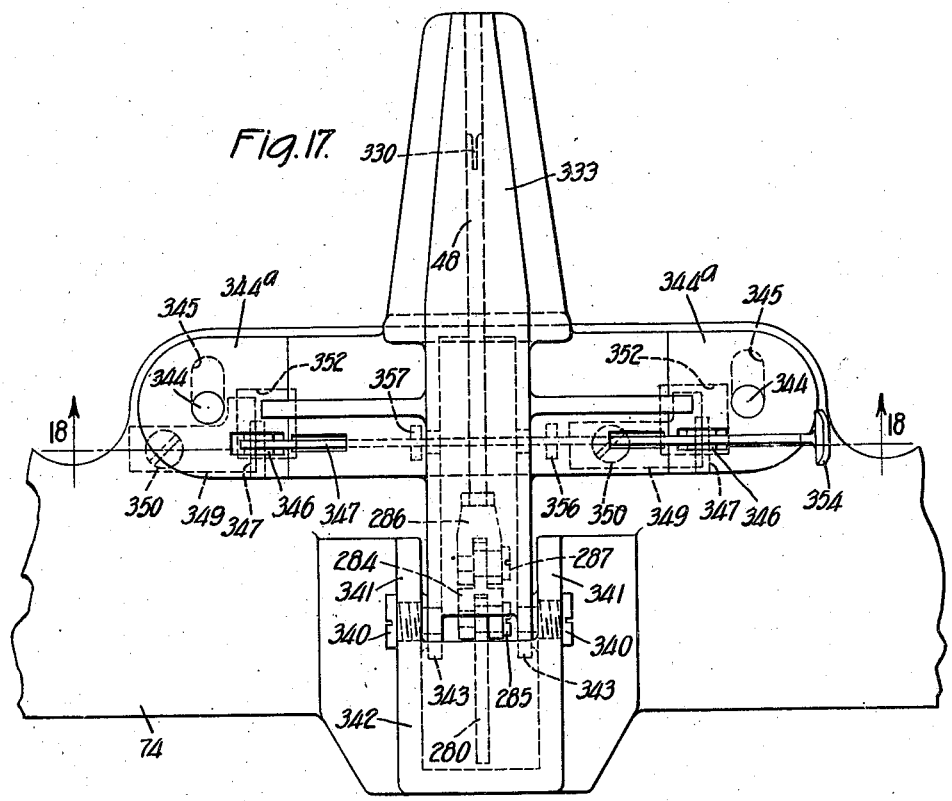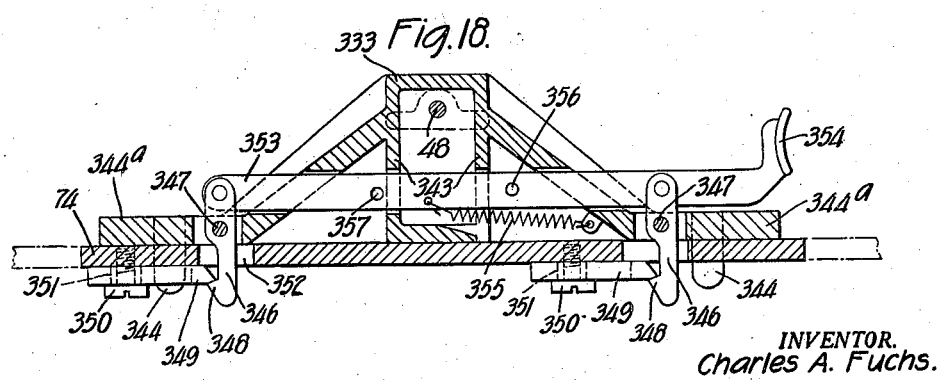

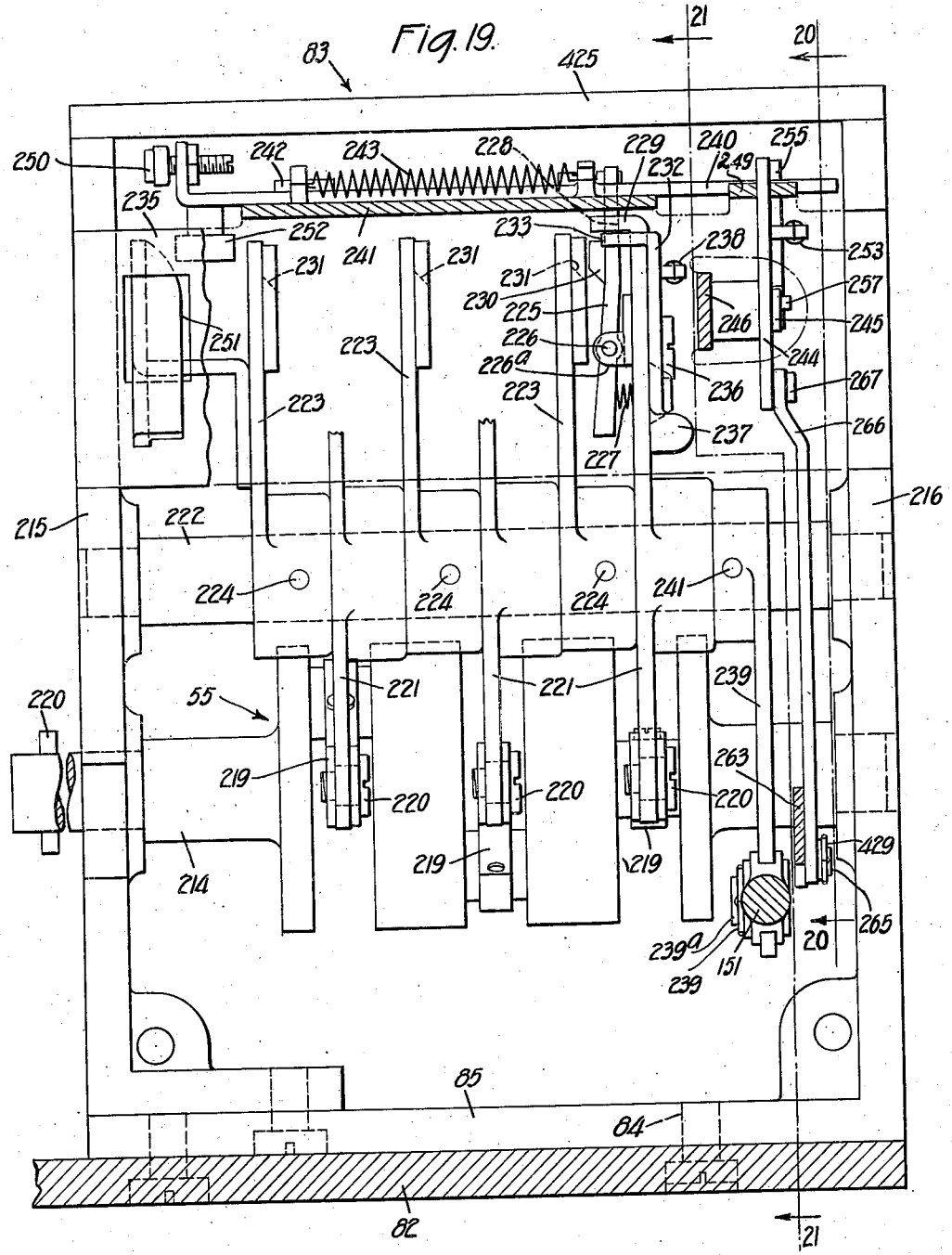

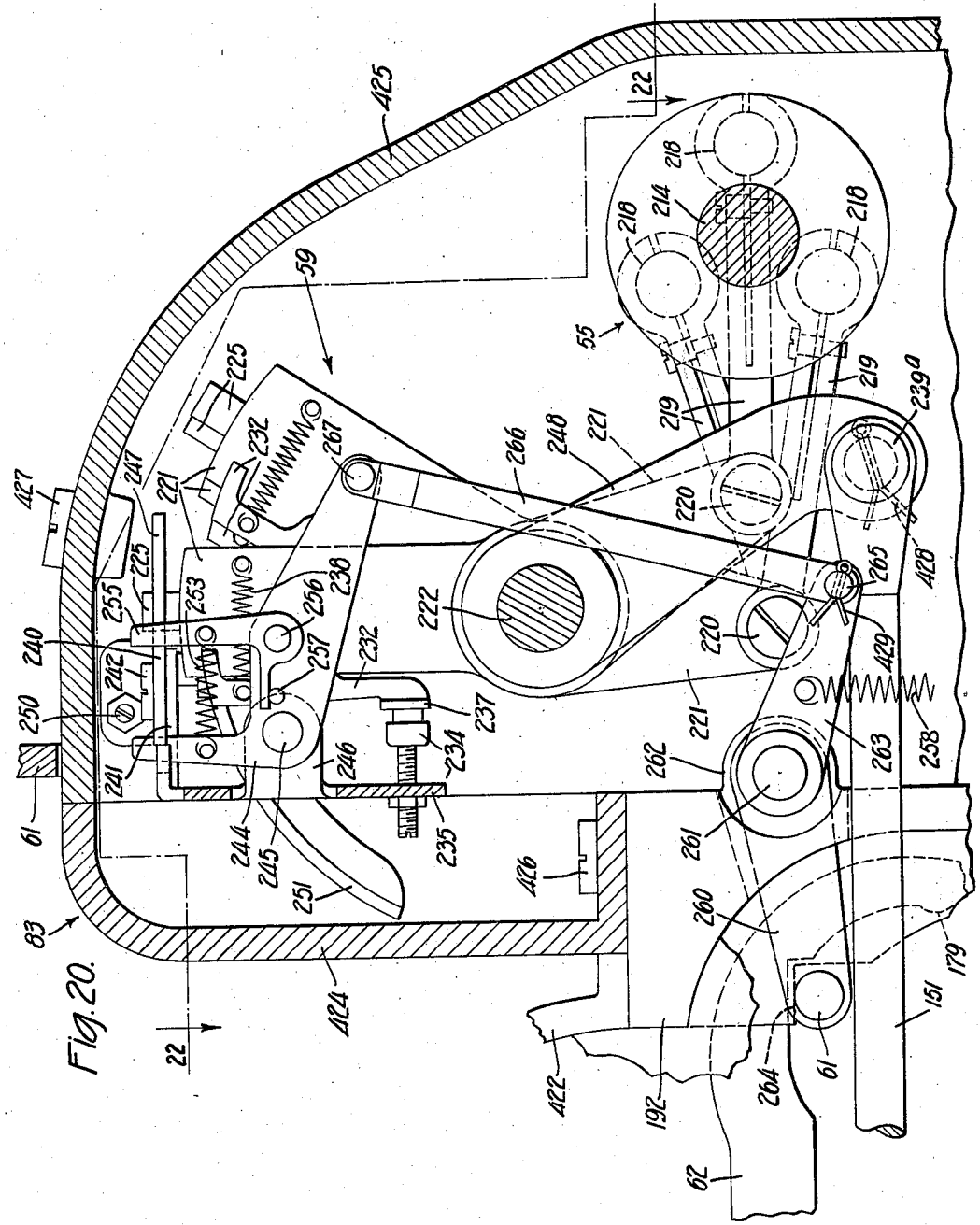

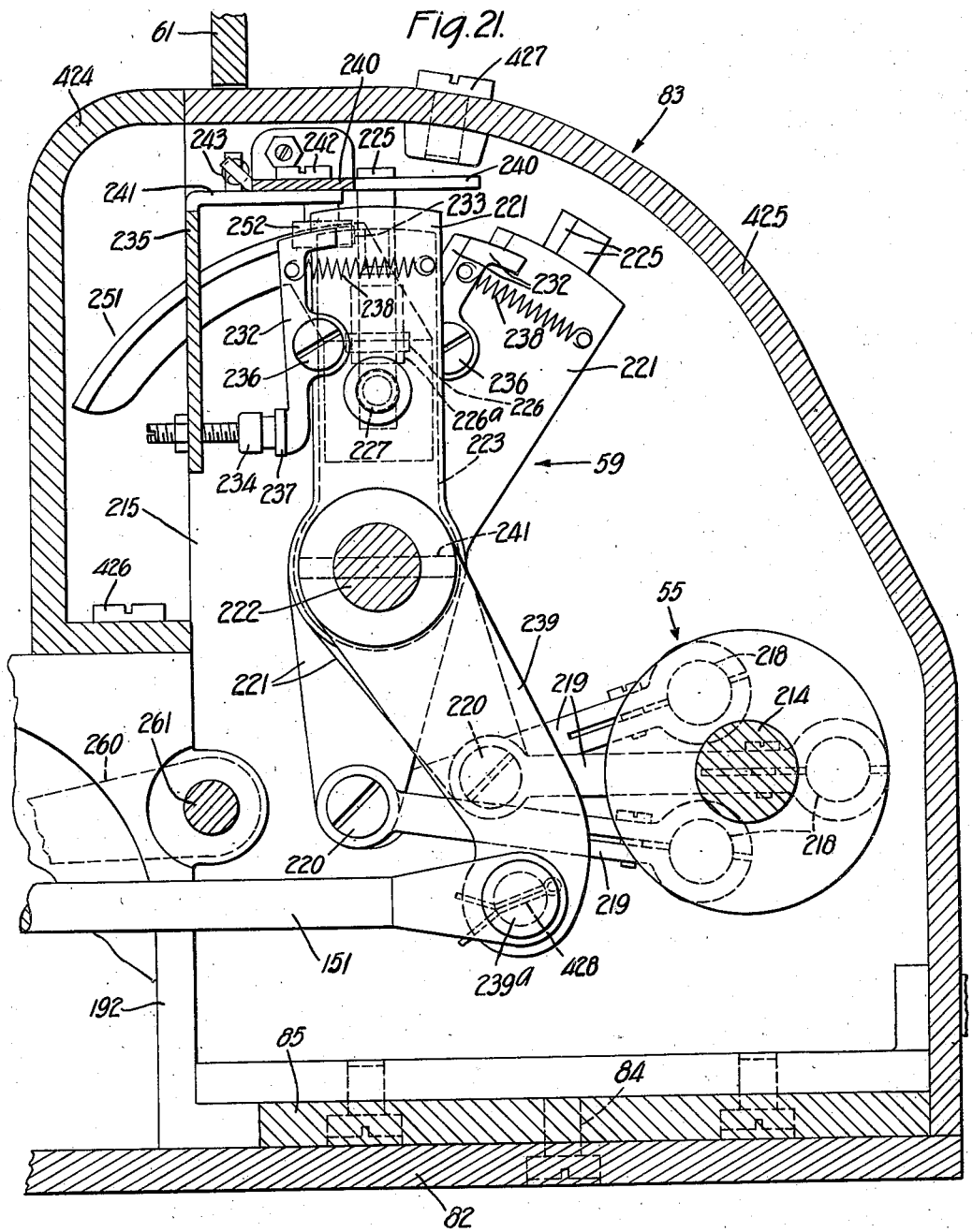

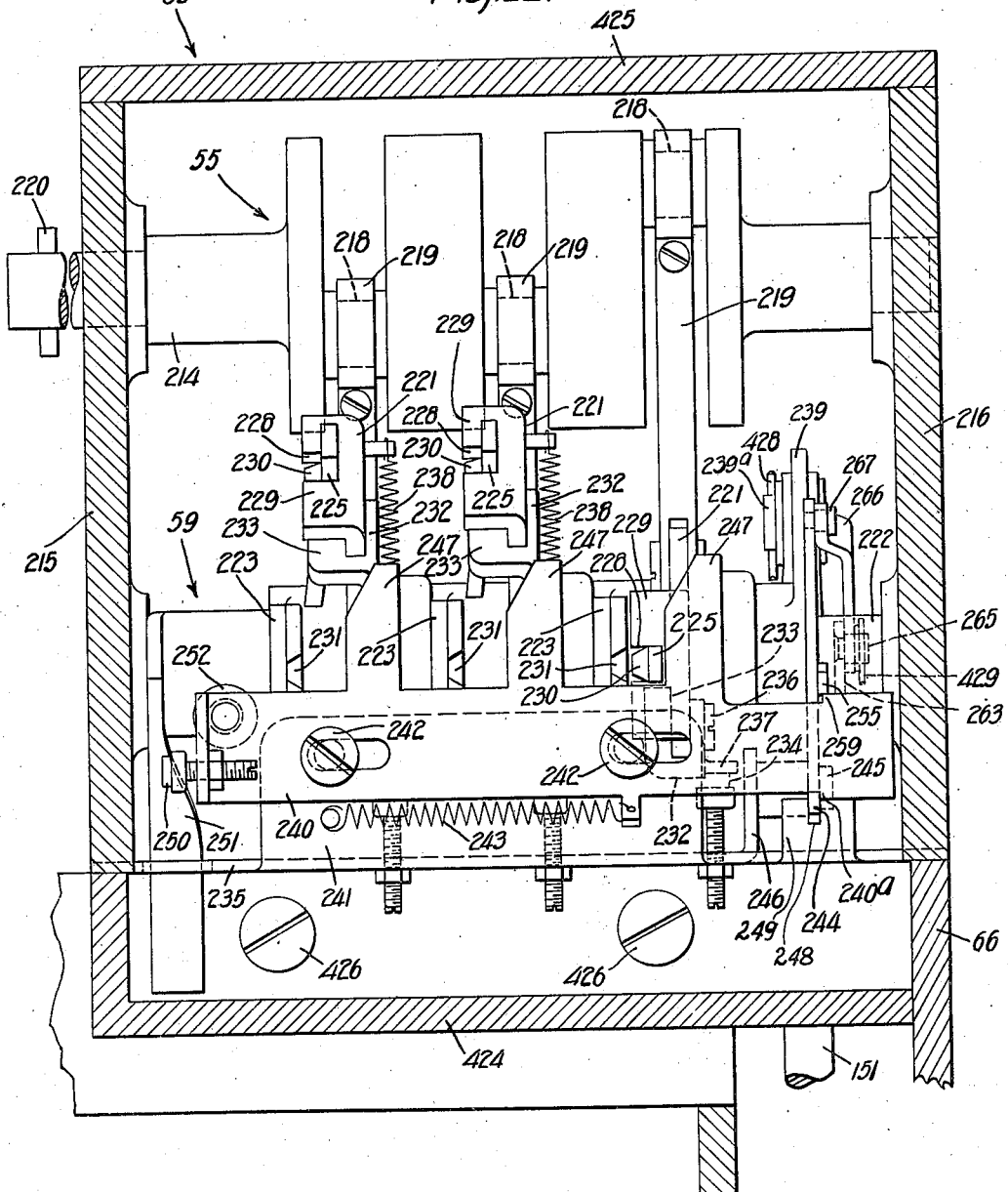

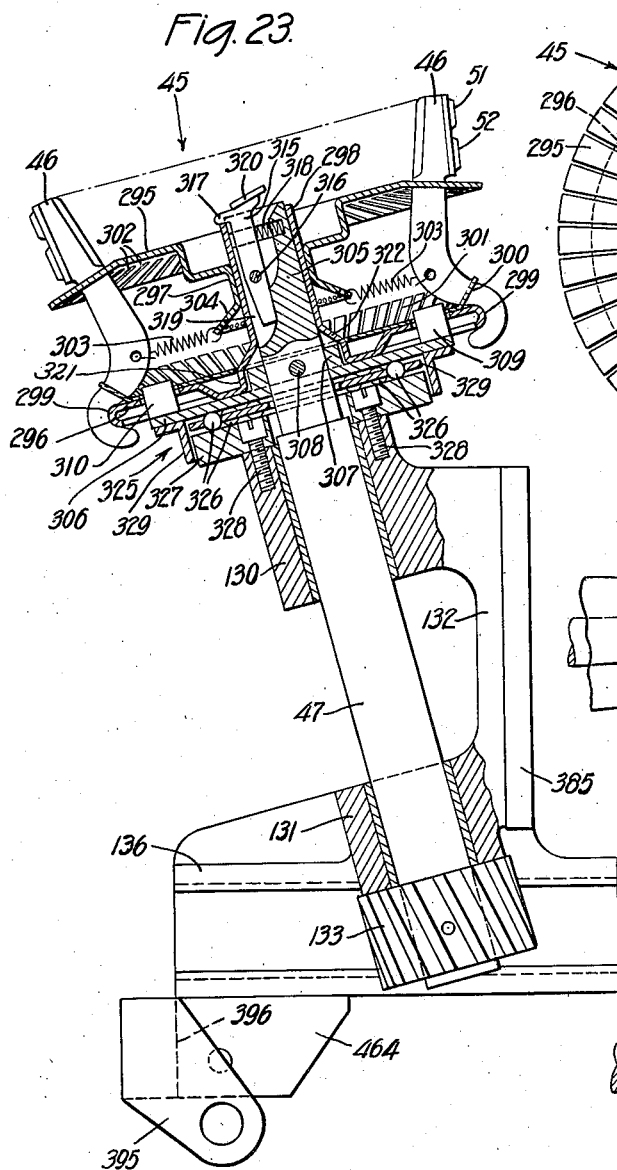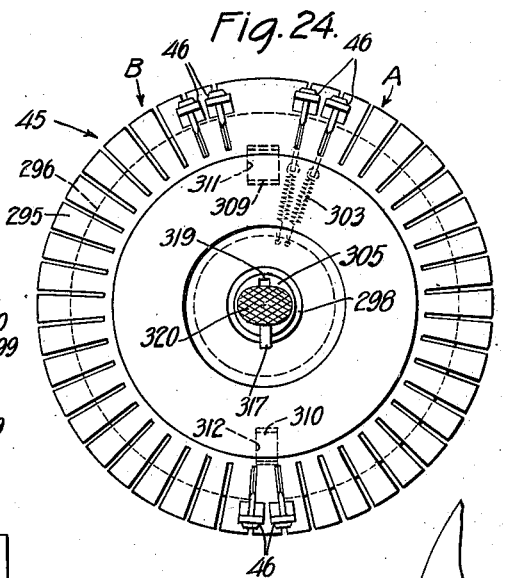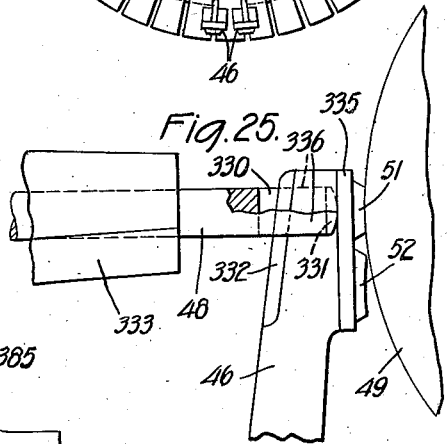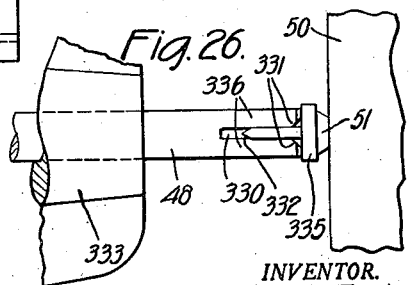
Aug. 23, 1938. C. A. FUCHS 2,127,509
TYPEWRITING MACHINE
Filed July 31, 1935 22 Sheets-Sheet 17
INVENTOR.
Charles A. Fuchs.
BY John Waldheim
ATTORNEY.

Aug. 23, 1938.   C. A. FUCHS   2,127,509
TYPEWRITING MACHINE
Filed July 31, 1935   22 Sheets-Sheet 19
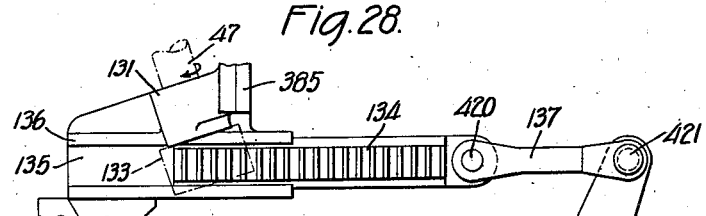
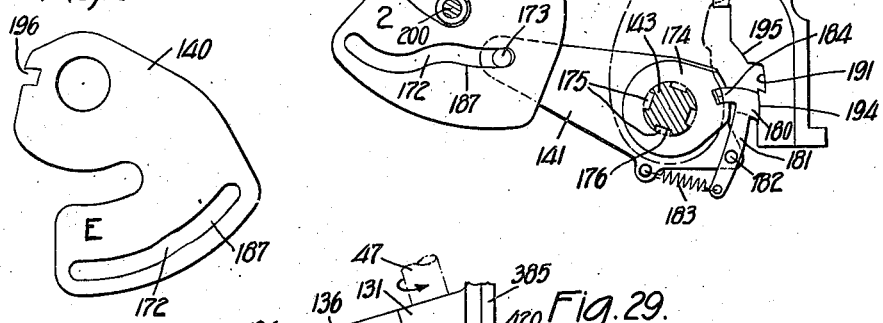
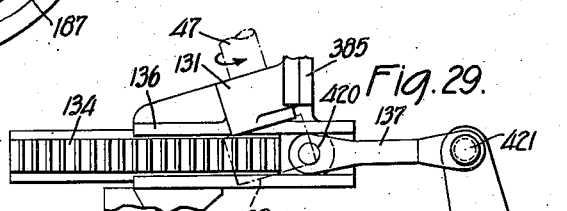
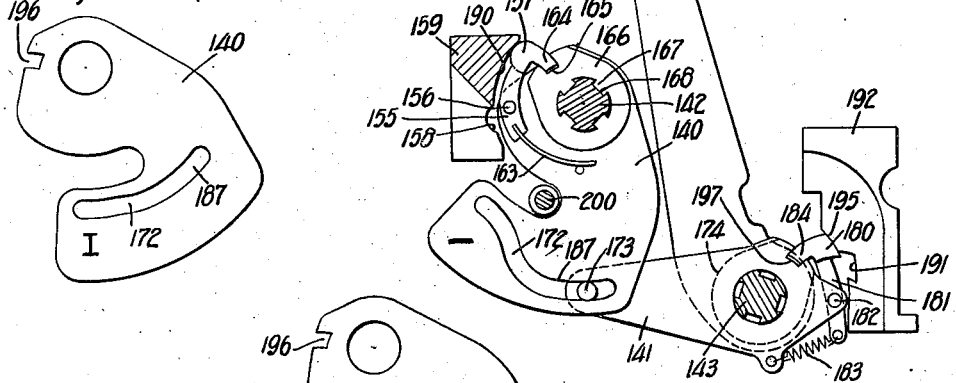
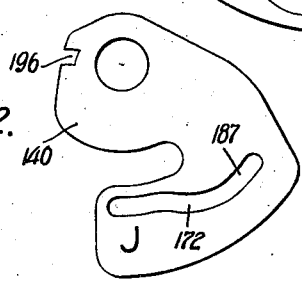
INVENTOR.
Charles A. Fuchs.
BY John Waldheim
ATTORNEY.

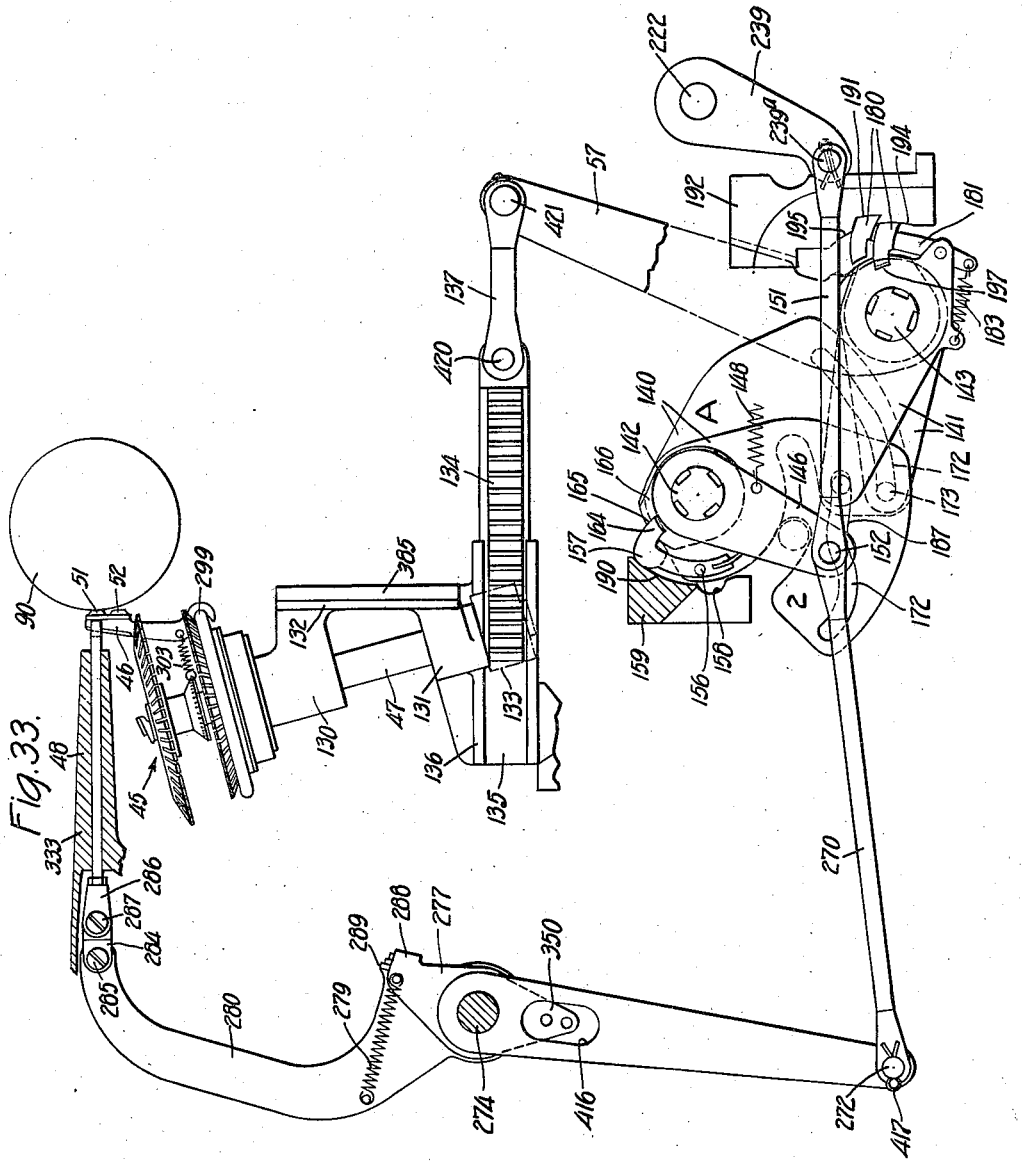

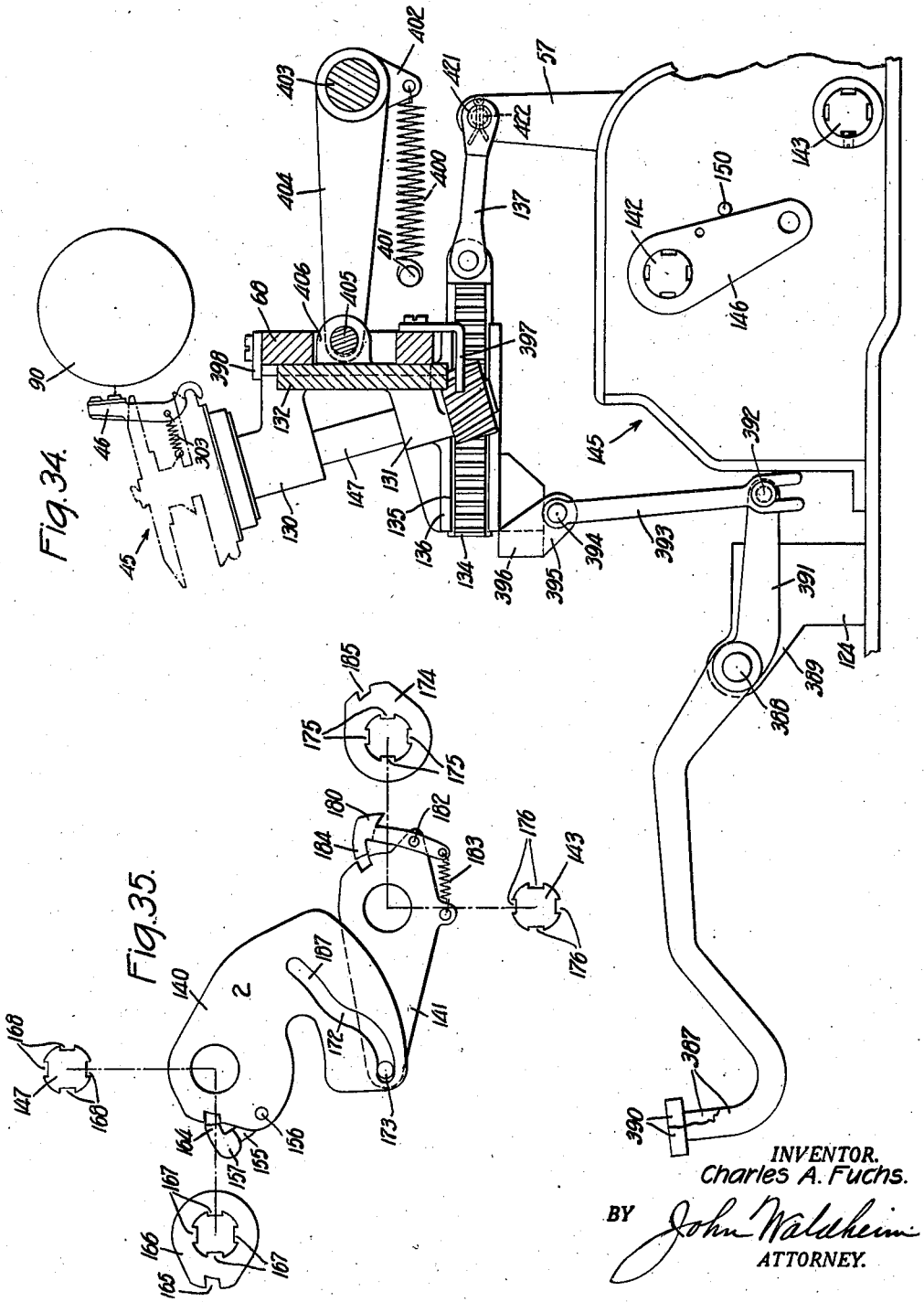

Aug. 23, 1938.   C. A. FUCHS   2,127,509
TYPEWRITING MACHINE
Filed July 31, 1935   22 Sheets-Sheet 22

INVENTOR.
Charles A. Fuchs.
BY John Waldheim
ATTORNEY.

Patented Aug. 23, 1938

2,127,509

UNITED STATES PATENT OFFICE 2,127,509

TYPEWRITING MACHINE

Charles A. Fuchs, Plainsview, Hicksville, N. Y., assignor, by mesne assignments, to Burnell Laboratory Company, Incorporated, Locust Valley, N. Y., a corporation of Delaware Application July 31, 1935, Serial No. 33,938

118 Claims. (Cl. 197—16)

This invention relates to typewriting machines and more particularly to the kind in which a type shuttle or carrier is employed. The invention includes improvements which may be used with devices shown in my pending applications Numbers 3909 and 3910, both filed on Jan. 29, 1935.

A feature of the invention relates to novel means whereby a continually running power means may be connected to actuate the type shuttle, in either of two opposite directions from a normal position, to juxtapose any one of the types at the printing point.

Other features of the invention relate to intermediate devices, one for each type, through the medium of any one of which the power means may actuate the type carrier through a distance required to juxtapose the corresponding type at the printing point, and means operable by the key levers for rendering these intermediate devices effective.

Another feature relates to means including a general operator connectable with the power means by means operable by the key levers to actuate the selected intermediate or motion determining device.

Another feature of the invention relates to the construction and arrangement of the intermediate devices which include cams selectable by the key levers, the cams being divided into two sets, the cams of one set being operable individually to actuate the type carrier in one direction from its normal position, and those of the other set being also operable individually but to actuate the type carrier in the opposite direction from its normal position, the throw or in other words extent of motion imparted by each cam being of a magnitude differing from the throw of any of the other cams in the same set, so that extents of movements may be effected of said type carrier which are commensurate with the throws of the various cams to thus juxtapose any one of the types at the printing point.

Further features of the invention relate to the construction of the shuttle or type bar carrier, the means to facilitate its demountability and attachment, and the means to facilitate its actuation.

Other features relate to the construction of the type bar actuator to insure printing of the entire type face with uniform pressure against the work sheet, and to assist in aligning the type bar juxtaposed at the printing point. Provision is also made to locate and prevent accidental displacement of a bracket which guides the type bar actuator.

Another feature relates to novel means whereby the type bar actuator, the ribbon vibrator, and the carriage escapement may be actuated by the power means.

A further feature relates to means under the control of the space bar whereby the actuation of the escapement may be effected by the power means.

Another feature relates to adjusting means whereby the effect of the type bar actuator may be varied.

Another feature of the invention relates to the construction and arrangement of means including a rack for actuating the type bar carrier.

Another feature relates to case shifting means whereby the type bar carrier may be shifted relatively to the platen, provision being made to enable the actuating rack to be shifted with the type bar carrier and relatively to the variably movable means which is actuable by the power means through the medium of any one of the cams.

Still another feature relates to the structure which permits certain sections of the machine to be assembled independently of each other to facilitate manufacture. These sections or units may then be demountably connected to each other so that they may be readily removed from each other to give ready access to the interior of the machine.

Other features and advantages will hereinafter appear.

In the drawings which form part of the specification:

Fig. 7 is a sectional top plan view taken on the line 7—7 of Fig. 5;

Fig. 8 is a sectional top plan view taken on the line 7—7 of Fig. 5;

Fig. 9 is a sectional, front view taken on the line 9—9 of Fig. 5;

Fig. 10 is a sectional, front view taken on the line 10—10 of Fig. 5;

Fig. 10a is a fragmentary, front view, in section, of a portion of the machine showing the arrangement of certain key operated levers with respect to the universal bar operable thereby to effect the connection of the general operator with the selected cam;

Fig. 11 is a fragmentary, rear view showing the pawls which connect the cam actuated arms to the variably movable rock shaft of the shuttle actuating means;

Fig. 12 is a fragmentary, sectional, front view showing the arrangement of the motion determining devices or cams and other devices on their supporting rock shaft;

Fig. 13 is a fragmentary, sectional, front view showing the arrangement of the cam actuated arms and the other devices supported on their rock shaft;

Fig. 14 is a top plan view of a modified form of cam actuated element;

Fig. 15 is a sectional front view illustrating the type bar actuator, the means for operating it and the means for adjusting it;

Fig. 16 is a skeleton side view showing the mechanism operable by the space bar to render effective the power means to actuate the carriage feed mechanism;

Fig. 17 is a top plan view of a guide for the type bar actuator showing it pivoted and held on the front plate of the main frame;

Fig. 18 is a sectional front view, taken on the line 18—18 of Fig. 17;

Fig. 19 is a front view of the clutch mechanism and its casing and showing a portion of the base plate to which said casing is secured;

Fig. 20 is a sectional side view taken on the line 20—20 of Fig. 19;

Fig. 21 is a view similar to Fig. 20, the section being taken on the line 21—21 of Fig. 19;

Fig. 22 is a sectional, top plan view taken on the line 22—22 of Fig. 20;

Fig. 23 is a fragmentary side view partly in section, of the type bar carrier and its support;

Fig. 24 is a top plan view of the type bar carrier;

Fig. 25 is a side view showing the action of the type bar actuator during a printing operation;

Fig. 26 is a top plan view of the parts illustrated in Fig. 25;

Fig. 28 shows the parts of Fig. 27 actuated by the general operator and the upwardly extending arm of the variably movable means moved rearwardly of the machine, from its normal position in Fig. 1, to rotate the shuttle shaft in the direction of the arrow;

Fig. 29 is a view similar to Fig. 28, but shows the arm of the variably movable means operated in the opposite direction from its normal position;

Fig. 30 is a detail side view of the cam which imparts the smallest degree of motion to the type shuttle and belongs to the set including the cam of Fig. 28;

Fig. 31 is a cam similar to the one of Fig. 30, but belonging to the other set including the cam of Fig. 29;

Fig. 32 is a detail view of another cam of the set including the cams of Figs. 29 and 31, but which is designed to impart an intermediate degree of motion to the type shuttle;

Fig. 33 is a skeleton, diagrammatic view showing the selected type bar actuated by the power means;

Fig. 34 is a skeleton side view showing the type carrier shifted to its lower case position;

Fig. 35 is a view of one of the intermediate actuating devices showing some of its associated parts detached therefrom;

Similar reference characters represent similar parts throughout the drawings which form part of the specification:

General description

Figure 1:
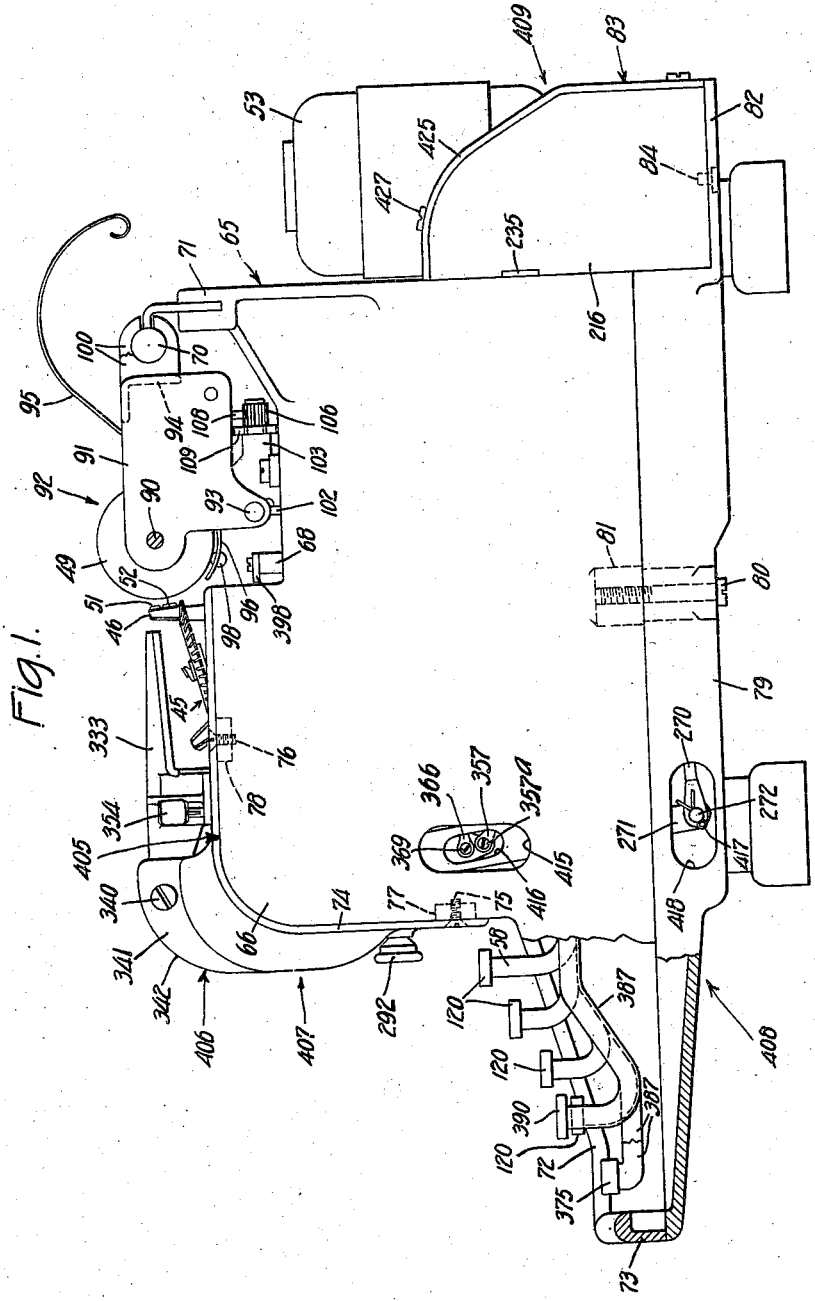
Fig. 1 is a side elevation of the machine, a portion being broken away to show the arrangement of the key levers in the key board.

A brief description will first be given, followed by a more detailed one, of the construction and operation of the machine. A type carrier 45, Fig. 4, has thereon short or midget type bars 46 arranged in two sets A and B, Figs. 9, 24, and 36, at opposite sides of a fore-and-aft, vertical plane extending through the printing point. The type carrier is attached to a shaft 47 which may be rotated in opposite directions from a normal position to accordingly rotate the type carrier and thus juxtapose any one of the type bars of either group at the printing point. A type bar actuator 48 which is always in alignment with the printing point, is also operable to actuate the juxtaposed type bar against a platen 49 to print through a ribbon 50 and against a work sheet, not shown, on said platen, each type bar being provided with a lower case type 51 and an upper case type 52.

Figure 4:
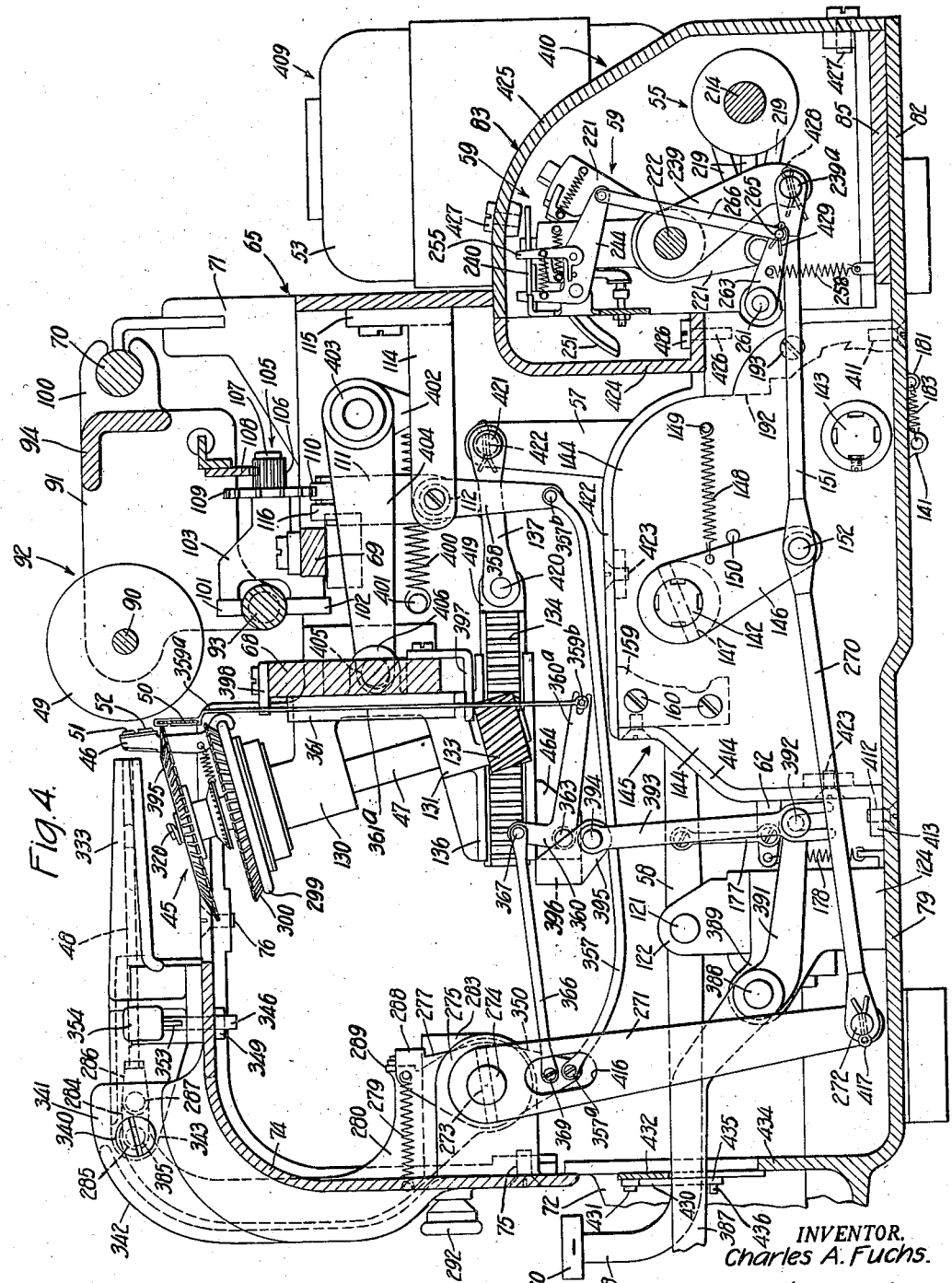
Fig. 4 is a vertical section of the machine taken approximately on the line 4—4 of Fig. 6.

A continually running power means includes a motor 53, located at the rear of the machine, a shaft 54 of which, Fig. 7, is connected to a driving device 55, see Figs. 4 and 22 also, which may be connected to operate any one of a plurality of selectable intermediate devices 56. These intermediate devices are operable individually to actuate a variably movable device including an arm 57 connected to rotate the shaft 47 to juxtapose the selected type bar at the printing point.

The intermediate devices 56 are also divided into two sets A' and B', the set A' including all of the intermediate devices to the left of the middle of the machine and the set B' including all of those to the right of the middle of the machine, the devices 56 of both sets having key levers 58 associated therewith representing characters corresponding to those of the types on the type bars of the two sets A and B.

Figure 5:
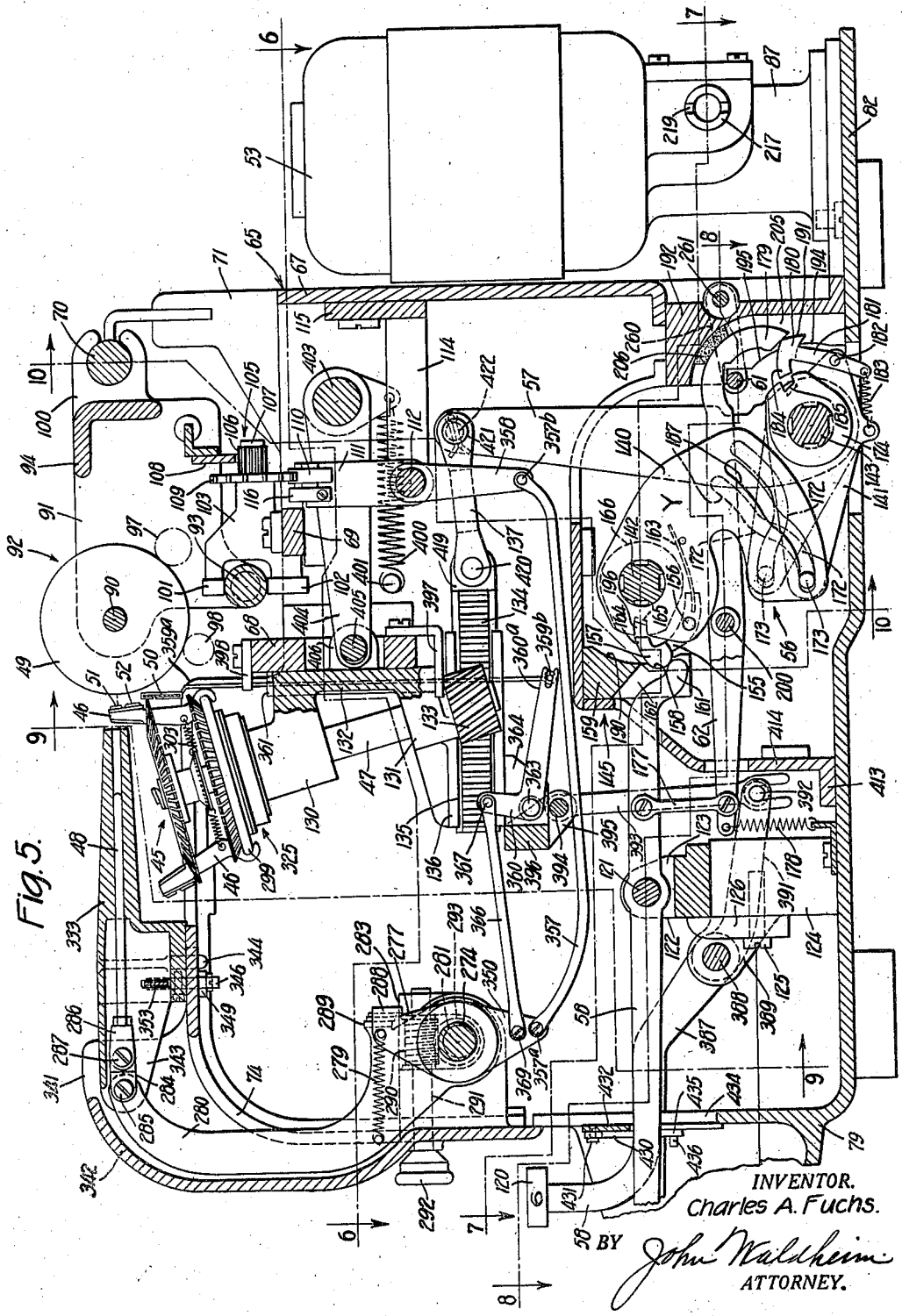
Fig. 5 is a vertical central section of the machine, taken approximately on the line 5—5 of Fig. 6.

A single clutch 59, Fig. 4, is utilized, in the present invention, to render effective the power means to actuate the variably movable device which includes the arm 57, the extent of motion of said arm 57 being predetermined by the various shapes of cams 60, of the intermediate devices 56, the direction of actuation of the arm 57 being also determined by the shapes of the cams 60 as hereinafter more clearly described. A single universal bar 61, Fig. 5, is operable by key operated levers 62 each of which is operable by an associated key lever to connect the selected intermediate device 56 with the power actuated driving device 55 to accordingly actuate the type carrier 45. After the selected type bar has been juxtaposed at the printing point it is accurately aligned, vertically, by the type bar actuator 48 in a manner hereinafter described, the type bar actuator being also operated by the driving device 55. After each printing operation the clutch 59 is automatically rendered ineffective to disconnect the type carrier actuating means from the continually running driving device 55 of the power means.

A more detailed description of the construction and operation of the machine will now be given.

Frame

The machine includes a main frame 65 having two side walls 66, a rear wall 67, two cross bars, 68 and 69, suitably secured to said side walls, and a rail 70 supported on brackets 71, one on each of the side walls 66. Each side wall has a forward extension 72, these being connected at their forward ends by a cross bar 73, Figs. 1 and 8. A combined front and top plate 74 is detachably secured to the side walls 66 by screws 75 and 76 threaded into lugs 77 and 78 on side walls 66.

Figure 3:
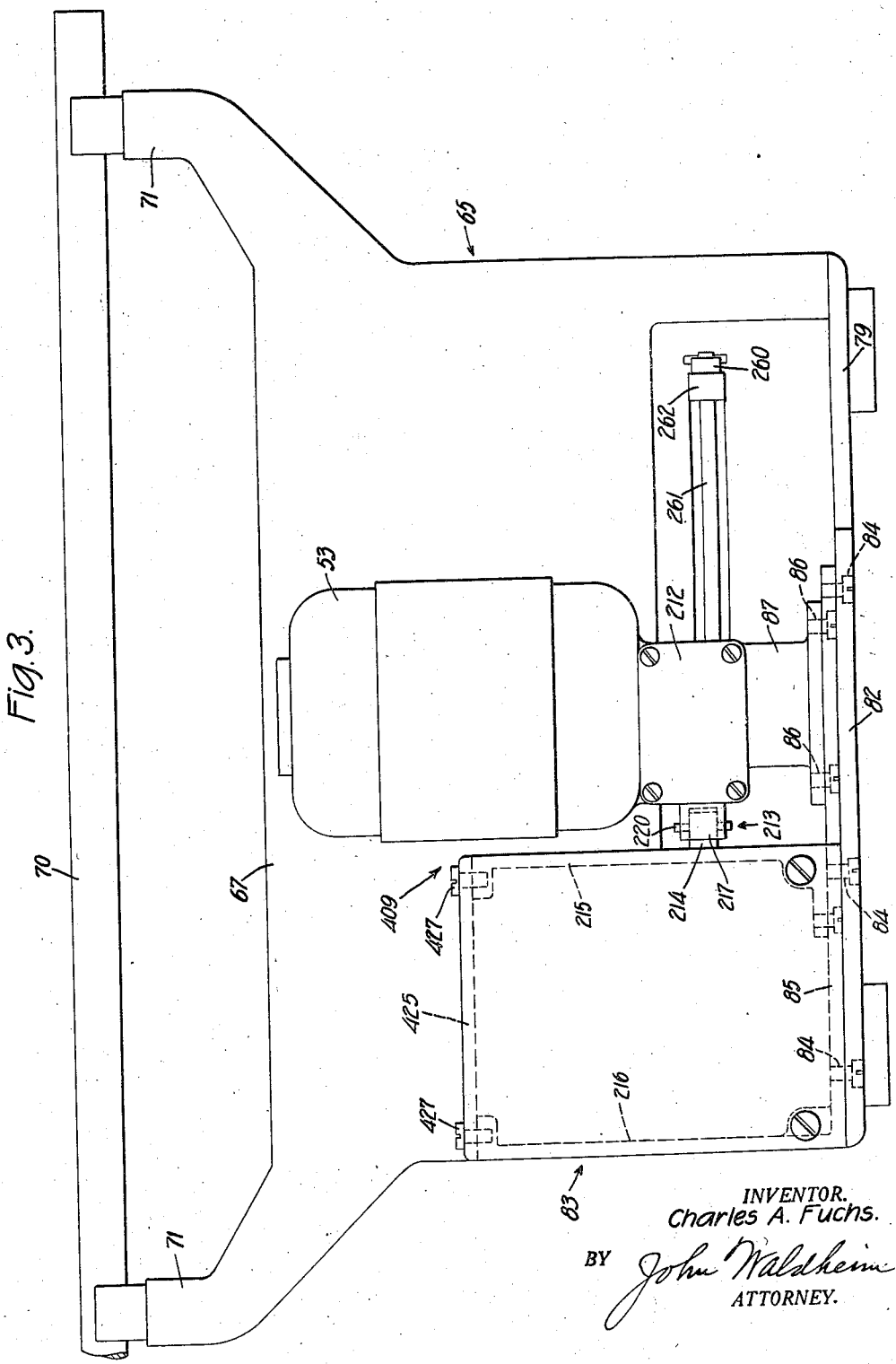
Fig. 3 is a rear view of the machine, without the carriage thereon.
Figure 6:
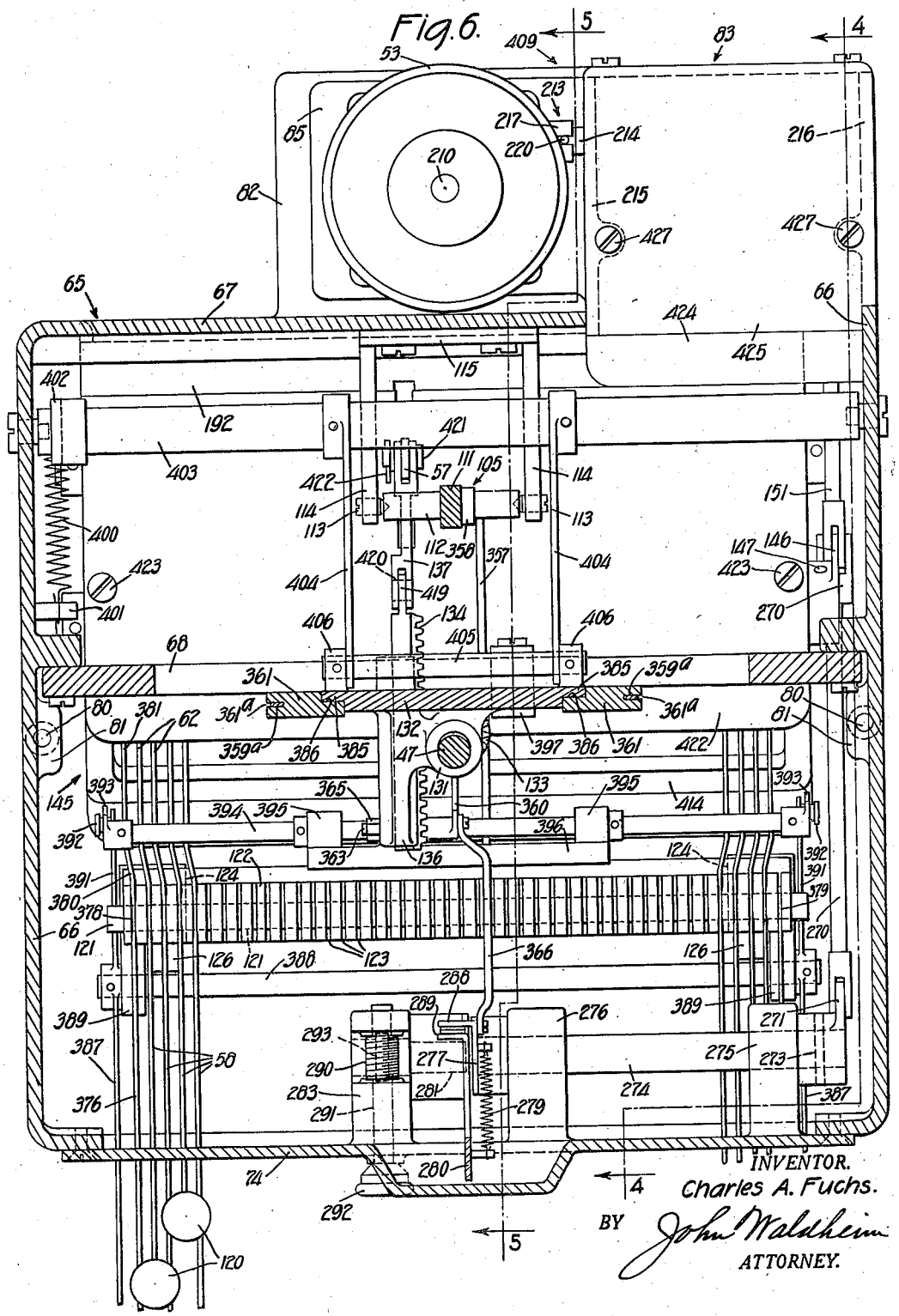
Fig. 6 is a top plan view taken on the line 6—6 of Fig. 5.

A base 79 is also detachably secured to the main frame 65 by means of screws 80 threaded into lugs 81 of the side walls 66, Figs. 1, 6 and 9. The base plate 79 has a rear extension 82, Figs. 1 and 3, to support a casing 83 containing the driving device 55 and the clutch 59, said casing being secured to said extension by screws 84 threaded into a bottom plate 85 of said casing 83. Said extension of the bottom plate extends beyond one end of the casing 83, as seen in Fig. 3, and has secured thereto the motor 53 by screws 86 threaded into a pedestal 87.

Carriage

The platen 49 is supported by a shaft 90 mounted to rotate in end plates 91 of a carriage 92; said end plates being connected to each other by a guide bar 93 and an angle bar 94. The work sheet, not shown, may be inserted around the platen from the rear thereof over a paper table 95 having an apron 96 to guide the work sheet around the platen to the printing line at the front thereof. Feed rollers 97 and 98 may be supported on the carriage in any well known manner to assist in feeding the work sheet around the platen.

The carriage 92 moves from side to side of the machine and is urged in a letter space direction by the usual spring drum, not shown. It is supported at its rear end by lugs 100 formed on the bar 94 and engaging the rail 70, and at its front end by a roller 102 with which the bar 93 engages. A guide roller 101 holds the bar 93 on the roller 102. The rollers 101 and 102 are supported on a fixed bracket 103 secured to the cross bar 69 at the middle of the latter.

Escapement

The letter feed movements of the carriage 92 are effected by escapement mechanism, indicated generally by the numeral 105, Figs. 5 and 6, which is operable by the motor 53 in a manner hereinafter described. Said escapement mechanism includes a pinion 106 pivotally supported by a stud 107 on the fixed bracket 103, said pinion being driven by a rack 108 suitably supported on the carriage 92. The stud 107 has also supported thereon, and independently of the pinion 106, an escapement wheel 109 having the usual one way driving connection, not shown, with said pinion. The escapement wheel is normally held by a loose dog 110 pivoted on a dog rocker 111, the latter being rigid on a shaft 112 pivotally supported by studs 113 threaded into arms 114 of a fixed bracket 115, the latter being secured to the rear wall 67 of the main frame. The dog rocker 11 is reciprocable, in a manner hereinafter described, to cause the loose dog 110 and a fixed dog 116 to alternately engage the teeth of the escapement wheel 109 to effect the letter space movements of the carriage.

Key levers

Figure 36:
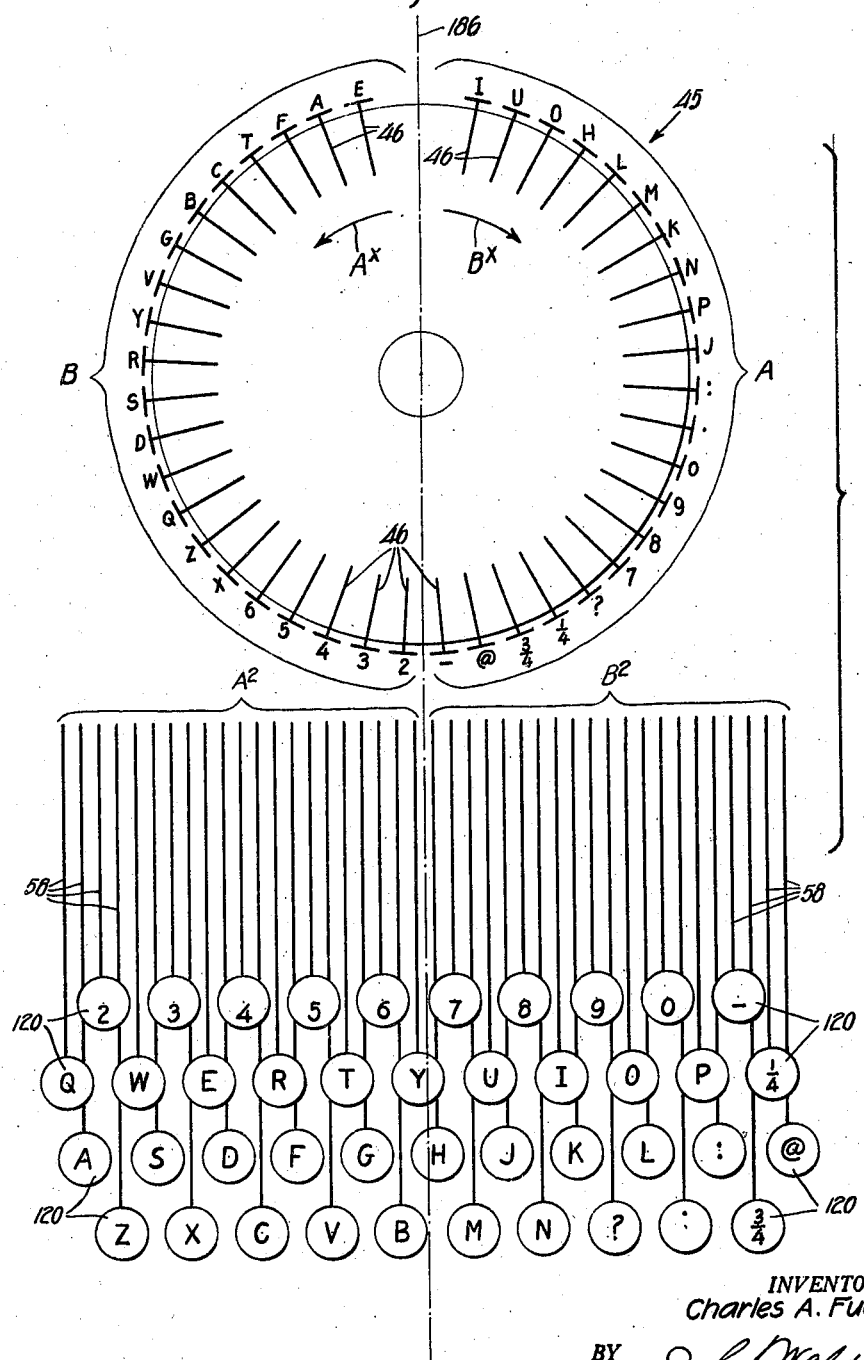
Fig. 36 is a diagrammatic view illustrating the arrangement of the types on the type bar carrier with respect to the arrangement of character keys in the key board.

There are forty-two key levers 58, Figs. 1, 8, and 36, one for each of the type bars 46 of which there are also forty-two, see also Fig. 24. These key levers are provided at their forward ends with character keys 120 arranged in four banks in the key board. All of the key levers are supported to swing about a fulcrum rod 121, supported in a bar 122, Fig. 9, having slots 123 therein by which the key levers are guided. The fulcrum bar 122 is supported on two posts or standards 124 to which said bar is secured by screws 125 which pass through lugs 126 of said bar and are threaded into the posts 124.

Actuating mechanism for type bar carrier

The mechanism to actuate the type bar carrier 45 includes the drive shaft 47, Fig. 4, which is rotatably supported in bosses 130 and 131 of a bracket 132 supported on the cross bar 68 of the machine frame. To the lower end of the shaft 47 is secured a pinion 133 operable by a rack 134 which may be moved fore-and-aft of the machine in a slot 135 of an extension 136 of bracket 132, said rack being connected to the arm of lever 57 by a link 137, which lever is movable in either direction, forwardly or rearwardly of the machine, from its normal position in Fig. 5.

Selectable motion determining devices for type bar carrier

The extent of movement of the arm 57 and consequently the extent of rotation of the type bar carrier 45 is determined by the intermediate or motion determining devices 56 as previously stated. Each of these devices 56 includes a cam or motion determining element 140 and an arm 141 actuable thereby, the cams 140 and the arms 141 being loosely supported on rock shafts 142 and 143 respectively, said rock shafts being supported at their opposite ends in side walls 144 of a casing 145, as in Figs. 4 and 10, secured to the base plate 79.

The rack shaft 142 has secured thereto an arm 146, Fig. 4, at its right hand end, by a pin 147 and is held in its normal position, Figs. 4 and 5, by a spring 148 connected at one end to the arm 146 and at its other end to a fixed pin 149, said arm being arrested by a stop 150 on the side wall 144. The rock shaft is caused to reciprocate, at each actuation of any one of the key levers, by means, hereinafter described, including a link 151 connected to the arm 146 by a pivot stud 152.

Since the cam elements 140 are all loose on the shaft 142 the shaft may be actuated independently of any one of them. Said cams may be connected individually to the rock shaft 142 by means responsive to the actuation of the associated key lever 58. This means includes connecting devices or dogs 155, Fig. 29, one pivoted on each cam by a stud 156, each dog having a head 157 normally engaging in a transverse groove 158 of a bar 159 which bar is supported between the side walls 144 by screws 160, Fig. 4.

Figure 27:
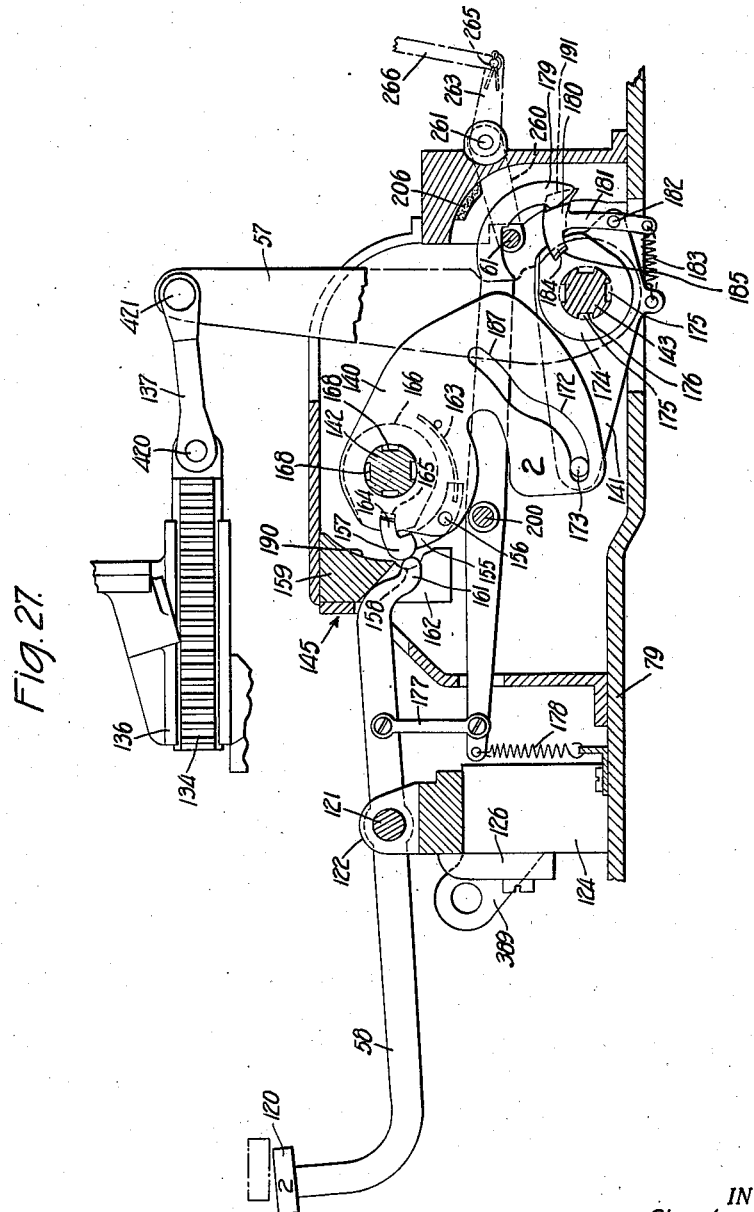
Fig. 27 is a skeleton, sectional side view, showing a key lever actuated and the associated cam and cooperative arm connected to their respective rock shafts. A sub-lever is also shown actuated to operate the mechanism by which the clutch is rendered effective.

While the key lever is being actuated a cam-like nose 161 thereon, Fig. 27, which is guided in a slot 162 of the bar 159, Figs. 5 and 7, engages the head 157 of the dog or pawl 155 to swing the latter about its pivot 156 against the action of a return spring 163, to thus cause a tooth 164 of the dog or pawl 155 to engage in a notch 165 of a driving member 166, as in Fig. 27. The member 166 is supported by the shaft 142 and is connected to rotate therewith by teeth 167, see Figs. 12 and 35, engaging in axial slots or grooves 168 of the rock shaft or general operator 142. Consequently when the shaft is rocked the connected cam 140 is actuated therewith, as in Fig. 28, to function as hereinafter described.

It will be understood that there is one driving member 166 for each cam 140 and that they are arranged each at the side of its corresponding cam, as shown in Figs. 10 and 12, and that the cams and their driving members are held endwise on the shaft 142 by two bosses 169 one on each side wall 144, and a spacer collar 170, the latter providing a clearance space for the lever 57 which extends upwardly between two of the cams 140. The cams 140, dogs 155 and driving members are symmetrically arranged at opposite sides of the middle of the machine and the shaft 142 is held against endwise movement by the arm 146 secured to one end thereof and a collar 171 secured to the opposite end of said shaft.

Each cam or cam element 140 has a cam slot 172, Fig. 5, which engages a follower 173 on the free end of the associated arm 141 to actuate said arm about the axis of the rock shaft 143. All of the arms 141 are loosely mounted on the shaft 143 similarly to the cams 140 on the rock shaft 142 and each arm has adjacent thereto, on the rack shaft 143, a driving member 174, see Figs. 13 and 35, having teeth 175 extending into axial slots or grooves 176 of the rock shaft 143.

The arms 141 are all normally disconnected from the rock shaft 143. Upon the actuation of each key lever 58, however, the corresponding sub-lever 62 is operated thereby through a link 177 against the action of a return spring 178. The rear end of the sub-lever is also provided with a cam-like nose 179 which engages a head 180 of a dog or pawl 181 to swing the latter about its pivot 182 on the arm 141, and against the action of a return spring 183, to cause a tooth 184 of said pawl 181 to engage in a slot 185 of the associated connecting or driving member 174, thus connecting the arm of intermediate element 141, associated with the selected cam 140, with the rock shaft 143.

It will be understood that during the latter part of the actuation of the dogs 155 and 181 or, in other words, after they have entered the slots 165 and 185, the universal bar 61 is actuated to render the clutch 59 effective so that the rock shaft 142 may be reciprocated by the motor 53. Thus after the pawls 155 and 181 are actuated by the depression of the key lever 58 the rock shaft or general operator 142 is actuated from the position in Fig. 27, to the position in Fig. 28, to actuate the connected cam 140 and thereby actuate the rock shaft or variably movable element 143 through the medium of the arm 141 connected to the cam 140, and also actuate the lever 57 which is connected to the shaft 143 by teeth 186, Fig. 13, engaging in the grooves 176 of said shaft, said lever 57 being effective to rotate the type bar carrier 45, by the means hereinbefore described, to juxtapose the type bar at the printing point the character of which corresponds to the character of the active key lever.

Instead of a single arm 141 two arms 141ª may be used with each cam element 140, Fig. 14, and the follower 173ª may be located between them. Also the element 174 and the pawl 181ª may be located between said arms 141ª.

*Construction of cams*

There are as many cam elements 140 as there are type bars, forty-two being shown in the drawings, and the cams are equally divided into two sets or groups, those of the one group being included in the set or group A' of Fig. 10, of intermediate or selectable devices 56, those of the other group being included in the other set or group B' of intermediate devices 56. The cam elements 140 of group A' are similar except that the cam slot 172 of each cam element differs from those of all of the other cam elements in the same group so that each cam element of the group may impart a movement to the arm 57 in the same direction from its normal position through an angular distance commensurate with the angular distance of the corresponding type bar, in group A, Fig. 36, from the printing point which is on a vertical, fore-and-aft plane represented by the line 186. It will be understood that although the extent of movement imparted by each cam 140 of the group A' to the left of the machine differs from the extents of movement which may be imparted by the other cam elements, they all cause the type carrier 45 to be actuated in the same direction, in the direction of arrow A× at left in Fig. 36.

The cam elements 140 of group B', at the right of the machine, are also constructed with variations of the cam slots with respect to each other, so that each cam is effective to impart a movement to the type carrier to juxtapose one of the type bars of group B at the printing point. The cam slots 172 of the cams 140 of group A' differ from those of the cams in group B' in that they extend in opposite directions from the axis of the rock shaft or reciprocable device 142 and cause the rock shaft 143 to be actuated in a clockwise direction, from its normal position, Fig. 5, through the medium of the arms 141, to thus juxtapose any one of the type bars of group A at the printing point. The slots of cams 140 in group B cause the rock shaft 143 to be moved in a counter-clockwise direction from its normal position in Fig. 5, to thus juxtapose any one of the type bars of group B at the printing point.

The cam slots 170 are all designed to impart harmonic motions to the arms 141 to thus gradually start the rotation of the type carrier from its position of rest and to gradually bring it to a position of rest with the selected type bar juxtaposed at the printing point.

The selected cam is reciprocated once in each cycle of the machine and during its return stroke returns the rock shaft 143 and the type carrier to normal, through the medium of the arm 141 associated with the active cam. It will be understood that each cam during its return stroke also imparts harmonic motion to the type bar carrier to gradually start it from its operated position and gradually arrest it in its normal position. Because of the shapes of the cam slots in the cam elements 140 the type carrier is also noiselessly arrested in its printing positions and in its normal position.

Each cam 140 also has a dwell 187 which is reached by the follower 173 after the type bar carrier has been arrested with the selected type bar juxtaposed at the printing point, and this dwell permits a further movement of the rock shaft 142, with the cam, to cause the type bar actuator 48 to press the juxtaposed type bar against the platen to print in a manner hereinafter more clearly described.

*Arrangement of cams with respect to positions of types*

It should be understood that the cams 140 are not arranged in uniformly increasing order, with respect to the extent of motion imparted thereby, from the middle to the sides of the machine so that the cams imparting the smallest throw are at the middle of the machine while those imparting the largest throw are at the sides of the machine, but they are arranged irregularly with respect to the extent of motion imparted thereby and are shaped to impart extents of motion commensurate with the angular distances of their corresponding type bars from the printing point, the type bars being arranged in accordance with their frequency of use with respect to the printing point, the ones most frequently used being nearest the printing point so as to require a short travel of the type bar carrier to juxtapose any one of these type bars at the printing point. Thus it will be understood that with this arrangement of characters on the type bar carrier it requires less work of the motor to operate the type bar carrier than it would if the characters most frequently used were located farther away from the middle thereof, or, in other words, if the types were arranged on the type bar carrier in the same lateral order as the corresponding character keys 120. Accordingly, the types on the type bars in group B may be arranged in the order "E", "A", "F", etc., to "2" as in Fig. 36, starting at the left of the printing point and extending approximately half way around the type carrier. The types on these type bars of group A may be arranged in the order of "I", "U", "O", etc., to the dash mark (—) progressing on the other half of the type bar carrier, from the printing point. It will be observed that the character keys 120 and their respective key levers 58 corresponding to the type bars for the types "A" and "E" are located near the left hand side of the group A² of key levers and that the character keys and the key levers corresponding to the type bars having the types "I" and "U" thereon are also distances from the middle of the machine which do not correspond with the order of arrangement of their respective type bars.

Thus it will be understood that the lateral arrangement of the type bars with respect to each other need not correspond with the lateral arrangement of the key levers with respect to each other and that the type bars may be arranged in accordance with the requirement of a customer. As shown the vowels are arranged as near as possible to the printing point. At each side of the group of vowels there is arranged a group consisting chiefly of consonants and at the side of one of these latter groups is arranged a group of numerals, while at the side of the other consonant group is a group of characters consisting of numerals and signs.

It will further be understood that in some classes of work the numerals or other characters than those above mentioned may be most frequently used. In this event the type bars bearing the numerals may be assembled on the type shuttle nearest the printing point, and the vowels and consonants may be located farther away from the printing point. The cams 140 must also be rearranged axially on the shaft to actuate the type bar carrier through the proper angular distances. For example, if the type bars having the types "4" and "5" are located in the middle of the machine, the cams previously used with the type bars having the types "E" and "I" must be used respectively with the key levers having the characters "4" and "5".

*Means to hold connecting dogs effective*

It will be remembered that the cams do not only actuate the type carrier 45 to its printing positions, but also return said carrier to its normal position. Provision is accordingly made to prevent disconnection of the active cam 140 and its associated arm 141 from their respective shafts 142 and 143 until the type shuttle 45 has been returned to normal. To this end the head 157 of any one of the dogs 155 is adapted to ride on a curved surface 190 of the bar 159, Figs. 5 and 28, after it leaves the groove 158 to keep the tooth 164 in the slot 165 of the member 166. As soon as the active cam returns to normal the slot 158 permits the actuation of the dog 155 in a counter-clockwise direction about its pivot 156 by the action of the spring 163 to withdraw the tooth 164 from engagement with the driving member 166 and thus disconnect the cam 140 from the rock shaft 142.

Similarly the heads 180 of all of the dogs 181, which normally engage in a groove 191 of a bar 192 extending transversely of the machine and secured to the side walls 144, Fig. 4, by screws 193, ride on the curved surface 194 below the groove 191, to hold the tooth 184 of the active dog 181 in the slot 185 of active driving member 174. There is also provided a similar curved surface 195 above the groove 191 for engagement by the heads 180 of the pawls which are carried in a counter-clockwise direction, from their normal positions, by their supporting arms 141. As soon as the active arm 141 is restored to its normal position the head 180 of the dog carried thereby reenters the groove 191 under the action of the return spring 183. This releasing action of the dog 181 occurs simultaneously with the disengaging action of the dog 155 of the cam.

It will be understood that the grooves 155 and 191, in which the heads 157 and 180 of the connecting dogs engage, serve also to prevent accidental displacement of the cams 140 and the arms 141 from their normal or home positions.

It will be observed that the heads 180 of the dogs 181 have sharp corners. The object of this construction is to permit the head 180 of each dog to enter on the curved locking face immediately upon the slightest movement of the dog away from the groove 191 in a direction about the axis of the shaft 143, so that the active dog may become locked when the arm 141 having the smallest angular movement is actuated.

The teeth 164 and 184 of the dogs 155 and 181 are wider than the body portions of said dogs so that said teeth may engage also in slots 196 and 197 of the cams 140 and arms 141 respectively. With this construction the pivots 156 and 182 of the dogs 155 and 181 respectively are relieved of undue strain while the cams 140 and arms 141 are functioning.

Sub-lever support, guide and stop

The sub-levers 62 are fulcrumed on a rod 200, Figs. 5 and 8, supported in the end walls 144 of the casing 145, said shaft 200 being held against endwise movement by collars 201, one secured to each end thereof. Each sub-lever is provided with a hub 203 which serves as a bearing and also to space the sub-levers the proper distance from each other. A sleeve 204 on the rod 200 separates the two sub-levers 62 at opposite sides of the shuttle actuating lever 57 and also spaces them the proper distance from each other. The rear ends of the sub-levers 62 are guided in separate slots 205 in the bar 192 and engage pads 206 composed of any suitable sound deadening material such as leather to noiselessly arrest the sub-lever in its normal position.

Power drive

As previously stated the motor 53 of the power drive is supported by the pedestal 87, Figs. 3 and 7, which is secured by screws 86 to the base plate 85. This motor includes an armature shaft 210, Fig. 7, having secured thereto a worm 211 which meshes with a worm wheel 211ª secured to the shaft 54 to rotate the latter. The worm 211 and worm wheel 211ª are located inside the pedestal 87, and access may be had thereto by removing a cover plate 212.

The shaft 54 is arranged horizontally in the machine and is located at the rear and near the lower part thereof. Said shaft is connected at one end by a coupling 213 with a crank shaft 214, of the driving device 55, rotatably supported in end walls 215 and 216 of the casing 83. The coupling 213 includes a hollow head 217 which may be integral with one of the shafts 54 and 214, herein shown on the shaft 54, said head receiving the end of the other shaft, said head having diametrically opposite slots 219 to receive opposite ends of a pin 220 in the shaft 214. Thus the crank shaft is driven by the motor.

The crank shaft 214, of the driving device 55 which is like that shown in my above mentioned application Number 3,910, may include one or more crank pins 218, Figs. 7, 21, and 22, each having attached thereto a connecting rod 219. Each connecting rod is connected at its forward end, by a stud 220, see Fig. 19 also, to a clutch element 221, all of said clutch elements being loosely supported on a rock shaft 222 to be oscillated, ordinarily, freely and continually thereon by the action of said rods 219. The shaft 222 is supported at its ends in the end walls 215 and 216 and may be rocked by any one of the clutch elements 221 in a manner now to be described.

Clutch

From the foregoing description it will be understood that the clutch elements 221 are continually reciprocated by the continually rotating crank shaft 214 through the medium of the connecting rods 219, that the crank pins 218 are spaced from each other equal angular distances about the axis of the crank shaft 214 so that the clutch elements 221 arrive successively at their foremost and rearmost positions at equally timed intervals, and that each clutch element, because of the harmonic motion produced by the crank shaft 214, is momentarily at rest while the corresponding crank pin passes over the dead center.

To connect the shaft 222 so that it may be rocked by any one of the clutch elements 221 each of said elements has associated therewith a cooperative clutch element 223, Figs. 19, 20, 21, and 22, secured to the rock shaft 222 by a pin 224. The clutch elements 221 are arranged each adjacent to its cooperative clutch element and the elements 221 are always in alignment with each other. Any one of the clutch elements 221 is connectable, while in its foremost position, with its cooperative element 223 to drive the latter and thus rock the shaft 222. To this end there is provided a connecting member in the form of a pawl or dog 225, pivoted by a stud 226, on a bracket 226ª secured to the clutch element 221. Each pawl 225 is ordinarily held, by a spring 227, with its upper end in the bottom of a slot 228 of a lip 229 on the clutch element 221, and while the dogs are in these positions the driving clutch elements 221, which are continually running, reciprocate idly back and forth.

Any one of the pawls or coupling members 225 may be swung about its pivot to its effective position, by means hereinafter described, to cause a lug 230 of the pawl 225 to engage in a slot 231 of a driven clutch element 223. The pawl 230 does not move entirely out of the slot 228 of the driving element 221, and consequently said pawl is braced while driving the clutch element 223. The connecting movement of the pawl 225 occurs while the driving element 221 is in its foremost position where, it will be remembered, the clutch element 221 is momentarily at rest due to its reversal of motion.

Only one of the pawls 225 is operable at a time and each has associated therewith to hold it in its connected position, while the coupled or connected pair of clutch elements are functioning, a locking dog 232, Figs. 21 and 22. Each locking dog has a lip 233 which, while the clutch element 221 is in its foremost position, is held clear of the connecting pawl 225 by a stop 234 adjustably supported on a fixed bracket plate 235 secured at its opposite ends to the end walls 215 and 216 of the casing 83. Each dog 252 is pivotally supported on the driving element 221 by a stud 236 and has an ear 237 which is normally held against the stop 234 by a spring 238 connected to the upper end of the dog.

Immediately after the connecting pawl 225 has been actuated, to connect the driven clutch element 223, the latter is moved in a clockwise direction, Fig. 21, thus taking the driven element 223 with it to rock the shaft 222 in the same direction. The shaft 222 has secured to its right hand an arm 239 by a pin 241. The link 151 is connected to the arm 239 by a pivot stud 239ª, to thus actuate the rock shaft 142 for the purpose of actuating the connected one of the cam elements 140 as previously described. As soon as this motion of the driving element 221 starts, from its normal position, the dog 232 swings in a clockwise direction, Fig. 21, under the action of the spring 238 to carry the lip 233 behind the pawl 225 to lock said pawl in engagement with the clutch element 223. Thus the connecting pawl 225 remains locked for practically a complete cycle of operations or in other words until the driving element 221 returns to its forward position as in Fig. 21. Just an instant prior to reaching this position the lip 237 reengages the stop 234 to start the withdrawal of the lip 233 from the path of the connecting pawl 225 to permit the latter to be returned or in other words to be swung out of engagement with the driven element 223, by the spring 238.

It will be understood that the clutch includes a plurality of sets of elements 221 and 223 so that connections between the motor 53 and the rock shaft 142 may be made in a shorter period of time than is possible with a single pair of clutch elements, to thus expedite the operation of the machine. The driving elements 221 reciprocate continually and rapidly and they arrive in their foremost positions successively in uniform phase relation due to their connections through the rods 219 with the crank pins 218 which it will be remembered are equally spaced about the axis of the crank shaft 214.

*Means to render clutch active*

To actuate one of the connecting pawls 225, which may be effected only while it is in register with the slot 231 of the corresponding clutch element 223, there is provided a slide 240, Figs. 19, 20, 21, and 22, extending transversely of all of the planes in which the clutch elements 221 operate, said slide being supported on a lip 241 of the bracket plate 235 by screws 242. The slide 240 is urged leftwardly, Figs. 19 and 22, by a spring 243, but is normally held back, in the position shown in Fig. 22, by a release lever 244 engaging the shoulder 240ᵃ, on the right end of the slide 240, Fig. 22. The lever 244 is pivotally supported by a stud 245, on an ear 246 of the bracket 235, about which it may be actuated in a counter-clockwise direction, Fig. 20, by means hereinafter described, operable by the universal bar 61, to withdraw the holding portion of the lever 244 from engagement with the slide 240, whereupon the spring 243 draws the slide leftwardly to actuate, through the medium of one of a series of fingers 247 thereon, the pawl 225 which registers with its slot 231 to move it thereinto. To prevent undesirable lateral displacement of said release lever 244 it is guided in a slot 248, Fig. 22, of an ear 249 formed on the bracket 235.

It will be remembered that the actuation of the pawl 225 to its connecting position takes place while the continually reciprocating clutch element 229, by which it is carried, is momentarily at rest due to its reversal of motion. At this time the other two driving clutch elements 229 are traveling idly. The slide 240 has three fingers 247 one for each connecting pawl 225 so that any one of clutch elements 229 may be connected with its cooperative clutch element 223.

After the slide 240 has actuated the pawl 225 to connect the driving clutch element 221 with the driven clutch element 223 the pawl 225 is carried away from the slide. It will be recalled that all of the driven clutch elements 223 are secured to the rock shaft 222. Consequently when anyone of them is actuated the other two are actuated therewith. The slide 240 is provided with a stop 250, carried by said slide, and engaging the left end wall 215 of the casing 83.

Shortly after the driven clutch elements 223 begin their rearward movement, a cam 251, Figs. 19, 21, and 23, secured to one of said driven clutch elements 223, engages a follower 252 on the slide 240 to push the latter back to normal against the action of the spring 243, thus permitting release lever 244 to snap over the shoulder 240ᵃ of the slide under the action of a spring 253, to hold it in its normal position. The cam 251 may then return to its normal position with the elements 225. Upon returning to normal the connection of the active one of the driving clutch elements 221 becomes disconnected from its cooperative clutch element 223, as hereinbefore described, by releasing the connecting pawl 225.

Repetition of the leftward movement of the slide 240 and resultant cycling of the machine is prevented in case the return of the slide release lever 244 is delayed by unduly holding the key lever 58 depressed. To this end there is pivotally supported on the release lever 244 a dog 255 by a stud 256, Fig. 20, said dog being normally held against a stop pin 257 by the action of the spring 253, the latter being connected at one end to said dog 255, and at its other end to the release lever 244. Thus with this arrangement, when the release lever 244 is actuated to move it out of the path of the slide 240 to release the latter, the dog 255 remains in contact with the back of the slide, and it leaves the stop pin 257 against the action of the spring 253.

It will readily be understood that when the slide 240 is restored to normal by the cam 251 while the release lever 244 is still in its actuated position, the dog 255 snaps over a shoulder 259, Fig. 22, of the slide, due to the action of the spring 253, to hold the slide while the cam 251 returns to normal and until the release lever 244 returns to normal to hold the slide. While the release lever 244 is being returned, by means including a return spring 258, Fig. 20, the pin 257 on said release lever reengages the dog 255 to move the latter out of the path of the shoulder 259 of the slide 240. This does not occur, however, until the release lever has reentered the path of the shoulder 240ᵃ on said slide. It will be understood that the active connecting pawl 225 is rendered ineffective to disconnect the driven clutch element 223 from the active driving element 221 irrespective of the position of the release lever 244, and that therefore repeated cycling of the machine is prevented while the key lever is unduly held in its depressed position.

From the foregoing it will be understood that by connecting any one of the clutch elements 221 with the associated clutch element 223 the previously connected intermediate device 56 (cam 140 and arm 141) may be actuated to operate the lever 57 from its normal position to rotate the pinion 133 and thus rotate the type carrier 45 to position the corresponding type bar of the type carrier at the printing point.

*Actuating means for release lever of clutch slide*

The mechanism which actuates the release lever 244 to render the clutch effective includes the universal bar 61 which, it will be remembered, is operable by any one of the sub-levers 62. Said universal bar 61 is supported by two arms 260, one at each end, secured to a rock shaft 261, see Figs. 5 and 8. The rock shaft 261 is supported in lugs 262 on the rear of the bar 195 and has secured thereto, at its right hand end, an arm 263, see Figs. 4 and 20 also, to which is connected the return spring 258 which normally holds the universal bar 61 against a shoulder 264, Fig. 20, of the bar 192. While the universal bar is being actuated the rear end of the arm 263 moves upwardly to push a link 266 connected thereto by a pivot stud 265. The link 266 is connected, at its upper end, by a pivot stud 267, to the release lever 244 and consequently, while the link moves upwardly, it actuates the release lever 244 in a counter-clockwise direction, Fig. 20, to release the slide 240 as hereinbefore described. As soon as the actuated key lever is allowed to return the universal bar is restored to normal, by the spring 258, and thus the release lever 244 is returned to normal also.

*Operating linkages for type bar actuator*

The mechanism for operating the type bar actuator 48 includes a link 270, Fig. 4, connected by the stud 152 to the lower end of the arm 146 so that as said arm is swung forwardly through the medium of the link 151 to rock the cam supporting shaft 142, said link 270 is also moved forwardly to actuate an arm 271 in a clockwise direction, Fig. 4, the link 270 being connected to the arm 271 by a pivot stud 272. The arm 271 is secured at its upper end by a pin 273, Figs. 4, 6, and 15, to a rock shaft 274, supported in lugs 275 and 276 on the front plate 74.

By an inspection of Fig. 6, it will be seen that the link 270 and arm 271 are located at the right hand side of the machine and that the rock shaft 274 extends from this side to the middle of the machine. An arm 277 is secured to the inner end of the shaft 274 by a pin 278, see Figs. 4 and 15, and is connected by a resilient link or spring 279 to an arm or lever 280 to thereby actuate the latter in a clockwise direction about the axis of a reduced portion 281 of a shaft 282 which is supported by a lug 283 on the front plate 74. The upper end of the lever 280 pushes the type bar actuator or plunger 48 rearwardly through the medium of a link 284, to press the juxtaposed type bar against the platen to print as in Fig. 33, the link 284 being connected to the lever 280 by a pivot stud 285 and to a head 286 of the plunger 48 by a pivot stud 287.

It will be understood that the harmonic motion produced by the crank shaft 214 of the driving device 55 causes the type bar actuator 48 to exert great pressure against the type bar to print and to function with practically no noise. It will also be understood, see Fig. 4, that the carriage 92 is well braced by the guide bar 70 to withstand this printing pressure.

By an inspection of Figs. 4 and 6, it will be seen that the arm 277 has an abutment or ear 288 against which a similar abutment 289 of the lever 280 is held by the spring 279. Thus upon the return of the arm 271, by the power means, the arm 277 drives the lever 280 back to normal to return the type bar actuator from its printing position.

*Adjustment of type bar actuator in accordance with thickness of pack of work sheets around platen*

Micrometer adjusting means are provided for the type bar actuator 48 to compensate for different thicknesses of work sheets or packs of work sheets which may be introduced around the platen. This adjusting means includes a screw 290, Figs. 5, 6, and 15, secured to a shaft 291 supported in the lug 283. The shaft 291 has secured thereto a finger piece 292 by which the screw or worm 290 may be rotated, to thereby rotate a worm wheel 293 secured to the shaft 282. The reduced portion 281 of the shaft 282 is an eccentric which engages in a hole 294 in the lower end of the lever 280 and while rotating swings the lower end of said lever forwardly or rearwardly of the machine in accordance with the adjustment desired of the plunger 48. While the lever 280 is being actuated by the eccentric it swings about the abutment 288 of the arm 277, which abutment serves at this time as a fulcrum. Thus the upper end of the lever 280 is caused to move in a direction opposite to that of the end engaged by the eccentric to adjust the plunger 48 in accordance with the thickness of the work sheets.

It will be understood that in case the operator inserts a thicker work pack around the platen, and forgets to accordingly adjust the plunger 48, that the spring 279, which is comparatively strong, yields slightly to thus prevent straining of plunger 48 and the parts of the mechanism by which it is actuated on account of the fact that the power driven device 55, which has connecting rods 219 to actuate the arms 221, always moves through a constant distance. Consequently if the type bar actuator is arrested earlier, due to the thicker pack of work sheets, the spring 279 permits the arm 271 to move on to its extreme, operated position. This failure to properly adjust the plunger 48 results in heavier printing which is an indication that the plunger 48 is out of proper adjustment and may then be corrected.

*Structure of type carrier*

The shape of the type carrier 45 resembles the frustum of a cone and it includes two circular plates, 295 and 296, hereinafter referred to as upper and lower plates respectively, Figs. 9, 23, and 24. Said plates have oppositely disposed, tubular central sections 297 and 298, respectively, one section extending into the other and being permanently secured thereto in any convenient manner. The outer edge 299 of the lower plate 296 is semi-circular in cross-section and forms a common fulcrum for all of the type bars 46. Secured to the lower plate 296 is another circular plate 300 having radial slots 301 to assist in properly spacing the type bars from each other and to further assist in guiding the type bars during their operations. The upper plate 295 is provided with radial slots 302 to guide the type bars 46 near their upper or free ends. The type bars normally lie against the inner ends of the slots 302 and are normally held there by radially arranged springs 303, each connected to one of the type bars and to a flange 304 formed on the lower end of the tubular section 297. It will be understood that this type carrier, due to its construction is extremely light and consequently it is easy to operate especially with respect to the starting and stopping of its rotation.

The type carrier 45 fits onto a reduced portion 305 of the drive shaft 47, said reduced portion extending into the tubular portion 298. It rests upon a circular plate 306 having a hub 307 through which extends a pin 308 to secure said plate to the shaft portion 305. The plate 306 has thereon two lugs 309 and 310 extending into slots 311 and 312 respectively, in the lower plate 296, thus connecting type bar carrier 45 with the shaft 47 to be rotated by the latter.

*Demountability of type bar carrier*

The type bar carrier 45 is demountably supported, on the reduced end 305, Fig. 23, of the drive shaft, for the purpose of substitution by another type bar carrier having a different style of types. It is normally locked against the plate 306 and in engagement with the projections by a latch lever 315 pivoted on a pin 316 extending through the shaft portion 305. The latch lever has a nose 317 which normally extends over the upper edge of the tubular portion 298 where it is held by a spring 318 acting on the lever 315. The latch lever is located in a slot 319 of the shaft portion and is provided with a finger piece 320 at its upper end whereby the release lever may be actuated about the pivot pin 316, against the action of the return spring, until the nose 317 is clear of the upper edge of the tubular portion 298. The type carrier may then be lifted to remove it from the coupling projections 309 and 310 and from the shaft portion 305. After removal of the type bar carrier the nose carrying end of the latch lever 315 is pressed outwardly by the spring 318 until said latch lever is arrested by engagement of its lower end with the bottom of the slot 319.

To attach the type carrier to the drive shaft, no attention is given to the latch lever 315 but it is merely necessary to set an enlarged section 321 of the tubular portion 298 over the upper end of the shaft portion 305 and then push the type carrier down into its effective position. While the type carrier moves downwardly on the shaft section 305 the nose 317 of the latch lever 315 is engaged by an annular cam portion 322 to push it inwardly of the shaft section to thus permit the tubular portion 298 to pass downwardly on said shaft section. As soon as the type carrier is seated on the plate 306 the nose 317 snaps out over the upper edge of the tubular section 298, under the influence of the spring 318, to lock the type carrier on the projections 309 and 310.

It will be seen by an inspection of Fig. 24, that a larger space is provided between the two adjacent type bars nearest the printing point in the normal or home position of the type bar carrier. This space facilitates making erasures at the printing point and also gives a clearer vision of the typing at and near the printing point. To properly mount the type carrier on the shaft the operator should be careful to have this wide space between the type bars nearest the printing point. Provision is made, however, to prevent incorrect mounting of the type carrier. To this end the lug or projection 309 is of a slightly different shape than that of the projection 310, it being wider as shown in Fig. 24 thus permitting the type carrier to be attached to the drive shaft in only one position, the correct one. The corners at the upper ends of the lugs 309 and 310 are shaped to give easy entrance thereof into the apertures 311 and 312.

Thrust bearing for type bar carrier

To facilitate rotation of the type bar carrier 45 there is provided a thrust bearing 325, Fig. 23. Balls or rollers 326, of said bearing, are spaced from each other by a retainer 327, and are located between the plate or coupling element 306, which forms the upper race of said bearing, and a lower race 327, the latter being secured to the bearing portion 130, of the bracket 132, by screws 328. An annular shield 329 is secured to the upper race to protect the bearing from dust and other objectionable material.

Aligning means for type bars

After each type bar 46 has been juxtaposed at the printing point, by the means including the drive shaft 47, it is accurately aligned before printing. For this purpose the engaging end of the type bar actuator 48 has a slot 330 which is as wide as the thickness of the body of the type bar, and into which said body passes before the printing takes place. To facilitate entrance of the body of the type bar into the slot 330 the open end of the slot has divergent walls 331, and the edge of each type bar is pointed as at 332. The rod or type bar actuator 48 is guided in a bracket 333 which is firmly attached to the plate 74 of the machine frame in a manner hereinafter described. Thus it will readily be understood that should the type bar, after it is juxtaposed at the platen, be slightly out of vertical alignment with the printing point, this inaccuracy is corrected by the above described aligning means. It will be remembered that the selected type bar is juxtaposed at the printing point and the rotation of the type bar carrier stops as soon as the follower 173 reaches the dwell 187 of the cam element 140. While the follower 173 is riding on the dwell 187 the actuator 48 engages the juxtaposed type bar to align it in the manner above described.

Action of type bar actuator on type bar

Provision is made to insure uniform contact of the face of the active type against the platen. To this end the types 51 and 52 are formed on a comparatively thin type block 335 suitably secured to the body of the type bar. The free end of the type bar actuator is divided into two members 336 by the slot 330, and the forward ends of these members engage the face of the type block 335, near the opposite sides thereof, to press the active type against the platen and thus cause uniform contact of the type face with the work sheet around the platen. In Fig. 25, it will be seen that the rod 48 engages the block 335 in alignment with the lower case type 51. It will be understood, due to the fact the type bar carrier shifts upwardly for the other type 52, that the rod 48 engages the block 335 in alignment with said other type; in other words the type bar actuator 48 always engages the type block at a position in alignment with the active type thereon.

Swingable bracket for type bar actuator

The type bar actuator 48 is located above the type bar carrier 45 and accordingly the bracket 333 which supports the type bar actuator 48 may be swung upwardly and forwardly to carry the type bar actuator to an abnormal position so as not to interfere with the removal or mounting of the type bar carrier.

For this purpose the bracket 333 is pivotally supported by reduced ends of screws 340, Fig. 17, threaded into the walls 341 of a housing 342 on the plate 74, the reduced ends of said screws 340 engaging in apertures in flanges 343 of the bracket 333. The stud 285 which connects the lever 280 with the type bar actuator is substantially in alignment with the pivot studs 340 of the bracket 333 so that said actuator and said bracket may readily swing up and down together.

To prevent lateral displacement of the type bar actuator 48, which may otherwise result during the aligning action of the type bar, there are provided two pins 344, herein shown on the guide bracket 333, Figs. 17 and 18, and engaging in apertures 345 in the plate 74. It will be seen that the pins 344 are carried by extensions 344a of the bracket 333 so that they may be spaced a considerable distance from each other and from the pivot screws 340 to provide a desirable broad securement for the bracket 333.

The actuator guide bracket 333 is held against accidental upward displacement by two latch levers 346 supported by pivot studs 347 on the bracket 333, each latch lever having a nose 348 engaging under a keeper plate 349 secured to the plate 74 by a screw 350 extending through a slot 351 and threaded into the plate 74, the slots 352 being elongated to afford adjustment of the keepers 349 so that they may engage properly with the pawls 346.

The latch levers 346 extend each through slots 352 in the plate 74 and they are connected to each other by a bar 353. The bar 353 has a finger piece 354 by which said bar may be moved leftwardly in Fig. 18, against the action of a return spring 355, to actuate the latch levers 346 and release them from the keeper plates 349 so that the bracket 333 may be swung up about its pivots 340 as, and for the purpose, previously described.

The bar 353, when moved leftwardly in Fig. 18, may be arrested by a stop 356 which engages the right hand flange 343, and a stop pin 353 may engage the left hand flange 343 to arrest the bar 353 in its normal position. The noses 348 of the latch levers 346 and the edges of the keepers are shaped to permit said noses to readily move over the edges of the keepers while the bracket 333 is being swung to its lower or effective position. They are also shaped to draw the bracket tightly against the plate 74.

By an inspection of Fig. 17, it will be seen that the slots 345 and 352 are extended rearwardly of the pins 344 and pawls 346 sufficiently to provide clearance for said pins 344 and the pawls 346 while the bracket 333 is being swung up and down.

Escapement actuating mechanism

To reciprocate the dog rocker 111 and thus effect alternate engagement of the dogs 110 and 116 with the escapement wheel 109 to effect the feeding movements of the carriage, the arm 277 has a member 350, Fig. 5, to which is connected the forward end of a link 357 by a shouldered screw or stud 357ª. The rear end of the link 357 is connected by a pivot stud 357ᵇ to an arm 358 rigid on the shaft 112 of the dog rocker 111.

From the above it will be understood that each time the shaft 274 is reciprocated, by the power means, through the means including the links 151 and 270, as previously described, the link 357 is reciprocated to actuate the escapement mechanism through a complete cycle.

Ribbon vibrator and actuating mechanism therefor

The ribbon 50 is guided by the upper ends of two upwardly extending arms 359ª of a U-shaped frame 359, Fig. 9. The lower end of the U-shaped frame 359 is provided with a pin 359ᵇ which is engaged by the forked end 360ª of a bellcrank 360 whereby the U-shaped frame or ribbon vibrator 359 may be moved up and down during typing operations. Each arm 359ª is guided in a slot 361ª formed in the edge of a vertical block 361 secured to the cross bar 68 by screws 362.

The bell-crank 360 is pivotally supported by a stud 363 secured to a lug 364, of the bracket 132, by a nut 365. Said bell-crank is operable through the medium of a link 366 by the member 350 of arm 277, said link being connected at its rear end, by a pivot stud 367, to an arm 368 of the bell-crank 360, and at its forward end to the arm member 350 by a shouldered screw or stud 369. It will be remembered that the arm member 350 also actuates the escapement mechanism.

Space bar

Provision is made to actuate the escapement mechanism, by the power means, to effect the feed of the carriage, independently of the character key levers 58. To this end there is located in the key board a space bar 375, see Figs. 8 and 16, secured to the forward end of arms 376 and 377, both arms being pivotally supported on the key lever fulcrum rod 121, said arms being located in slots 378 and 379 respectively of bar 122. The arm 376 has a rearward extension 380 which, while the space bar is being depressed, moves upwardly to actuate a lever 381 through the medium of a link 382. The lever is similar to the levers 62 and is supported by and swings about the rod 200. The rear end of the lever 381 is not provided with a cam, as are the levers 62, but extends over the universal bar 61 to actuate it and thereby actuate the slide release lever 244, as previously described, to effect the actuation of the rock shaft 222 by the motor through the medium of the clutch 59. During this actuation of the rock shaft 222 the rock shaft 142 is actuated through the medium of arm 248, link 152 and arm 146, no cam 140 being connected to the shaft 142 at this time. The shaft 142 therefore moves independently of the cams at this time and consequently the type car carrier 45 remains in its normal position. The arm 146, however, actuates the link 270, arm 271 rock shaft 274, arm member 350 and the link 351 to actuate the dog rocker 111 of the carriage escapement, to thus effect a blank letter space of the carriage 92. The type bar actuator 48 moves idly, during this actuation of the rock shaft 274, and moves unobstructed into the space, see Figs. 9 and 24, between the two type bars which are normally nearest the printing point.

Case shift

As previously described there are two types, an upper case type 51 and a lower case type 52, on each type bar. The normal relation of the type carrier with respect to the platen is such that the lower case types 51 may print. To condition the machine for printing with the upper case types 52 provision is made to shift the type bar carrier 45 vertically upward. Thus the bracket 132, upon which the type bar carrier is supported is shiftable from the position in Fig. 5, to the position in Fig. 34, and is guided by flanges 385 thereon, Figs. 6 and 9, engaging in slots 386 formed by the blocks 361 and bar 68.

To case shift the type bar carrier 45 there are provided two shift key levers 387, Figs. 2, 8, 9, and 34, extending forwardly from a rock shaft 388 to which they are secured, the rock shaft being supported in lugs 389 on the standards 124. The forward ends of the shift levers 387 have thereon keys 390 by which the corresponding shift lever may be depressed to rock the shaft 388. Each shift lever 387 has also a rearwardly extending arm 391 provided with a headed stud 392, the studs of both arms pushing jointly upward, on arms 393 extending downwardly from a shaft 394, while either one of the shift keys is being depressed. The shaft 394 is supported in lugs 395 of a cross bar 396 forming part of the bracket 132 by which the type bar carrier is supported. Consequently as the arms 393 move upwardly the shaft 394 is carried upwardly thereby to shift the bracket 132 and thus carry the type bar carrier 45 to its upper case position, Fig. 34, so as to permit printing with the upper case types 52.

The bracket 132 normally rests, in its lower case position, against a stop 397, Fig. 9, and is arrested in its upper case position by stops 398, see Fig. 34 also, the stops 397 and 398 being secured to the cross bar 68.

To facilitate the shifting of the type bar carrier to upper case position there is provided a counter balance spring 400, see Figs. 5, 6, 10 and 34, connected at one end to a stud 401 on the side plate 66 and at its other end to an arm 402 secured to a rock shaft 403. The spring normally tends to rotate the shaft in a clockwise direction in Fig. 5, and said shaft has secured thereto near the middle thereof, two forwardly extending arms 404 engaging a shaft 405 supported in lugs 406 on the back of the type carrier supporting bracket 45. Since the spring 400 tends to rotate the shaft 403 it accordingly tends to lift the bracket 132 through the medium of the arms 404. The total weight of the type carrier 45 and the bracket 132 is slightly greater than the upward action of the spring thereon, consequently the bracket normally rests on the stop 397 and returns to this position as soon as the shift key lever is permitted to return to normal. From the foregoing it will be understood that the spring 401 assists in shifting the type bar carrier to its upper case position and that the combined weight of the type carrier 45 and its supporting bracket 152 is sufficient to restore them to their normal positions, Fig. 5, against the action of the spring 400. Any convenient form of lock may be used to hold the shift lever 387 in its depressed position for an indefinite period of time.

It will be seen, by an inspection of Fig. 5, that the driving rack 134 is located above the key levers 58 and the cams 140, that the lever 57 extends upwardly from the shaft 143 and is connected at its upper end by the link 137 with the rear end of the rack, and that the drive shaft 47 extends upwardly from the rack 134 to the type bar carrier 45. This makes a compact and convenient arrangement of the parts. It will be understood that since the rack 134 is carried by the extension or guideway 136 of the bracket 132 it moves up and down with said bracket and that the link 137 permits freedom of this up and down movement of the rack relatively to the actuating lever 57 without disturbing the latter.

Unit assembly

For convenience of assembling in manufacturing the machine, and also to give quick and ready access to the various parts when it is necessary to make repairs after the machine has been in use, it is composed of a plurality of minor units, some of which, after assembly, may be attached to each other to form major units which major units may then be demountably connected to each other. Some of the minor units may be readily detached from the machine if desired without first detaching the major units from each other.

Figure 2:
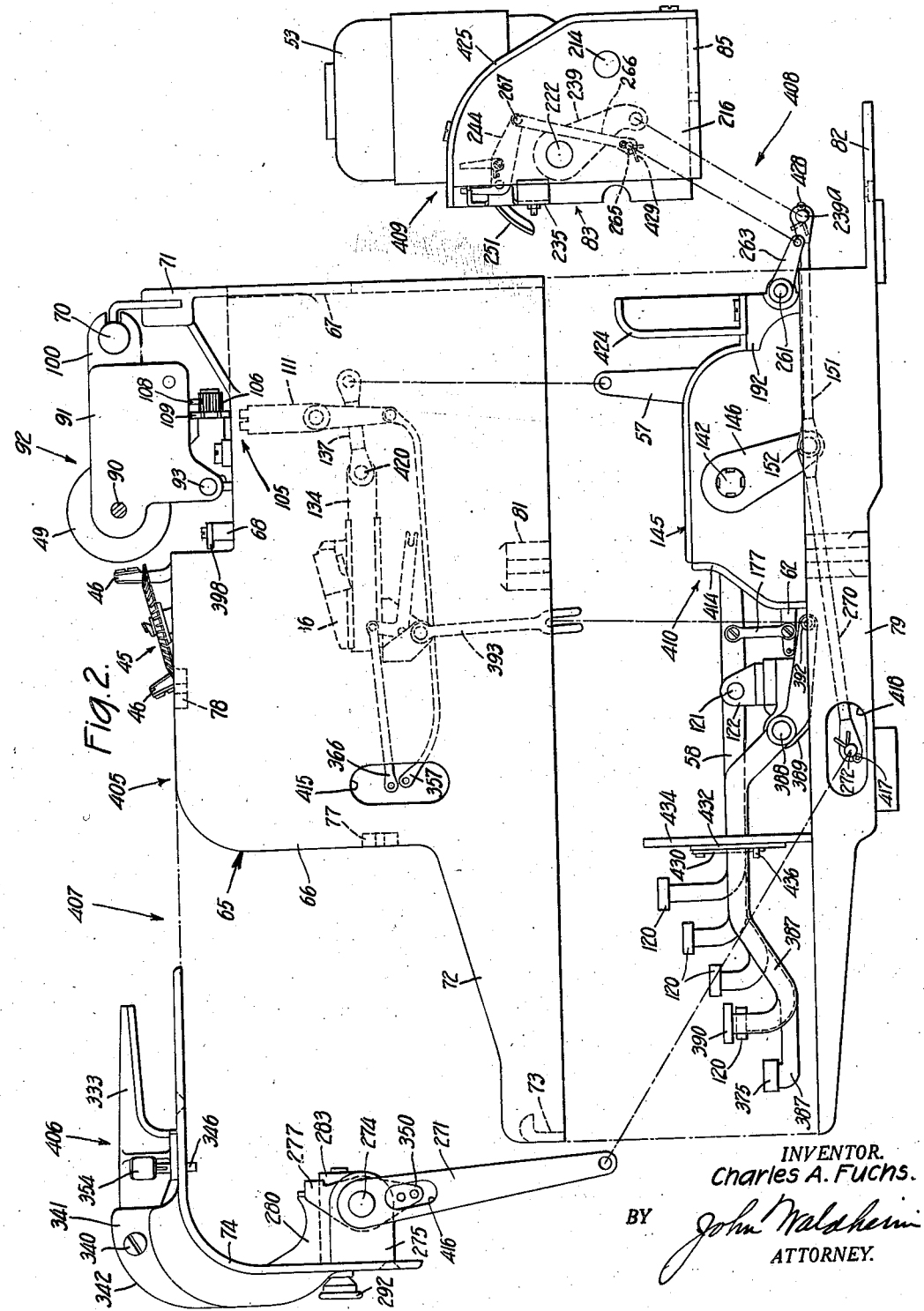
Fig. 2 is also an elevation of the machine showing the various units separated from each other.

Two of the minor units, 405 and 406, Fig. 2, constitute one major unit 407, the minor unit 405 consisting of the main frame 65 including the carriage 92, escapement mechanism including the link 357, the type bar carrier and actuating mechanism therefor including the link 137, and the ribbon vibrating mechanism including the link. The other minor unit, 406, consists of the plate 70, various parts supported thereon such as the type bar actuator 48, guide bracket 333, lever 280, rock shaft 274 and arm 271. It will be remembered that the plate 74 is held on the frame 67 by screws 75 and 76 as in Fig. 1.

The other major unit, 408, Fig. 2, consists of a minor unit 409 which includes a housing within which is supported the driving device 55 and the clutch 59, and the motor 53 which is secured to the base plate 85 of said housing, Fig. 3, the minor unit 409 being secured to the extension 82 of the base 79 by the screws 84, the base plate constituting another minor unit of the major unit 408. The latter includes still another minor unit 410, which is composed of the casing 145 and the parts supported thereby, the casing being detachably secured to the base 79 by screws 411, Fig. 4, threaded into the cross bar 192, and screws 412 threaded into a flange 413 of a front plate 414 which forms a closure of the casing 145.

After the minor units 405 and 406, and the minor units 409 and 410, have been assembled to form the major units 407 and 408 respectively, the major unit 407 is placed on the base unit 408 and these two units are then secured to each other by the screws 80. The escapement actuating link 357 and the ribbon vibrating link 366 are then attached to the arm 350 by the screws 357ª and 369, respectively, the side plate 66 and arm 271 being provided with apertures 415 and 416 respectively, Fig. 1, through which a suitable tool, such as a screw driver, may extend to attach the screws 357ª and 369. Similarly the link 270 may be attached to the arm 271 by the readily detachable stud 272 which is held in place by a cotter pin 47. Access to said cotter pin may be had through a slot 418 in the base plate 79.

The rack actuating link 137 is forked at its forward end, Figs. 5 and 6, to receive a lug 419 on the rear end of the rack 134 and it is pivotally connected to said lug by a pin 420 which is driven into said lug. The rear end of the link 137 is also forked to receive the upper end of the lever 57 and said link is pivotally connected to said arm by a stud 421 having a head at one end thereof and a cotter pin 422 in a hole at its other end to hold it in place and to facilitate removal of said stud for the purpose of detachment of the link 137 from the arm 57. The lower ends of the arms 393 forming part of the case shifting means are forked to straddle the studs 392 while the upper major unit 407 is being placed on the base unit 408.

It will be understood that in order to detach the upper major unit 407 from the base unit 408 it is merely necessary to remove the screws 357ª and 369, and the pins or pivot studs 272 and 421, and also the screws 80. This gives access to the parts supported on the base plate 79. To gain access to the cams a cover plate 422, Fig. 4, may be removed from the casing 145, said cover plate being secured by screws 423, Fig. 4.

The mechanism of the minor unit 409 is enclosed in a casing which includes the side walls 215 and 216, Fig. 3, a front plate 424, Fig. 4, and a combined top and rear plate 425, said front plate being supported on the bar 192 and being secured thereto by screws 426. The plate 425 is secured to the side walls by screws 427 and may readily be detached to give access to some of the mechanism of the minor unit 409. For example, the plate 425 is detached to give access to the cotter pins 428 and 429 so that they may be withdrawn from the connecting pins 239ª and 265 when it is desired to disconnect the links 151 and 266 from the arms 248 and 239 prior to detaching the minor unit 409 from the base 79.

Key lever lock

As previously explained while a key lever is being depressed the corresponding cam connecting dog 155 is actuated thereby to cause the tooth 164 to engage in the notch 165 of the driving member 166. It will be remembered that all of the members 166 are connected to the rock shaft 142 and rotate therewith. Consequently as soon as the rock shaft starts to drive the connected cam 140 through the medium of the dog 155, the slots 165 of the other members 166 move out of register with the teeth 164 of the corresponding dogs 155 thus locking said pawls and their associated key levers against actuation until the rock shaft 142 returns to normal. Thus the depression of any one of the other key levers is prevented while the machine is cycling.

It will also be remembered that the sub-lever 62 of the active key lever actuates the universal bar 61 during the latter part of the depression of the key lever. It would therefore otherwise be possible to carelessly depress two key levers simultaneously before the machine starts cycling and this would result in injury to the machine. Provision is made, however, to prevent the simultaneous depression of two key levers, and to this end there are provided pendants 430, Figs. 5 and 8, pivoted by headed studs 431 on a comb plate 432 having slots through which the key levers extend to guide them, said comb plate being secured, by screws 433, to a transverse rib 434 of the base 79. The pendants 430 extend downwardly between the key levers and are narrow to provide sufficient clearance to swing sidewise, about their pivots 431, slightly in each direction. The lower end of each pendant is enlarged to form a head 435; these heads may engage each other and the heads of the two end pendants may engage pins 436 fixed on the comb plate 432. When a key lever is depressed it engages the heads of the adjacent pendants and pushes all of the pendants to the right and left thereof transversely of the machine against the fixed pins 436 so that the entire space between said pins is occupied by the depressed key lever and the heads of the pendants. Consequently it is impossible to depress another key lever while there is one in its depressed position. In the event that the depression of the two key levers is accidentally started simultaneously they will continue only a short distance and not far enough to actuate the universal bar 61 because of the fact that it is possible to move only one key lever at a time through the series of pendants.

It will be understood that the rib 434, which supports the comb plate 432 on which the pendants 430 are pivoted, is rigid on the base 79 and that it extends up between the side walls 66 of the main frame. This arrangement facilitates the detachment of the two major units 407 and 408 without disturbing the key levers and the locking means therefor including the pendants 430, the key levers 58 being supported on the base plate, and the keys 120 thereof passing freely up into the key board section, formed by the extensions 72 and bar 73, of the machine, while the two major units are being assembled.

*Brief description of operation of the machine*

When the machine is to be used the motor 53, Figs. 3 and 4, may be started, in the usual well known manner, to run continually, to drive the crank shaft 214, Fig. 7, and thereby continually reciprocate the driving clutch elements 221, see Figs. 19 to 22 also, through the medium of the connecting rods 219. Any one of the key levers 58 may then be operated, to connect the cam 140 of its associated motion determining device 56 with the rock shaft or general operator 142 through the medium of the pawl or dog 155 operated by the active key lever. After the cam has been thus connected the movement of the active key lever continues and it is during this part of the actuation of the key lever that the slide 240, Figs. 19 to 22, of the clutch 59 is released by the actuation of the release lever 244, the actuation of the release lever being effected by the sub-lever 62 connected with the active key lever, the sub-lever 62 engaging the universal bar 61 to actuate the rock shaft 261 and thereby actuate the release lever 244 through the medium of the link 266 connected to the arm 263 which is rigid on the shaft 261.

The slide 240 is then actuated by the spring 243 to effect the connection of one of the driving elements 221 with its associated element 223, while the driving clutch element 221 is temporarily at rest in its forward position. The connected element 223 is then reciprocated to accordingly reciprocate the shaft 222. The shaft 222 during its reciprocatory movement, causes a similar motion of the rock shaft or general operator 142, through the medium of the link 151.

The previously connected cam 140 is thus reciprocated by the general operator 142 to thereby actuate its corresponding arm 141, the latter having previously been connected to the shaft by the dog 181 operable by the sub-lever 62, and thereby rock the variably movable element or shaft 143 through an angular distance which is dependent upon the shape of the cam slot 172. The lever 57 is moved through the same angular distance as the shaft 143, to actuate the rack 134 and thereby rotate the type bar carrier 45 to juxtapose the type at the printing point which corresponds to the character on the key of the actuated key lever 58.

The direction of rotation of the type carrier 45 is dependent upon the direction in which each slot extends, whether it extends rearwardly and towards the center of rotation of the cam element 140, see Fig. 28, or whether it extends rearwardly and away from the center of rotation of the cam element as in Fig. 29. Thus if one of the motion determining devices of group A', Fig. 10, is rendered effective, in which group all of the cam elements 140 have their slots extending rearwardly and inwardly, the type carrier is caused to rotate in a counter-clockwise direction, indicated by arrow $A^x$ in Fig. 36, from its normal position to juxtapose one of the types of group A at the printing point. If one of the motion determining devices of group B' is actuated, in which the cam slots 172 extend rearwardly and outwardly, the type carrier is caused to rotate in a clockwise direction, indicated by arrow $B^x$ in Fig. 36, from its normal position to juxtapose one of the type bars of group B at the printing point.

While the general operator 142 is actuating the type carrier 45, through the medium of the connected cam 140, the type bar actuator 48 is also being actuated by the general operator, through the medium of the link 270, see Fig. 4, arm 271, shaft 274 and arm 280. When the follower 173 reaches the dwell 187, of the cam slot 172, the rotation of the type carrier 45 ceases and the selected type bar is juxtaposed at the printing point. The movement of the general operator continues, however, to continue to movement of the type bar actuator 48 and cause it to engage the juxtaposed type bar to accurately align the type with respect to the printing point, by the slot 330, and the type bar actuator then swings the type bar about its pivot to print through the ribbon 50 against a work sheet around the platen. The arm extension 350 effects the vibration of the ribbon and also the carriage feed mechanism through links 366 and 351 respectively.

During the aligning action of the type bar and while it is being swung to the printing point the follower 173 is on the dwell 187 of the cam slot. During the return stroke of the general operator 142 the type bar actuator is moved back sufficiently towards normal to clear the type bar before the follower 173 of the arm 141 reaches the cam portion of the slot 172 which effects the return of the type bar carrier to normal.

As soon as the finger is removed from the depressed key lever 58, which may be done as soon as the machine starts cycling, the spring 178, Fig. 5, connected to the sub-lever 62, returns the latter and said key lever to normal. The universal bar 61 is returned to normal by the spring 260, Figs. 16 and 20, as soon as the slide 240 of the clutch is returned to normal by the cam 251. This returning of the slide 240 is accomplished during the early part of the active stroke of the rock shaft 222 by the cam 251.

When the active driving element 221 returns its cooperative clutch element 223 to normal the dog 232 is withdrawn from locking engagement with the pawl 225 by the stop 234, and the pawl 225 is then swung back to normal on the element 221 by its spring 227, thus disconnecting the driven element 223 from the driving element 221. The driving elements then continue to reciprocate idly until either another character key 120 or the space bar 375 is actuated.

Upon the depression of the space bar 375 to effect a space between words the extension 380 of arm 376, Figs. 8 and 16, actuates lever 381 and thereby depresses the universal bar to effect the release of the clutch slide 340 and thus render the clutch effective, in the same manner as when a key lever is operated, so that the general operator 142 may be reciprocated by the continually running driving device 55.

When it is desired to print with the upper case character 52 of the type bar the type bar carrier 45 is first shifted to upper case position by depressing one of the shift keys 390, Figs. 8, 9 and 34, to shift the frame 132, which supports the type carrier, upwardly until it is arrested by the stops 389. Any one of the key levers may then be operated to print with the corresponding upper case type.

When the type carrier is to be substituted by another one having a different style of types the type bar actuator is first released by the finger piece 354, Figs. 4, 17 and 18, to swing the latch levers 346 clear of the keepers 349. The guide frame 333 may then be swung upwardly, about the pivots 340, to carry the actuator 48 with it to a position where they will not interfere with the removal of the type carrier from the shaft 47.

The operator may then reach to the finger piece 320 to actuate the lever 315 until the nose 317 is clear of the upper edge of the tubular portion 298 of the type bar carrier 45. Said type bar carrier may then be removed from the reduced end 305 of the shaft 47 and substituted by another one having the desired style of types. After the type bar carrier has been properly placed with respect to the extensions 309 and 310, it is pushed down on the shaft extension 305 and the nose 317 of the lever 315 then snaps over the edge of the tubular portion 298 to hold the newly mounted type bar carrier in place. The frame 333 is then swung down to its normal position with the type bar actuator 48 and the latch levers 346 snap over the keepers 349 to lock said frame in its normal position.

While certain preferred embodiments of the invention have been shown and described, it will be understood that changes in the form, arrangements, proportions, sizes and details thereof may be made without departing from the scope of the invention as defined in the appended claims.

I claim:

1. In a typewriting machine, the combination of printing instrumentalities including a plurality of types, key levers one corresponding to each type, a plurality of differently shaped cams associated with the printing instrumentalities one for each type thereof, a cam actuating device normally at rest, a plurality of connecting elements, each connecting element being associated with one of the key levers and the corresponding cam, each connecting element being operable by its key lever to positively connect the associated cam with said cam actuating device, means operable by the connected cam to drive the printing instrumentalities to register the corresponding type at the printing point, continually reciprocating power driven means, and means responsive to the actuation of any one of the key levers to effect a connection of the cam actuating device with the reciprocating means while the latter is momentarily at rest due to a reversal of motion.

2. In a typewriting machine, the combination of printing instrumentalities including a plurality of types, key levers one corresponding to each type, a reciprocable actuating device, cams associated with the printing instrumentalities one for each type thereof, said cams being supported on said actuating device, a plurality of connecting elements, each connecting element being associated with one of the key levers and the corresponding cam, each connecting element being operable by its key lever to connect the associated cam with said reciprocable actuating device, means operable by the connected cam to drive the printing instrumentalities to register the desired type at the printing point, said reciprocable actuating device being also effective to restore the printing instrumentalities to normal through the connected cam, power means to actuate said reciprocable device, and means responsive to the actuation of any one of said key levers to cause the power means to actuate said reciprocable actuating device.

3. In a typewriting machine, the combination of printing instrumentalities including a type carrier having a plurality of adjacent types thereon, rotatable means to actuate the type carrier, a reciprocable general operator, a plurality of intermediate motion determining devices one for each type, all of the intermediate devices being supported by the general operator and operable individually thereby to selectively actuate the rotatable means through different angular distances to accordingly operate the type carrier to position the desired type at the printing point, key levers one for each intermediate device, connecting devices one operable by each key lever to connect the associated intermediate device with the general operator, means common to all of the connecting devices to retain the active one effective until the general operator is restored to normal, and means to move the active connecting device to its normal inactive position after the active intermediate device has been returned to its ineffective position.

4. In a typewriting machine, the combination of printing instrumentalities including a type carrier having a plurality of adjacent types thereon, rotatable means to actuate the type carrier, a general operator normally at rest and having an axis about which it may be oscillated, a plurality of intermediate motion determining devices one for each type, all of the intermediate devices being pivoted in alignment with the axis of the general operator, said intermediate devices being operable individually to selectively actuate the rotatable means through different angular distances to accordingly operate the type carrier to position the desired type at the printing point, key levers one for each intermediate device, connecting devices one operable by each key lever to connect the associated motion determining device directly with the general operator, continually running power means to actuate the general operator but normally disconnected therefrom, and means operable by any one of the key levers to effect a connection of the general operator with the power means.

5. In a typewriting machine, the combination of printing instrumentalities including a rotatable type carrier having a plurality of adjacent types thereon, a general operator normally at rest, a plurality of motion determining devices one for each type, said intermediate devices being operable individually to selectively actuate the type carrier through different angular distances to position any one of the types at the printing point, key levers one for each motion determining device, connecting devices one on each motion determining device, each connecting device being operable by the key lever associated with the corresponding motion determining device to connect the latter with the general operator while the latter is at rest, continually running power means to reciprocate the general operator to thus drive the type carrier to its printing position and restore it to normal, means operable by the key levers to effect a connection of the general operator with the power means, and means to hold the active connecting device in its connected position until the associated intermediate device has been returned to its home position.

6. In a typewriting machine, the combination of printing instrumentalities including a rotatable type carrier, two rock shafts, a plurality of differently shaped cams on one of said rock shafts, a series of arms on the other rock shaft one for each cam, key levers, connecting devices operable by each key lever to connect the corresponding cam and its associated arm to their respective rock shafts, the cams being effective through their associated arms to rock the arm supporting rock shaft through various angular distances, and means operable by the arm supporting rock shaft whereby any one of the various motions thereof may be transmitted to the type carrier to thus position any one of the types at the printing point.

7. In a typewriting machine, the combination of printing instrumentalities including a rotatable type carrier, two rock shafts, a cam on one of said rock shafts, means whereby said cam may be actuated by its rock shaft, an arm on the other rock shaft to be actuated by said cam, means whereby said arm may actuate its shaft, a key lever, actuating means, means responsive to the actuation of said key lever to cause the cam supporting shaft to be operated by the actuating means to thus actuate said cam and thereby actuate said arm to rock the arm supporting rock shaft through the medium of the second mentioned means, and means operable by the arm supporting rock shaft to actuate the type carrier to thus position this type at the printing point.

8. In a typewriting machine, the combination of printing instrumentalities including a rotatable type carrier, a variably movable rock shaft extending transversely of the machine, means to actuate the type carrier by said rock shaft, a series of motion determining devices arranged coextensively with said rock shaft to operate the latter and each through a different angular distance to effect various extents of movement of said rock shaft, actuating means, key levers one for each of said motion determining devices, means responsive to the actuation of each key lever to cause the corresponding device to be operated by said actuating means, and means operable by any one of said key levers to effect the operation of said actuating means.

9. In a typewriting machine, the combination of printing instrumentalities including a rotatable type carrier, a variably movable rock shaft extending transversely of the machine, means to actuate the type carrier by said rock shaft, a series of motion determining devices arranged coextensive with said rock shaft to operate the latter each through a different angular distance to effect various extents of movement of said rock shaft, a general operator normally at rest, key levers one for each of said motion determining devices, means operable by each key lever to connect the corresponding device with said general operator while the latter is at rest, a continually running power device, and means operable by any one of said key levers to subsequently connect the general operator with the continually running power device.

10. In a typewriting machine, the combination of printing instrumentalities including a rotatable type carrier, means including a rock shaft to actuate said type carrier, a series of arms loosely mounted on said rock shaft, a series of cams one for each arm to actuate the latter, the throw which each cam imparts to its associated arm being different than the throws imparted by all of the other cams, a rock shaft to support and actuate said cams, key operated levers one for each arm, connecting elements one for each arm, each connecting element being operable by its associated key operated lever to connect the corresponding arm with its supporting rock shaft, and means to effect the actuation of the cam supporting rock shaft.

11. In a typewriting machine, the combination of printing instrumentalities including a rotatable type carrier, means including a rock shaft to actuate said type carrier, a series of arms loosely mounted on said rock shaft, a series of cams one for each arm to actuate the latter, the throw of each cam being different than the throws of all of the other cams, key levers one for each arm, sub-levers one for each key lever, connecting elements one for each arm, each connecting element being operable by its associated sub-lever to connect the corresponding arm with its supporting rock shaft, actuating means, and means responsive to the actuation of any one of said sub-levers to cause the actuating means to operate the cam supporting rock shaft.

12. In a typewriting machine, the combination of printing instrumentalities including a rotatable type carrier, means including a variably movable element ao actuate said type carrier, a series of actuating elements for said variably movable element, a series of motion determining elements one for each actuating element, a general operator for the motion determining elements, key levers one for each motion determining element, sub-levers one for each key lever, the motion determining elements being normally disconnected from the general operator, a series of connecting devices one for each motion determining element, the actuating elements being normally disconnected from the variably movable element, a series of connecting elements one associated with each actuating element, each key lever being effective to actuate a connecting device of one series to connect the associated motion determining element with the general operator, the sub-lever of the active key lever being effective to actuate one of the connecting elements of the other series to connect the associated actuating element with the variably movable element, and means to actuate the general operator.

13. In a typewriting machine, the combination of printing instrumentalities including a rotatable type carrier, means including a variably movable rock shaft to actuate said type carrier, a series of actuating elements on said variably movable rock shaft, a series of motion determining elements one for each actuating element, a rock shaft upon which the motion determining elements are loosely supported, key levers one for each motion determining element, sub-levers one for each key lever, the motion determining elements being normally disconnected from their supporting rock shaft so that it may be operated independently of the motion determining elements, the actuating elements being normally disconnected from the variably movable rock shaft, a series of connecting elements for the motion determining elements, a series of connecting elements associated with the actuating elements, each key lever being effective to actuate a connecting device of one series to connect the associated motion determining element with its supporting rock shaft, the sub-lever of the active key lever being effective to actuate one of the connecting elements of the other series to connect the associated actuating element with the variably movable rock shaft, and means to actuate the shaft which supports the motion determining elements.

14. In a typewriting machine, the combination of printing instrumentalities including a rotatable type carrier, means including a variably movable element to actuate said type carrier, a series of actuating elements for said variably movable element, a series of motion determining elements one for each actuating element, a general operator for the motion determining elements, key levers one for each motion determining element, sub-levers one for each key lever, the motion determining elements being normally disconnected from the general operator, the actuating elements being normally disconnected from the variably movable element, a series of connecting elements for the motion determining elements, a series of connecting elements associated with the actuating elements, each key lever being effective to actuate a connecting device of one series to connect the associated motion determining element with the general operator, the sub-lever of the active key lever being effective to actuate one of the connecting elements of the other series to connect the associated actuating element with the variably movable element, a continually running power device, and means operable by any one of the sub-levers to effect a driving connection of the general operator with the continually running power means.

15. In a typewriting machine, the combination of printing instrumentalities including a rotatable type carrier having a plurality of types thereon arranged adjacent to each other about its axis and various angular distances from the printing point, a variably movable device, means operable by said device to actuate the type carrier, a series of arms loosely supported on said device, means to connect any one of said arms to said device, cams one for each arm to operate it to actuate said type carrier through various angular distances to locate any one of the types at the printing point, the form of each of said cams varying from the forms of the other cams to impart motions to the variably movable device which motions are commensurate with the angular distances of the corresponding types from the printing point, a general operator for said cams, key levers one for each cam, connecting devices one for each key lever and responsive to its actuation to connect the corresponding cam with the general operator, and connecting devices one for each arm, each of the last named connecting devices being responsive to the actuation of the corresponding key lever to connect the arm associated with the selected cam to the variably movable device.

16. In a typewriting machine, the combination of printing instrumentalities including a rotatable type carrier having a plurality of types thereon arranged adjacent to each other about its axis and various angular distances from the printing point, means including a variably movable element to actuate said type carrier through various angular distances to locate any one of the types at the printing point, means including a series of cams one for each type, the form of each of said cams varying from the forms of the other cams so as to impart motions to the variably movable element which are commensurate with the angular distances of the corresponding types from the printing point, a rock shaft to support said cams, key levers one for each cam, a dog on each cam and operable by the associated key lever to connect the corresponding cam with the rock shaft, a continually reciprocating power driven device, and means operable by the key levers to effect a connection of the rock shaft with the continually reciprocating device.

17. In a typewriting machine, the combination of printing instrumentalities including a rotatable type carrier having a plurality of types thereon arranged adjacent to each other about its axis and various angular distances from the printing point, means including a variably movable rock shaft to actuate said type carrier through various angular distances to locate any one of the types at the printing point, means including a series of cams one for each type, actuating arms on said rock shaft to actuate the latter, there being one of said arms for each cam and operable thereby, means whereby any one of said arms may be connected to said rock shaft, each cam varying from the forms of the other cams so that motions imparted by said cams through the medium of their associated arms to the variably movable rock shaft effect motions of the latter which are commensurate with the angular distances of the corresponding types from the printing point, a general operator for said cams, key levers one for each cam, and devices one for each key lever to connect the corresponding cam with the general operator.

18. In a typewriting machine, the combination of key levers, a variably movable element, a type carrier, means operable by said variably movable element to actuate the type carrier through various distances, devices including cams each to impart an extent of motion to the variably movable element which extent of motion differs from the extents of motion which may be imparted by the other cams, a reciprocable device upon which said cams are loosely supported, key levers one for each cam, and dogs one supported on each cam, said dogs being operable each by one of the key levers to connect the associated cam with the reciprocable device so that the connected cam may be actuated by the reciprocable device through a complete cycle, and means to actuate said reciprocable device.

19. In a typewriting machine, the combination of key levers, a variably movable element, a type carrier, means operable by said variably movable element to actuate the type carrier through various distances, a series of devices arranged coextensive with said variably movable element, including motion determining elements each to impart an extent of motion to the variably movable element which extent of motion differs from the extents of motion which may be imparted by the other motion determining elements, a reciprocable general operator for said motion determining elements by which they are supported and to actuate them one at a time to their effective position and return them to normal, key levers one for each motion determining element, settable devices one operable by each key lever to render the associated motion determining device effective to be actuated by the general operator, means to actuate the general operator, and means to hold the active settable device in its active position until the general operator has returned to normal.

20. In a typewriting machine, the combination of key levers, a variably movable element, a type carrier, means operable by said variably movable element to actuate the type carrier through various distances, devices including motion determining elements each to impart an extent of motion to the variably movable element which extent of motion differs from the extents of motion which may be imparted by the other motion determining elements, means to actuate said devices one at a time, key operated levers one associated with each motion determining device, and settable devices one operable by each key operated lever to connect the associated motion determining device with the variably movable element.

21. In a typewriting machine, the combination of key levers, a variably movable element, a type carrier, means operable by said variably movable element to actuate the type carrier through various distances, motion determining devices each to impart an extent of motion to the variably movable element which extent of motion differs from the extents of motion which may be imparted by the other motion determining elements, means to actuate said devices one at a time, key operated levers one for each motion determining device, settable devices one operable by each key operated lever to connect the associated motion determining device with the variably movable element, and means to hold the active settable device in its active position until the active motion determining device makes a complete cycle.

22. In a typewriting machine, the combination of key levers, a variably movable element, a type carrier, means operable by said variably movable element to actuate the type carrier through various distances, intermediate elements through the medium of which the variably movable element may be operated, actuating elements one for each intermediate element, each actuating element cooperating with its associated intermediate element to impart an extent of motion to the variably movable element which extent of motion differs from the extents of motion which may be imparted by any other actuating element and its intermediate element, a general operator for said actuating elements to operate them one at a time, settable devices to selectively connect any one of the actuating elements with the general operator, and settable devices to connect the intermediate element associated with the selected actuating element with the variable movable element.

23. In a typewriting machine, the combination of key operated levers, a variably movable element, a type carrier, means operable by said variably movable element to actuate the type carrier through various distance, intermediate elements through the medium of which the variably movable element may be operated, actuating elements one for each intermediate element, each actuating element cooperating with its associated intermediate element to impart an extent of motion to the variably movable element which extent of motion differs from the extents of motion which may be imparted by any other actuating element and its intermediate element, a general operator for said actuating elements to operate them one at a time, settable devices to selectively connect any one of the actuating elements with the general operator, settable devices to connect the intermediate element associated with the selected actuating element with the variably movable element, power means, and means responsive to the operation of any one of the key operated levers to cause the general operator to be actuated by said power means.

24. In a typewriting machine, the combination of printing instrumentalities including a plurality of types, key levers one corresponding to each type, a single power device, cams one for each type, means operable by said cams to actuate the printing instrumentalities, a plurality of connecting elements, each connecting element being associated with one of the key levers and the corresponding cam, each connecting element being operable by its key lever to positively connect the associated cam with said power device so that the power device may drive the printing instrumentalities through the medium of the connected cam and said means to register the desired type at the printing point, a cooperative device to act against the types to print, and means operable by said power device and independently of said connecting elements to actuate said cooperative device.

25. In a typewriting machine, the combination of printing instrumentalities including a plurality of types, key levers one corresponding to each type, a reciprocable device, cams one for each type, means operable by said cams to actuate the printing instrumentalities, a plurality of connecting elements, each connecting element being associated with one of the key levers and the corresponding cam, each connecting element being operable by its key lever to connect the associated cam with said reciprocable device so that the reciprocable device may drive the printing instrumentalities through the medium of the connected cam and said means to register the desired type at the printing point, a cooperative device to cause the types to print, and means operable by the reciprocable device to actuate said cooperative device, said reciprocable device being also effective to restore said printing instrumentalities and said cooperative device to normal.

26. In a typewriting machine, the combination of printing instrumentalities including a plurality of types, key levers one corresponding to each type, a reciprocable device, a set of cams one for each type, means operable by said cams to actuate the printing instrumentalities, a plurality of connecting elements one supported on each cam, each connecting element being associated with one of the key levers and the corresponding cam, each connecting element being operable by its key lever to thereby connect the associated cam with said reciprocable device so that the reciprocable device may drive the printing instrumentalities through the medium of the connected cam and said means to register the desired type at the printing point, means extending along the set of cams and transversely of all of the connecting elements to retain the active connecting element effective until the printing instrumentalities have been restored, continually running power means to actuate said reciprocable device, and means operable by any one of the key levers to effect a connection of the reciprocable device with said power means.

27. In a typewriting machine, the combination of printing instrumentalities including a type carrier, a key lever, a power driven device, a cam, means operable by said cam to actuate the printing instrumentalities, a connecting element operable directly by the key lever to positively connect the cam with the power driven device so that the latter may actuate the printing instrumentalities through the medium of the cam and said means to juxtapose the type of the type carrier at the printing point, a cooperative device to cause the juxtaposed type to print, and means operable by the power driven device to actuate said cooperative device, said cam having a dwell to effect a condition of rest of the type carrier in its printing position prior to engagement of the type by the cooperative device.

28. In a typewriting machine, the combination of printing instrumentalities including a type carrier, a key lever, a reciprocable device, a cam, means operable by said cam to actuate the printing instrumentalities, a connecting element operable directly by the key lever to connect the cam with the reciprocable device so that said reciprocable device may actuate the printing instrumentalities through the medium of the cam and said means to juxtapose the type of the type carrier at the printing point, a cooperative device to cause the juxtaposed type to print, means operable by the reciprocable device to actuate said cooperative device, said cam having a dwell to effect a condition of rest of the type carrier in its printing position, said reciprocable device being also effective to restore the printing instrumentalities and said cooperative device to normal, and means to actuate said reciprocable device.

29. In a typewriting machine, the combination of printing instrumentalities including a type carrier having a plurality of adjacent types thereon, means to actuate the type carrier, a general operator, a plurality of intermediate devices one for each type, means to connect the intermediate devices with the actuating means, said intermediate devices being normally disconnected from the general operator but operable individually thereby to selectively operate the actuating means through different angular distances to accordingly operate the type carrier to juxtapose the desired type at the printing point, key levers one for each intermediate device, connecting devices one operable by each key lever to connect the associated intermediate device with the general operator, a cooperative device to cause the juxtaposed type to print, and means operable by the general operator to actuate said cooperative device.

30. In a typewriting machine, the combination of a type carrier having adjacent types thereon, operable means to actuate said type carrier to register any one of the types at the printing point, actuating means for said operable means, motion determining devices, means to connect the motion determining devices with the actuating means, to operate said actuating means, there being one motion determining device for each type, each motion determining device being effective to operate the actuating means an extent different from the extents of motion through which the actuating device is operable by the other motion determining devices, key levers one associated with each motion determining device, a general operator for said motion determining devices, said motion determining devices being normally disconnected from the general operator, connecting devices one operable by each key lever to connect the associated motion determining device with the general operator, a cooperative device to engage any one of the types to print, means operable by said general operator to actuate the cooperative device, a continually running device, and means operable by the key levers to cause the general operator to be actuated by the continually running device.

31. In a typewriting machine, the combination of printing instrumentalities including a rotatable type carrier, two rock shafts, a plurality of differently shaped cams on one of said rock shafts, a series of arms on the other rock shaft one for each cam, a series of connecting devices whereby anyone of the cams may be connected to one of said rock shafts, another series of connecting devices whereby any one of the connecting devices may be connected with the other rock shaft, the cams being effective through their associated arms to rock the arm supporting rock shaft through various angular distances, means operable by the arm supporting rock shaft whereby any one of the various motions thereof may be transmitted to the type carrier to thus position any one of the types at the printing point, a cooperative device to engage the selected type to cause the latter to print, and means operable by the cam supporting rock shaft to actuate said cooperative device.

32. In a typewriting machine, the combination of printing instrumentalities including a rotatable type carrier, a variably movable rock shaft, means to actuate the type carrier by said rock shaft, motion determining devices to operate said rock shaft one at a time and by each through a different angular distance to effect various extents of movement of said rock shaft, an actuating rock shaft, key levers one for each of said motion determining devices, means operable by each key lever to connect the corresponding device with said actuating rock shaft, a cooperative device to engage any one of the types of the type carrier to print, means connected to and operable by said actuating rock shaft to operate said cooperative device, actuating means, and means responsive to the operation of anyone of the key levers to cause said actuating rock shaft to be operated by said actuating means.

33. In a typewriting machine, the combination of printing instrumentalities including a rotatable type carrier, means including a variably movable element to actuate said type carrier, a series of actuating elements for said variably movable element, a series of motion determining elements one for each actuating element, a general operator for the motion determining elements, key levers one for each motion determining element, sub-levers one for each key lever, the motion determining elements being normally disconnected from the general operator, the actuating elements being normally disconnected from the variably movable element, a series of connecting elements for the motion determining elements, a series of connecting elements associated with the actuating elements, each key lever being effective to actuate a connecting device of one series to connect the associated motion determining element with the general operator, the sub-lever of the active key lever being effective to actuate one of the connecting elements of the other series to connect the associated actuating element with the variably movable element, a cooperative device to cause any one of the types to print, means operable by the general operator to operate said cooperative device, a power device to actuate said general operator, and means operable by said sub-levers to cause the general operator to be actuated by said power device.

34. In a typewriting machine, the combination of a carriage, a platen on said carriage, printing instrumentalities including types to print against said platen, operable devices to actuate said printing instrumentalities, a general operator, key operated devices one for each operable device to render the latter responsive to the actuation of the general operator, carriage feeding means, and means actuable directly by the general operator and independently of the operable devices to actuate the carriage feeding means through a complete cycle.

35. In a typewriting machine, the combination of a platen, printing instrumentalities including types to print against said platen, operable devices to actuate said printing instrumentalities, reciprocable means, key operated devices one for each operable device to render the latter responsive to the actuation of the reciprocable device, carriage feeding means including a dog rocker, and means operable by said reciprocable means to reciprocate said dog rocker.

36. In a typewriting machine, the combination of printing instrumentalities including types, and a cooperative device to engage the types one at a time to print, means including operable devices to actuate said printing instrumentalities, a general operator, key operated devices one for each operable device to render the latter responsive to the actuation of the general operator, and other means immediately connected to and actuable by said general operator to actuate said cooperative device.

37. In a typewriting machine, the combination of printing instrumentalities including types, operable devices to actuate said printing instrumentalities, a general operator to actuate any one of said operable devices, key operated devices one for each operable device to render the latter responsive to the actuation of the general operator to effect the actuation of the printing instrumentalities by said general operator, ribbon vibrating mechanism, and means independent of the operable devices and operable by the general operator to actuate said ribbon vibrating mechanism.

38. In a typewriting machine, the combination of two cooperative elements one loosely supported by the other, reciprocable power means to operate one of said elements, a key lever, means operable directly by and during the operation of said key lever to connect the power operated element with the other element, printing instrumentalities, and means operable by the last mentioned element after it has been connected with the power operated element to actuate the printing instrumentalities from their home position and return them to their home position.

39. In a typewriting machine, the combination of two cooperative elements one loosely supported by the other, both elements being normally at rest, power driven means to reciprocate one of said elements, a key lever, means operable directly by and during the operation of said key lever to connect the reciprocable element with the other element while both elements are at rest, printing instrumentalities, and means operable by the last mentioned element after it has been connected with the reciprocable element to actuate the printing instrumentalities through a complete cycle.

40. In a typewriting machine, the combination of a rock shaft, a plurality of elements loosely supported by said rock shaft, said elements and said rock shaft being normally at rest, power means to oscillate said rock shaft, key levers one associated with each of said elements, devices operable one by and during the actuation of each key lever to connect the associated element with said rock shaft while the rock shaft is at rest, printing instrumentalities, and means operable by any one of said elements to actuate the printing instrumentalities through a complete cycle.

41. In a typewriting machine, the combination of a rock shaft, an element loosely supported on said rock shaft, a pawl on said element, a notched member on said rock shaft, power means to actuate said rock shaft, a key lever, said pawl being operable directly by said key lever to cause said pawl to engage in the notch of said notched member to thus connect said element with said rock shaft, printing instrumentalities, and means operable by said element to actuate said printing instrumentalities.

42. In a typewriting machine, the combination of two cooperative elements normally at rest and one loosely supported by the other, a pawl on one of said elements, a cooperative member on the other element, a key lever power means, means under the control of said key lever to effect the actuation of one of said elements by said power means, said pawl being engaged by and during the operation of said key lever to operate it and cause said pawl to engage said cooperative member to thus connect said two elements so that one of said elements may be driven by the other element, printing instrumentalities, and means operable by the driven element to actuate the printing instrumentalities.

43. In a typewriting machine, the combination of two cooperative elements one loosely supported by the other, power driven means to reciprocate one of said elements, a pawl on one of said elements, a notched member on the reciprocable element, a key lever, said pawl being operable by said key lever to cause said pawl to enter the notch of said notched member to thus connect the loosely supported element with the reciprocable element, printing instrumentalities, and means operable by the connectable element to actuate the printing instrumentalities.

44. In a typewriting machine, the combination of a rock shaft, a plurality of elements loosely supported by said rock shaft, power means to operate said rock shaft, connecting members one pivoted on each one of said elements, a plurality of notched members on said rock shaft the notched members being positioned each one between two adjacent elements, key levers, said connecting members being operable each by one of said key levers to cause it to engage in the notch of one of said members to thus conect the associated element with the rock shaft, printing instrumentalities and means operable by the connected element to actuate the printing instrumentalities.

45. In a typewriting machine, the combination of two cooperative elements one loosely supported by the other, a key lever, power means, means under the control of said key lever to effect the actuation of one of said elements from a normal position, means operable directly by and during the operation of said key lever to connect the power driven element with the other element, printing instrumentalities, means operable by the last mentioned element after it has been connected with the power driven element to actuate the printing instrumentalities, means tending to render said connecting means ineffective, and means to retain the connecting means ineffective until the element which is operable by the power means has been returned to its normal position.

46. In a typewriting machine, the combination of two cooperative elements one loosely supported by the other, both elements being normally at rest, power driven means to reciprocate one of said elements from a normal position, a key lever, means operable directly by said key lever to connect the reciprocable element with the other element while both elements are at rest, printing instrumentalities, means operable by the last mentioned element after it has been connected with the power driven element to actuate the printing instrumentalities, and means to prevent disconnection of said other element from the reciprocable element until the said other element is restored to its normal position.

47. In a typewriting machine, the combination of a rock shaft, a plurality of elements loosely supported by said rock shaft, power means to operate said rock shaft, key levers one associated with each of said elements, devices operable one by each key lever to connect the associated element with said rock shaft, printing instrumentalities, means operable any one of said elements to actuate the printing instrumentalities, and means common to all of the connecting devices to retain the active one effective until the active element has completed a cycle.

48. In a typewriting machine, the combination of two cooperative elements one loosely supported by the other, a dog on one of said elements, a cooperative member on the other element, power means to actuate one of said elements, a key lever, said dog being engaged and operable by said key lever to cause said dog to engage said cooperative member to thus connect said elements so that one of said elements may be driven by the other element, printing instrumentalities, means operable by the driven element to actuate said printing instrumentalities, means tending to render said dog ineffective, and a guard to prevent disengagement of said dog from said cooperative member until both elements have made a complete cycle.

49. In a typewriting machine, the combination of a rock shaft, a plurality of elements loosely supported by said rock shaft, power means to operate said rock shaft from its normal position and to return it to normal position, dogs one pivoted on each one of said elements, a plurality of notched members on said rock shaft, the notched members being positioned each one between two adjacent elements, key levers, said dogs being operable each by one of said key levers to cause the dog to engage in one of the adjacent members to thus connect the associated element with the rock shaft so that said associated element may be actuated from its normal position by said rock shaft, printing instrumentalities, means operable by the connected element to actuate said printing instrumentalities, and a stationary bar common to all of said dogs to hold the active one in its effective position until the active element has been returned to its normal position.

50. In a typewriting machine, the combination of a rock shaft, power driven reciprocable means to actuate said rock shaft in either one of two directions from a normal position, means including two dogs whereby the rock shaft may be connected to the power driven means, key operated devices one for each dog to render said dogs effective individually and thus determine the direction in which the rock shaft is to be rotated by the power driven means, printing instrumentalities, and means operable by said rock shaft to actuate the printing instrumentalities.

51. In a typewriting machine, the combination of a rock shaft, two sets of actuating devices to operate said rock shaft, any one of the devices of one set to operate said rock shaft in one direction from a normal position, any one of the devices of the other set to operate said rock shaft in the opposite direction, means whereby any one of said actuating devices may be operated, key operated devices, one for each of said actuating devices, connecting dogs one pivoted on each actuating device and operable by its associated key operated device to connect the corresponding actuating device with said rock shaft, printing instrumentalities, and means operable by said rock shaft to actuate said printing instrumentalities.

52. In a typewriting machine, the combination of two cooperative elements one loosely supported by the other, both of said elements being normally at rest, continually running power means to operate one of said elements, a key lever, means operable directly by said key lever to connect the power driven element with the other element, said power means being normally ineffective, means operable by said key lever to render said continually running power means effective to actuate said power driven element, printing instrumentalities, and means operable by said other element to actuate said printing instrumentalities.

53. In a typewriting machine, the combination of two cooperative elements one loosely supported by the other, means to reciprocate one of said elements, a key lever, means operable directly by said key lever to connect the reciprocable element with the other element, continually reciprocating means normally ineffective, means to connect the reciprocable element with the reciprocating means, means responsive to the actuation of said key lever to render the connecting means effective whereby said reciprocable element may be actuated by the reciprocating means, printing instrumentalities, and means operable by said other element to actuate said printing instrumentalities.

54. In a typewriting machine, the combination of a rock shaft, a plurality of elements loosely supported by said rock shaft, power means to operate said rock shaft, key levers one associated with each of said elements, devices operable one by each key lever to connect its associated element with said rock shaft, said power means being continually running and normally disconnected from said rock shaft, means operable by said key levers to connect the rock shaft with the power means, printing instrumentalities, and means operable by any one of said elements to actuate said printing instrumentalities.

55. In a typewriting machine, the combination of printing instrumentalities including a plurality of types, key levers one corresponding to each type, a reciprocable device, cams associated with the printing instrumentalities one for each type thereof, a plurality of connecting elements each connecting element being associated with one of the key levers and the corresponding cam, each connecting element being operable directly by and during the actuation of its key lever to positively connect the associated cam with said reciprocable device so that the power device may drive the printing instrumentalities through the medium of the connected cam to register the desired type at the printing point, a carriage, carriage feeding means, means under the control of said key levers to effect the actuation of said reciprocable device, and means operable directly by said reciprocable device and independently of the printing instrumentalities to actuate said carriage feeding mechanism from its normal position and return it to its normal position.

56. In a typewriting machine, the combination of printing instrumentalities including a plurality of types, key levers one corresponding to each type, a reciprocable rock shaft, cams associated with the printing instrumentalities one for each type thereof, said cams being supported on said rock shaft, power means to actuate said rock shaft to actuate said cams one at a time, means operable by any one of said cams to actuate the printing instrumentalities, a plurality of connecting elements, each connecting element being associated with one of the key levers and the corresponding cam, each connecting element being operable directly by and during the actuation of its key lever to connect the associated cam with said reciprocable rock shaft so that the latter may drive the printing instrumentalities through the medium of the connected cam to register the desired type at the printing point, said reciprocable rock shaft being also effective to restore the printing instrumentalities to normal through the connected cam, a carriage, carriage feeding means including a dog rocker, and means operable directly by the reciprocable rock shaft and independently of the printing instrumentalities to reciprocate said dog rocker.

57. In a typewriting machine, the combination of printing instrumentalities, means to actuate the printing instrumentalities, a plurality of individually operable elements to operate the actuating means, a general operator to actuate any one of said operable elements, a continually running power driven device, means normally ineffective whereby the general operator may be actuated by the power driven device, key levers, means under the control of the key levers to effect a connection of the normally ineffective means with the power driven device so that the general operator may be actuated by said power driven device, a carriage, carriage feeding means, and means operable by the normally ineffective means to actuate the carriage feeding means independently of said individually operable elements.

58. In a typewriting machine, the combination of printing instrumentalities including a plurality of types, key levers one corresponding to each type, a single power driven device, cams one associated with each key lever, means operable by said cams to actuate the printing instrumentalities, a plurality of connecting elements, each connecting element being associated with one of the key levers and the associated cam, each connecting element being operable by its key lever to positively connect its associated cam with said power driven device so that the power device may drive the printing instrumentalities through the medium of the connected cam to juxtapose the desired type at the printing point, a carriage, carriage feeding means, a power device, means operable by the power device to actuate the power driven device, means operable by said power driven device to actuate said carriage feeding means, a normally ineffective clutch, means responsive to the actuation of any one of the key levers to render said clutch effective to cause the driven device to thus actuate the carriage feeding means and the printing instrumentalities, and a space bar, said last mentioned means being also responsive to the actuation of the space bar to cause the driven device to be actuated by said power device through the medium of said clutch to thus actuate the carriage feeding means while said printing instrumentalities are at rest.

59. In a typewriting machine, the combination of printing instrumentalities including a plurality of types, key levers one corresponding to each type, a single power device normally at rest, means under the control of the key levers to effect the actuation of said power device, cams associated with the printing instrumentalities one for each key lever, a plurality of connecting elements, each connecting element being associated with one of the key levers and supported by the corresponding cam, each connecting element being operable by and during the actuation of its key lever to positively connect the corresponding cam with said power device while the latter is at rest so that the power device may subsequently actuate the printing instrumentalities through the medium of the connected cam to juxtapose the desired type at the printing point, ribbon vibrating mechanism, and means independent of said cams and operable by said power device to actuate said ribbon vibrating mechanism.

60. In a typewriting machine, the combination of printing instrumentalities including a plurality of types, key levers one corresponding to each type, a reciprocable device normally at rest, power means under the control of said key levers to effect the actuation of said reciprocable device, cams associated with the printing instrumentalities one for each key lever, a plurality of connecting elements, each connecting element being associated with one of the key levers and supported by the corresponding cam, each connecting element being operable by and during the actuation of its key lever to connect the corresponding cam with said reciprocable device so that the reciprocable device may subsequently actuate the printing instrumentalities through the medium of the connected cam to juxtapose the desired type at the printing point, said reciprocable device being also effective to restore the printing instrumentalities to normal through the connected cam, ribbon vibrating mechanism, and means independent of said cams and operable by the reciprocable device to actuate the ribbon vibrating mechanism to its active position and restore it to its normal position.

61. In a typewriting machine, the combination of printing instrumentalities including a type carrier having types arranged side-by-side thereon and rotatable variable extents and in opposite directions from a normal position to register any one of the types at the printing point, continually running power means, a reciprocable general operator normally at rest, a train of mechanism whereby the general operator may be actuated by the power means, devices to determine the extent and direction of motion of the type carrier from its normal position, means operable by the motion determining devices to actuate the printing instrumentalities, key operated devices, a universal bar operable by any one of said key operated devices, means to connect the train of mechanism with the power means, means responsive to the operation of said universal bar to render the connecting means effective so that the general operator may be actuated by the power means through the medium of said train of mechanism, there being one motion determining device for each key operated device, a connecting element operable by each key operated device to effect a connection of the associated motion determining device with the general operator so that the general operator may actuate the type bar carrier through the medium of the connected motion determining device and the means operable thereby, means to retain the active connecting element effective until the general operator and the active motion determining device have made a complete cycle, means to subsequently render the active connecting element ineffective to thus disconnect the active cam from the general operator and means to render the connecting means ineffective to thus disconnect the general operator from the power means effective after it has made a complete cycle.

62. In a typewriting machine, the combination of printing instrumentalities including a type carrier having adjacent types thereon arranged about its axis, key operated devices one for each type, selectable devices one for each key operated device, said selectable devices being divided into two sets, means operable by the selectable devices to rotate said type carrier, the selectable devices of one set being effective to cause the type carrier to be rotated in one direction from its normal position, the selectable devices of the other set being effective to cause the type carrier to be rotated in the opposite direction from the normal position, each device in each set being effective to cause an angular movement of the type carrier which differs from the angular movements caused by the other devices in the same set, driving means normally at rest, means operable by and during the actuation of each key operated device to connect its selectable device with the driving means, a continually reciprocating power driven device, a universal bar common to all of the key operated devices and operable by any one of them, means to connect the driving means with the reciprocating device and means responsive to the actuation of said universal bar to render the connecting means effective so that the reciprocating means may actuate the driving means.

63. In a typewriting machine, the combination of a platen, a printing unit comprising a shuttle, and type bars supported by and arranged in a circle on said shuttle, a shaft to support said shuttle, a type bar actuator movable towards and away from the platen in a vertical plane extending through the printing point fore-and-aft of the machine, means to rotate said shaft to juxtapose any one of the type bars at the printing point, the axis of said shaft being diagonally disposed with reference to the position of the type bar actuator so that said type bar actuator may extend over the printing unit to clear the ring of type bars at one end and so that the free end of the type bar actuator is located in a position within the ring of the type bars at the opposite side thereof and below the free ends of the type bars for the purpose of pushing any one of the type bars against the platen to print, each type bar having an upper case type and a lower case type arranged thereon one above the other, and case shifting means to shift the printing unit diagonally with reference to the axis of said shaft and in a direction perpendicular to the path of travel of said type bar actuator.

64. In a typewriting machine, the combination of a platen, a printing unit comprising a shuttle, and type bars supported by and arranged in a circle on said shuttle, a shaft to support said shuttle, a type bar actuator movable towards and away from the platen in a vertical plane extending through the printing point fore-and-aft of the machine, means to rotate said shaft to juxtapose any one of the type bars at the printing point, the axis of said shaft being diagonally disposed with reference to the position of the type bar actuator so that said type bar actuator may extend over the printing unit to clear the ring of type bars at one end and so that the free end of the type bar actuator is located in a position within the ring of type bars at the opposite side thereof and below the free ends of the type bars for the purpose of pushing any one of the type bars against the platen to print, each type bar having an upper case type and a lower case type arranged thereon one above the other the lower case type being normally effective, a bracket to support said shaft, means to shift said bracket to render effective the upper case types, and means to guide said bracket.

65. In a typewriting machine, the combination of a platen, a printing unit comprising a shuttle, and type bars supported by and arranged in a circle on said shuttle, a shaft to support said shuttle, a horizontally disposed type bar actuator movable towards and away from the platen in a vertical plane extending through the printing point fore-and-aft of the machine, means to rotate said shaft to juxtapose any one of the type bars at the printing point, said shaft being inclined to a vertical plane extending transversely of the machine so that said type bar actuator may extend over the printing unit to clear the ring of type bars at one end and so that the free end of the type bar actuator is located in a position within the ring of type bars at the opposite side thereof and below the free ends of the type bars for the purpose of pushing any one of type bars against the platen to print, each type bar having an upper case type and a lower case type arranged thereon one above the other, a bracket to support said shaft, and case shifting means to shift said bracket vertically.

66. In a typewriting machine, the combination of a main frame, a carriage thereon, a platen on said carriage, a printing unit comprising a shuttle, and type bars thereon, a shaft to which said shuttle is firmly secured, a bracket to carry said shaft, said bracket being shiftable on said main frame, means to guide said bracket, a type bar actuator arranged in front of said platen, key levers, means dependent upon the actuation of any one of the key levers to rotate said shaft with the shuttle to locate any one of the type bars between said actuator and the platen, and means independent of the means which rotates said shaft to shift said bracket vertically to carry said shaft therewith to thus case shift the printing unit.

67. In a typewriting machine, the combination of a platen, a printing unit comprising a shuttle, and type bars thereon, a shaft to support said shuttle, a bracket to support said shaft, a type bar actuator arranged in front of said platen, a bracket to support said shaft in an inclined position to present the type bars at one end of the printing unit to the action of the type bar actuator, and case shifting means to shift said shaft and said printing unit diagonally with reference to the axis of said shaft and parallel to the type faces of any type bar in its effective position against the platen.

68. In a typewriting machine, the combination of a platen, a printing unit comprising a shuttle, and type bars thereon, each type bar having an upper case type and a lower case type thereon, a shaft to support said shuttle, a bracket to support said shaft, a type bar actuator arranged in front of said platen, means to rotate said shuttle to locate any one of the type bars between said actuator and the platen, means to shift said bracket to thus case shift the printing unit, means to guide said bracket diagonally with reference to said shaft, and means to arrest said bracket in both case shift positions of the printing unit.

69. In a typewriting machine, the combination of a platen, a printing unit comprising a shuttle, and type bars thereon, each type bar having a lower case type and an upper case type beneath the lower case type, a shaft to support said shuttle, a type bar actuator arranged in front of said platen, a bracket to support said shaft in an inclined position to properly present the printing unit to the platen and the type bar actuator, means to rotate said shuttle to locate any one of the type bars between said actuator and the platen, means to shift said bracket upwardly to thus render the upper case types effective, means to guide said bracket in a diagonal direction with reference to the axis of said shaft, and stops to engage said bracket to arrest the printing unit in its upper case and lower case positions.

70. In a typewriting machine, the combination of printing instrumentalities including a printing unit having a complete font of types, a main frame, a shaft to support said unit, a bracket to support said shaft, means to shift said bracket and said shaft bodily on said main frame and thus alter the case of the printing unit, variably movable means on said main frame, and means connecting the variable movable means with said shaft so that the latter may be rotated various angular distances to locate any one of the types of printing unit at the printing point, the connecting means including an element permitting the shifting of said shaft by said case shifting means without disturbing the variably movable means.

71. In a typewriting machine, the combination of a platen, a printing unit comprising a shuttle, and type bars thereon, each type bar having a lower case type and an upper case type beneath the lower case type, a shaft to support said shuttle, a bracket to support said shaft, a type bar actuator arranged in front of said platen, means including a side bar on said bracket to rotate said shuttle to locate any one of the type bars between said actuator and the platen, means to shift said bracket upwardly to thus render the upper case types effective, variably actuable means, and a link connecting said slide bar with the variably actuable means, said link permitting the case shifting movements of said printing unit and the slide bar without disturbing the variably actuable means.

72. In a typewriting machine, the combination of printing instrumentalities including a type shuttle, a shaft to support said shuttle, a bracket to support said shaft, a pinion on said shaft, a rack meshing with said pinion to rotate said shaft, a guideway for said rack on said bracket, means to actuate said rack, case shifting means to shift said bracket, and means to guide said bracket.

73. In a typewriting machine, the combination of printing instrumentalities including a type shuttle, a shaft to support said shuttle, a bracket to support said shaft, a pinion on said shaft, a rack meshing with said pinion to rotate said shaft, a guideway for said rack on said bracket, case shifting means to actuate said bracket, variable movable means including an actuating arm, and means connecting said rack with said arm, the last mentioned means permitting the rack to be shifted with said bracket during case shifting movements of said bracket without disturbing said arm.

74. In a typewriting machine, the combination of printing instrumentalities including a rotatable type carrier having a row of upper case types and a row of lower case types thereon, means including a shaft to actuate said type carrier, a bracket to support said shaft, a main frame, a cross bar on said main frame, upright ways on said cross bar to guide said bracket up and down, case shifting means to actuate said bracket to thus case shift said type carrier, and means to arrest said bracket to properly locate said type carrier in its various case positions.

75. In a typewriting machine, the combination of printing instrumentalities including a rotatable type carrier having a row of upper case types and a row of lower case types thereon, means including a shaft to actuate said type carrier, a bracket to support said shaft, a main frame, a cross bar on said main frame, upright ways on said bar to guide said bracket up and down, case shifting means to actuate said bracket to thus case shift said type carrier, means to arrest said bracket to properly locate it in its various case positions, said actuating means including also a pinion secured to said shaft, and a rack to actuate said pinion, and a guide on said bracket for said rack.

76. In a typewriting machine, the combination of key levers, means including motion determining devices one for each key lever, means including an arm operable through the medium of any one of the motion determining devices, said arm being located behind said key levers and extending upwardly to a horizontal plane above the key levers, a type carrier arranged above the key levers, rotatable means including a shaft to actuate said type carrier to position any one of the types in register with the printing point, said shaft being located above the key levers, the rotatable means including also a pinion secured to the lower end of said shaft, a rack engaging said pinion and arranged above said key levers, said rack extending rearwardly from said pinion, and a link connecting said rack to the upper end of said arm.

77. In a typewriting machine, the combination of main frame, a base, printing instrumentalities on the main frame, case shifting means on said main frame for the printing instrumentalities, a shift key lever on said base, means to hold the main frame on said base and to permit the removal of the main frame from said base, and intermediate means whereby the case shifting means may be actuated by said shift key lever, said intermediate means including devices to facilitate disconnection of the intermediate means from the shift key lever while the main frame is being removed from said base.

78. In a typewriting machine, the combination of main frame, a base, printing instrumentalities on the main frame, said printing instrumentalities including a rotatable type carrier having upper case types and lower case types thereon, case shifting means for said type carrier, said case shifting means being supported on said frame, actuating means for the case shifting means, said actuating means being supported on said base, holding means to permit detachment of the main frame from said base, said actuating means including means to permit a disconnection of the case shifting means from said actuating means so as not to interfere with the demounting of the main frame from the base.

79. In a typewriting machine, the combination of a main frame, a base, printing instrumentalities including a type carrier having a plurality of adjacent types thereon, means on the main frame to rotate the type carrier to juxtapose any one of the types at the printing point, key levers supported on said base, means on said base to actuate said rotating means, means on said base to operate said actuating means through various distances in accordance with the selected type, said operating means including devices selectable by the key levers, means to permit the detachment of the main frame from said base, and readily detachable means whereby said rotating means may be actuated by said actuating means.

80. In a typewriting machine, the combination of a main frame including two side plates each having a forward extension, and a cross bar extending from the forward end of one extension to the forward end of the other extension, said extensions forming with said cross-bar an opening at the front of the machine, a base to rest upon a table and upon which the main frame sets, a set of key levers having keys representing characters of a type font, means for demountably attaching the main frame to said base, and means for supporting the key levers on said base so that the main frame may be removed without disturbing the position of the base plate or interfering with the key levers, the keys being free to move into or out the opening formed by the extensions and the cross-bar while the main frame is being mounted on or removed from the base respectively.

81. In a typewriting machine, the combination of a main frame, a base upon which the main frame sets, a set of key levers supported on said base, said key levers being located above said base and within the main frame while the latter sets upon the base, and means for demountably attaching the main frame on said base, said main frame being removable from said base by lifting it without disturbing the position of the base plate or interfering with said key levers.

82. In a typewriting machine, the combination of a main frame, a base, said key levers being located above said base and within the main frame while the latter sets upon the base, a fulcrum bar on said base, a set of key levers supported on said fulcrum bar and extending forwardly therefrom, a guide plate for the free ends of said key levers, said guide plate extending upwardly from said base and being located between the sides of the main frame, means to support said guide plate on said base, and means for demountably attaching the main frame on said base, said main frame being removable from said base by lifting it after the attaching means has been rendered ineffective and without disturbing the position of the base plate or interfering with the key levers and the guide plate.

83. In a typewriting machine, the combination of a main frame, a base, a set of key levers supported on said base, typing mechanism on said main frame, actuating mechanism for said typing mechanism to actuate it to and from its effective position, said actuating mechanism being supported on said base, key levers on said base to control the operations of said actuating mechanism, said key levers being located above said base and within the main frame while the latter sets upon the base, means for detachably connecting said actuating mechanism with the typing mechanism, and means for demountably attaching said main frame to said base so that said main frame may readily be removed from said base with the typing mechanism while the key levers and actuating mechanism remain on the base.

84. In a typewriting machine, the combination of a platen, a type bar to print against said platen, said type bar having a thin body part, and a type block thereon, said type block extending beyond the sides of said body part, and means including a type bar actuator to press said type bar against said platen to print, said actuator having a slot extending in from its free end into which the body part of the type bar may pass freely, said slot forming two fingers at the free end of said actuator, said fingers to engage the type block directly and at opposite sides of the body part during a printing operation to insure contact of the entire type face against a work sheet interposed between the type and the platen.

85. In a typewriting machine, the combination of a platen, a type bar to print against said platen, said type bar having a type block the depth of which is less than its width, said type block having a flat back, and an actuator to press said type block against the platen, said actuator having two contact portions to engage the flat back of the type block near opposite sides thereof during a printing operation to effect uniform printing of the entire type face.

86. In a typewriting machine, the combination of a platen, a type bar to print against said platen, said type bar having a type block having a rear face the depth of said type block being less than its width, an actuator to press said type block against the platen, said actuator having two contact portions to engage the rear face of the type block near opposite sides thereof during a printing operation to effect uniform printing of the entire type face, said type block having an upper case type and a lower case type thereon in the same plane, the rear face of said type block being parallel to a plane extending through both type faces, means to case shift the type bar from one type to another in a direction parallel to a plane in which the rear face of said type block lies when the latter is printing, said actuator engaging the type block in either one of its case positions and always in alignment with the active type.

87. In a typewriting machine, the combination of a platen, shuttle, type bars thereon, rotatable means to actuate said shuttle to juxtapose any one of the type bars with the printing point, means including an actuator to press the registered type bar against the platen, each type bar having a thin body part, said actuator having a narrow slot into which the body part of the active type bar may pass, and means to accurately align the type bar after it has been juxtaposed at the printing point, said aligning means including a converging entrance at the open end of the slot in said actuator, the wide end of said entrance being nearest the free end of said actuator.

88. In a typewriting machine, the combination of a bracket, an upright shaft, means to rotate said shaft, a thrust bearing, said shaft being guided by said bracket and independently of said thrust bearing, said thrust bearing including a lower race secured to said bracket, an upper race secured to said shaft, and balls between said races, a type carrier supported by and connected with said upper race to rotate therewith and means to actuate said bracket to case shift the type carrier.

89. In a typewriting machine, the combination of a bracket, an upright shaft, means to rotate said shaft, a thrust bearing, said shaft being guided by said bracket and independently of said thrust bearing, said thrust bearing including a lower race secured to said bracket, an upper race secured to said shaft, and balls between said races, a type carrier, said shaft projecting upwardly beyond the upper race, said type carrier having an aperture to facilitate the mounting thereof on the projecting portion of said shaft, means on said upper race to engage said carrier and thus drive it by the rotation of said shaft, and means to hold said carrier on the driving means.

90. In a typewriting machine, the combination of a bracket, an upright shaft, means to rotate said shaft, a thrust bearing, said shaft being guided by said bracket and independently of said thrust bearing, said thrust bearing including a lower race secured to said bracket, and an upper race secured to said shaft, and balls between said races, a type carrier, said shaft projecting upwardly beyond the upper race, said carrier having an apertured portion to fit over the end of the shaft, said carrier having slots, projections on said upper race to engage in said slots to form a driving connection between the upper race and said shuttle, and a latch on said shaft, said latch having a portion to engage the apertured portion to hold said type carrier on said projections.

91. In a typewriting machine, the combination of a cylindrical shaft, means to rotatably support said shaft, driving means on said shaft, said shaft having a portion projecting beyond said driving means, a type carrier having a circular apertured portion whereby it may be mounted on the projecting shaft portion, portions on said carrier to be engaged by said driving means, said type carrier being rotatable freely about said shaft after it has been placed on said shaft to properly locate it with respect to the driving means, said shaft having an axial slot, a latch pivotally supported on said shaft to hold the type carrier in engagement with the driving means, said latch being located in said slot and guided thereby, a spring supported by said shaft and acting against said latch, and a finger piece forming part of said latch whereby the latch may be actuated against the action of said spring to disengage said latch from said carrier so that the latter may be removed from the projecting shaft portion.

92. In a typewriting machine, the combination of a shaft, means to rotatably support said shaft, driving means on said shaft, said shaft having a portion projecting beyond said driving means, a type carrier having an apertured portion having a narrow section to fit the projecting shaft portion, portions on said carrier to be engaged by said driving means, a spring pressed latch supported on said shaft, a finger piece forming part of said latch whereby the latch may be actuated to disengage it from said carrier so that the latter may be removed from the projecting shaft portion, the latch having a member engaging the apertured portion of said shuttle to hold the latter in engagement with the driving means, the lower part of said apertured portion having a wide section and being of larger diameter than that of projecting portion of said shaft, and a cam in said apertured portion extending from said wide portion to said narrow portion, said cam being effective to engage the top of said shaft and the member of said latch simultaneously to push the latter aside so as to enable the type carrier to be slipped onto the projecting shaft, said cam being effective to actuate said latch and to guide said shaft into the narrow section of the apertured portion of said type carrier to register the axis of the type carrier with that of the shaft.

93. A circular type bar carrier for a typewriting machine, said carrier including two main elements, each element having a disc like portion and a tubular portion, the tubular portion of one element extending into and fitting the tubular portion of the other element, said tubular portions being secured to each other, type bars pivoted on the edge of the disc like portion of one of said elements, the disc like portion of the other element having guide slots one for each type bar, and return springs one for each type bar.

94. A circular type bar carrier for a typewriting machine, said carrier including two main elements, each element having a disc like portion and a tubular portion, the tubular portion of one element extending into and fitting the tubular portion of the other element, said tubular portions being secured to each other, type bars pivoted on the edge of the disc like portion of one of said elements, the disc like portion of the other element having guide slots one for each type bar, the disc like portions being separated from each other, said tubular portions extending each from its disc like portion toward the other disc like portion, a flange on one of said tubular portions, said flange being located between said disc like portions, and return springs each connected at one end to one of the type bars and at its other end to said flange.

95. In a typewriting machine, the combination of printing instrumentalities including type bars any one of which may be juxtaposed at the printing point, means including a type bar actuator, a guide for said actuator, a main frame, means to pivotally support said guide on said main frame to enable the guide to be actuated to shift said actuator to an abnormal position, and means independent of said pivot to accurately locate said actuator while said guide is being swung to its active position.

96. In a typewriting machine, the combination of printing instrumentalities including type bars any one of which may be juxtaposed at the printing point, means including a type bar actuator, a guide for said actuator, a main frame, means to pivotally support said guide on said main frame to enable the guide to be actuated to shift the actuator to an abnormal position, and interlocking devices one at each side of said guide to accurately locate said guide and prevent lateral shifting thereof.

97. In a typewriting machine, the combination of printing instrumentalities including type bars any one of which may be juxtaposed at the printing point, means including a type bar actuator, a guide for said actuator, a main frame, means to pivotally support said guide on said main frame to enable the guide to be actuated to shift the actuator to an abnormal position, means independent of said pivot to accurately locate said actuator while said guide is being swung to its active position, and securing means to hold the guide in its active position against movement about its pivot.

98. In a typewriting machine, the combination of printing instrumentalities including type bars any one of which may be juxtaposed at the printing point, means including a type bar actuator, a guide for said actuator, a main frame, means to pivotally support said guide on said main frame to enable the guide to be actuated to shift the actuator to an abnormal position, interlocking devices one at each side of said guide to accurately locate said guide and prevent lateral shifting of said guide, and means to hold said guide against movement about its pivot.

99. In a typewriting machine, the combination of a platen, a shuttle, type bars thereon, rotatable means to actuate said shuttle to juxtapose any one of the type bars at the printing point, means including an actuator to press the juxtaposed type bar against the platen, means at the active end of said actuator to engage the juxtaposed type bar to accurately align it with the printing point before printing, a guide for said actuator, a pivot for said guide about which it may be swung to an abnormal position, and means to accurately locate said actuator laterally with respect to the printing point while said guide is being swung to its active position.

100. In a typewriting machine, the combination of a platen, a shuttle, type bars thereon, rotatable means to actuate said shuttle to juxtapose any one of the type bars at the printing point, means including an actuator to press the juxtaposed type bar against the platen, means at the active end of said actuator to engage the juxtaposed type bar to accurately align it with the printing point before printing, a guide for said actuator, a pivot for said guide about which it may be swung to an abnormal position, and means to prevent lateral shifting of said guide which the aligning action of said actuator on the active type bar tends to produce.

101. In a typewriting machine, the combination of a shuttle, type bars thereon, rotatable means to actuate said shuttle to juxtapose any one of the type bars at the printing point, means including an actuator to press the juxtaposed type bar against the platen, means at the active end of said actuator to engage the juxtaposed type bar to accurately align it with the printing point before printing, a guide for said actuator, a pivot for said guide about which it may be swung to an abnormal position, a fixed support for said pivot, said support having two apertures, two pins projecting from said guide, said pins to enter said apertures while said guide is being swung to its effective position, and acting to prevent lateral displacement of said guide while the actuator acts on one of the type bars to align it, and means to hold said guide down in its effective position.

102. In a typewriting machine, the combination of a platen, a shuttle, type bars thereon, rotatable means to actuate said shuttle to juxtapose any one of the type bars with the printing point, means including an actuator to press the juxtaposed type bar against the platen, means at the active end of said actuator to engage the juxtaposed type bar to accurately align it with the printing point before printing, a guide for said actuator, a pivot for said guide about which it may be swung to an abnormal position, a fixed support for said pivot, said support having two apertures, two pins projecting from said guide, said pins to enter said apertures while said guide is being swung to its effective position, two latches one near each pin to hold said guide in its effective position, and a bar having a finger piece to actuate said latches.

103. In a typewriting machine, the combination of printing instrumentalities including type bars, a platen, means to juxtapose any one of the type bars at the printing point, a type bar actuator, operable through various distances determined by the thickness of packs of work sheets around the platen, power driven means operable always through the same distance, and intermediate means through the medium of which said actuator may be operated by said power driven means, said intermediate means including two arms movable relatively to each other and forming a lever of the first order, and a resilient connection between the arms of said lever to permit the type bar actuator to be arrested in its various operated positions while the power means moves always through a constant distance.

104. In a typewriting machine, the combination of printing instrumentalities including a type bar, a platen, means to juxtapose any one of the type bars at the printing point, a type bar actuator operable through various distances determined by the thickness of packs of work sheets around the platen, power driven means operable always through the same distance, and intermediate means through the medium of which said actuator may be operated by said power driven means, said intermediate means including a shaft, an arm secured to said shaft, said arm being connected to said power driven means, an arm extending in a direction opposite to that of the first mentioned arm, a shaft to support the second mentioned arm, means on the first mentioned shaft to be engaged by the second mentioned arm to limit the relative motion of said arms, and a spring tending to hold the second mentioned arm against said means on the second mentioned shaft, said spring being effective to permit the type bar actuator to be arrested in its various operated positions while the power means moves always through a constant distance.

105. In a typewriting machine, the combination of printing instrumentalities including type bars, means to juxtapose any one of the type bars at the printing point, a type bar actuator to move varying distances according to the thicknesses of packs of work sheets which may be typed upon, a lever to operate the type bar actuator, a pivot for said lever, a shaft, power means to rock said shaft always through the same angular distance, an arm on said shaft, and means constituting a resilient driving connection between said arm and said lever.

106. In a typewriting machine, the combination of printing instrumentalities including type bars, means to juxtapose any one of the type bars at the printing point, a type bar actuator movable through various distances determined by the thicknesses of packs of work sheets which may be typed upon, power driven means operable always through the same distance, intermediate means through the medium of which said actuator may be operated by said power driven means, said intermediate means including two arms forming a lever of the first order, pivots one for each arm to support them independently of each other, a resilient connection between the arms of said lever, and means to adjust one of said arms angularly with respect to the other to thus vary the effective position of type bar actuator.

107. In a typewriting machine, the combination of printing instrumentalities including type bars, means to juxtapose any one of the type bars at the printing point, a type bar actuator movable through various distances determined by the thicknesses of various packs of work sheets which may be typed upon, power driven means operable always through the same distance, and intermediate means through the medium of which said actuator may be operated by said power driven means, said intermediate means including a shaft, an arm secured to said shaft, said arm being connected to said power driven means, an arm extending in a direction opposite to that of the first mentioned arm, a shaft to support the second mentioned arm, means on the first mentioned shaft to be engaged by the second mentioned arm to limit the relative motion of said arms in one direction, and a spring to hold the second mentioned arm against said means on the second mentioned shaft, said second mentioned shaft having an eccentric to cooperate with said second mentioned arm, and means to adjust said eccentric to alter the angular relation of said arms to thus vary the effective position of the type bar actuator.

108. In a typewriting machine, the combination of printing instrumentalities including type bars, means to juxtapose any one of the type bars at the printing point, a type bar actuator, an eccentric upon which said lever is pivotally supported, a rock shaft, a support for said rock shaft, power means to actuate the rock shaft about its axis, means whereby said lever may be actuated by said rock shaft, a shaft to support said eccentric, a support for the last mentioned shaft, a worm wheel on the last mentioned shaft, and means including a worm cooperating with said worm wheel to adjust said eccentric and thus vary the angular position of said lever to vary the effect of said type bar actuator.

109. In a typewriting machine, the combination of a series of type bars, a platen, means to juxtapose any one of said type bars at the printing point, each type bar comprising a thin body part, and a type block secured thereto and extending beyond each side of said body part, and a type bar actuator, said actuator having two members to act simultaneously and each to engage one of the portions of the type block extending beyond the sides of said body part.

110. In a typewriting machine, the combination of a series of type bars, a platen, means to juxtapose any one of said type bars at the printing point, each type bar comprising a body part, and a type block secured thereto, each type block having a flat rear face, and a type bar actuator to engage directly with the type block to actuate the type bar, the engaging end of the type bar actuator being sufficiently wide to engage the rear face of each type block near the sides thereof to insure uniform contact of the complete face of the type against the platen to thus produce uniform printing of each type.

111. In a typewriting machine, the combination of a series of type bars, a platen, means to juxtapose any one of said type bars at the printing point, each type bar comprising a thin body part, and a type block secured thereto and extending beyond each side of said body part, and a type bar actuator, said actuator having a slot extending into it from its engaging end and forming two members into which slot the body portion of the type bar extends while said members engage the type block to cause the type bar to print against the platen.

112. In a typewriting machine including key levers having keys, a type carrier, means to operate the type carrier in opposite directions from a normal position to locate any one of the types at the printing point, the characters on said keys being arranged from left to right of the machine in the same order as a four bank standard key board in which the vowels, numerals and consonants are mixed, the types being arranged on said carrier in a group of vowels in the middle of the set, the consonant types being arranged in two groups one at each side of the group of vowels, and the remainder of the characters including numerals and signs also being divided into two groups, one of the latter groups at the outside of each group of consonants, the operating means including differently shaped cams one for each key lever, means operable by each key lever to render its associated cam effective, and means responsive to the actuation of any one of the key levers to effect the actuation of the effective cam to actuate the type carrier.

113. In a typewriting machine, the combination of a platen, printing instrumentalities including type bars having types to print against said platen, and aligning means for said types, said aligning means being also effective to insure uniform printing of the entire face of each type.

114. In a typewriting machine, the combination of printing instrumentalities including a type carrier, types arranged side by side in a row on said carrier, means to actuate said carrier to juxtapose any one of the types at the printing point, a set of key devices one for each type, said key devices being arranged side by side and in a different character order to that of the corresponding types with respect to each other, differently shaped cams to actuate the type carrier actuating means, there being one cam for each key device, means operable by each key device to render its associated cam effective, and means responsive to the actuation of any one of the key levers to effect the actuation of the effective cam to actuate the first mentioned means and thereby actuate the type carrier.

115. In a typewriting machine, the combination of printing instrumentalities including a type carrier, having a type normally away from a printing point, a key lever, a reciprocable device, a cam normally disconnected from said reciprocable device, a connecting element operable directly by the key lever to connect the cam with the reciprocable device, means operable by said cam to actuate the type carrier, and means to actuate said reciprocable device in one direction to actuate the type carrier through the medium of the cam and the means operable thereby to locate the type of the type carrier at the printing point, said means being also effective while actuating the reciprocable device in the opposite direction to return said type carrier from its printing position through the medium of said cam.

116. In a typewriting machine, the combination with a rotary type carrier having types arranged side by side in a row extending around said type carrier, of means for imparting rotative movements of diminishing intensity to said type carrier, said means including a plurality of cams one for each type to vary the extent of rotation of the type carrier in accordance with angular location of the type on the type carrier, and means connected with the type bar carrier and operable by said cams.

117. In a typewriting machine, the combination of a type carrier having thereon a plurality of types arranged side by side, a set of key devices one for each type, said key devices being arranged side by side and in a different character order to that of the types, and a plurality of cams, one under the control of each key device to render the associated cam effective, and means operable by said cams one at a time to actuate said type carrier.

118. In a typewriting machine, the combination of actuating means, power driven means, two intermediate devices whereby the actuating means may be actuated by the power driven means from a normal position and by each intermediate device in a direction opposite to the other, devices to connect the intermediate devices with the power driven means, devices to connect the intermediate devices with the actuating means, key operated means to actuate the connecting devices to render them effective independently of and prior to the actuation of the power driven means, printing instrumentalities, and means operable by said actuating means to operate said printing instrumentalities.

CHARLES A. FUCHS.